US012008720B1

(12) United States Patent
Morgan et al.

(10) Patent No.: US 12,008,720 B1
(45) Date of Patent: Jun. 11, 2024

(54) SCENE GRAPH ASSISTED NAVIGATION

(71) Applicant: Apple Inc., Cupertino, CA (US)

(72) Inventors: Bo Morgan, Emerald Hills, CA (US); Payal Jotwani, Santa Clara, CA (US); Angela Blechschmidt, San Jose, CA (US); Mark E. Drummond, Palo Alto, CA (US); Daniel Ulbricht, Sunnyvale, CA (US)

(73) Assignee: APPLE INC., Cupertino, CA (US)

( * ) Notice: Subject to any disclaimer, the term of this patent is extended or adjusted under 35 U.S.C. 154(b) by 31 days.

(21) Appl. No.: 17/746,218

(22) Filed: May 17, 2022

Related U.S. Application Data

(60) Provisional application No. 63/215,875, filed on Jun. 28, 2021.

(51) Int. Cl.
*G06T 13/20* (2011.01)
*G06T 19/00* (2011.01)

(52) U.S. Cl.
CPC ........ *G06T 19/003* (2013.01); *G06T 2200/24* (2013.01); *G06T 2210/61* (2013.01)

(58) Field of Classification Search
None
See application file for complete search history.

(56) References Cited

U.S. PATENT DOCUMENTS

| 6,879,946 | B2 | 4/2005 | Rong et al. |
| 8,434,027 | B2 | 4/2013 | Jones |
| 9,129,158 | B1 | 9/2015 | Medasani et al. |
| 9,623,334 | B2 | 4/2017 | Anderson et al. |
| 9,766,703 | B2 | 9/2017 | Miller |
| 10,105,601 | B1* | 10/2018 | Hariton .................... A63F 13/53 |
| 10,659,750 | B2* | 5/2020 | Meier .................... H04N 13/221 |
| 11,610,115 | B2* | 3/2023 | Kar .......................... G06T 11/00 |
| 2005/0035883 | A1* | 2/2005 | Kameda ............. G01C 21/3638 340/995.1 |
| 2007/0276709 | A1 | 11/2007 | Trimby et al. |
| 2017/0316611 | A1* | 11/2017 | SanGiovanni ............ G06T 7/20 |
| 2018/0093186 | A1* | 4/2018 | Black ...................... A63F 13/25 |
| 2018/0349946 | A1* | 12/2018 | Nguyen ............. G06Q 30/0244 |
| 2018/0365898 | A1* | 12/2018 | Costa ...................... G06F 3/011 |
| 2019/0392630 | A1 | 12/2019 | Sturm et al. |
| 2020/0118347 | A1* | 4/2020 | Aksit ...................... G06T 17/10 |
| 2020/0294311 | A1* | 9/2020 | Holz .................... H04N 13/271 |
| 2020/0372709 | A1 | 11/2020 | Ponjou Tasse et al. |
| 2021/0225084 | A1* | 7/2021 | O'Connell ............. G06T 19/20 |
| 2021/0256765 | A1* | 8/2021 | Huo ...................... G06T 19/006 |
| 2022/0070365 | A1* | 3/2022 | Miller-Vedam ......... G06T 11/00 |

FOREIGN PATENT DOCUMENTS

WO WO-2020068917 A1 * 4/2020 ............. G06F 3/011

* cited by examiner

*Primary Examiner* — Hilina K Demeter
(74) *Attorney, Agent, or Firm* — Fernando & Partners, LLP

(57) ABSTRACT

In one implementation, a method of achieving an objective using a scene graph includes identifying a set of transition couples of a plurality of transition couples between sets of spatial relationships of the scene graph, wherein each spatial relationship of a respective first set of spatial relationships indicated by each transition couple of the set of transition couples is included in an initial set of spatial relationships or an respective second set of spatial relationships indicated by a previous transition couple and wherein a particular spatial relationship is included in a respective second set of spatial relationships of a last transition couple of the set of transition couples.

18 Claims, 42 Drawing Sheets

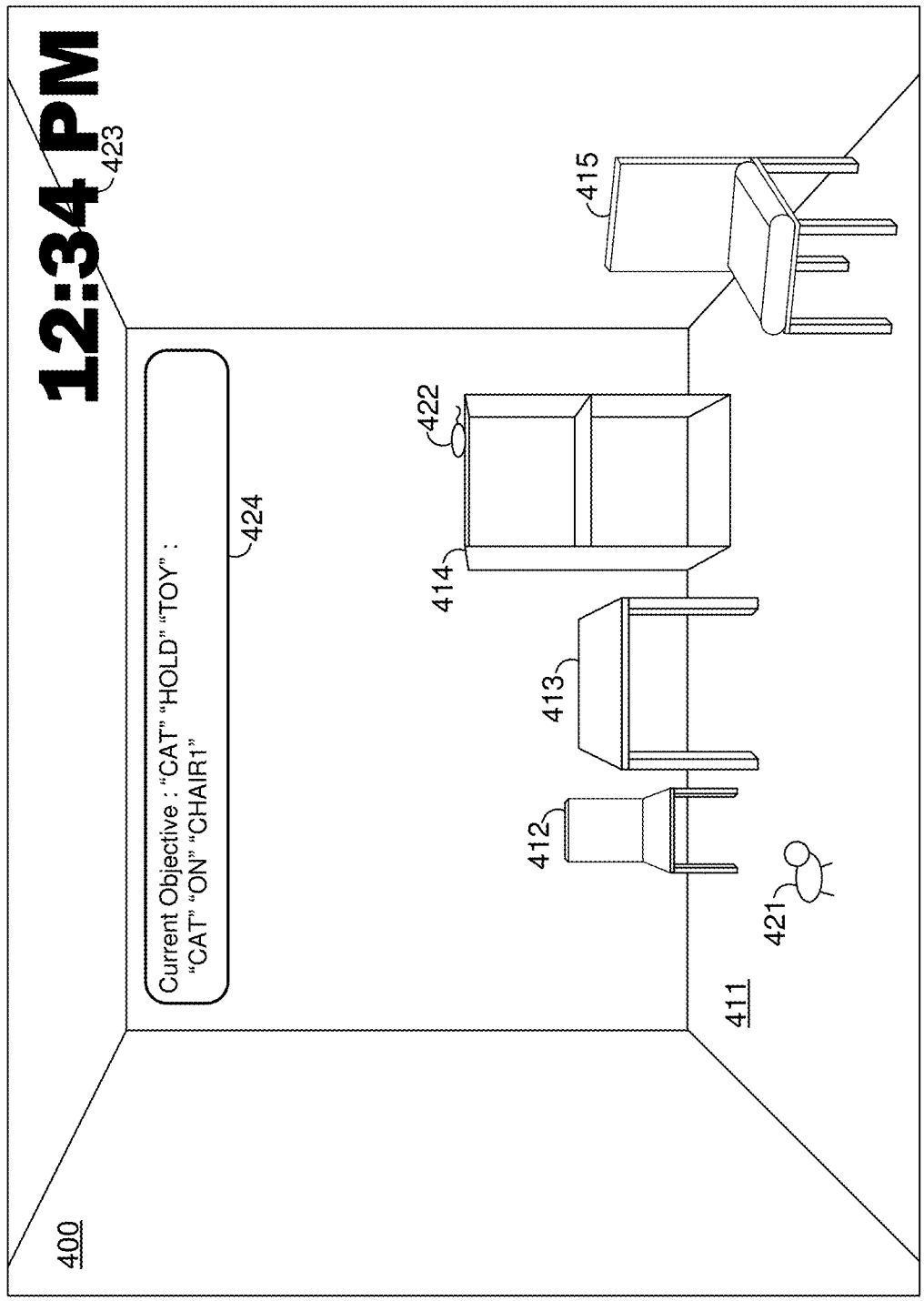
Figure 4S1

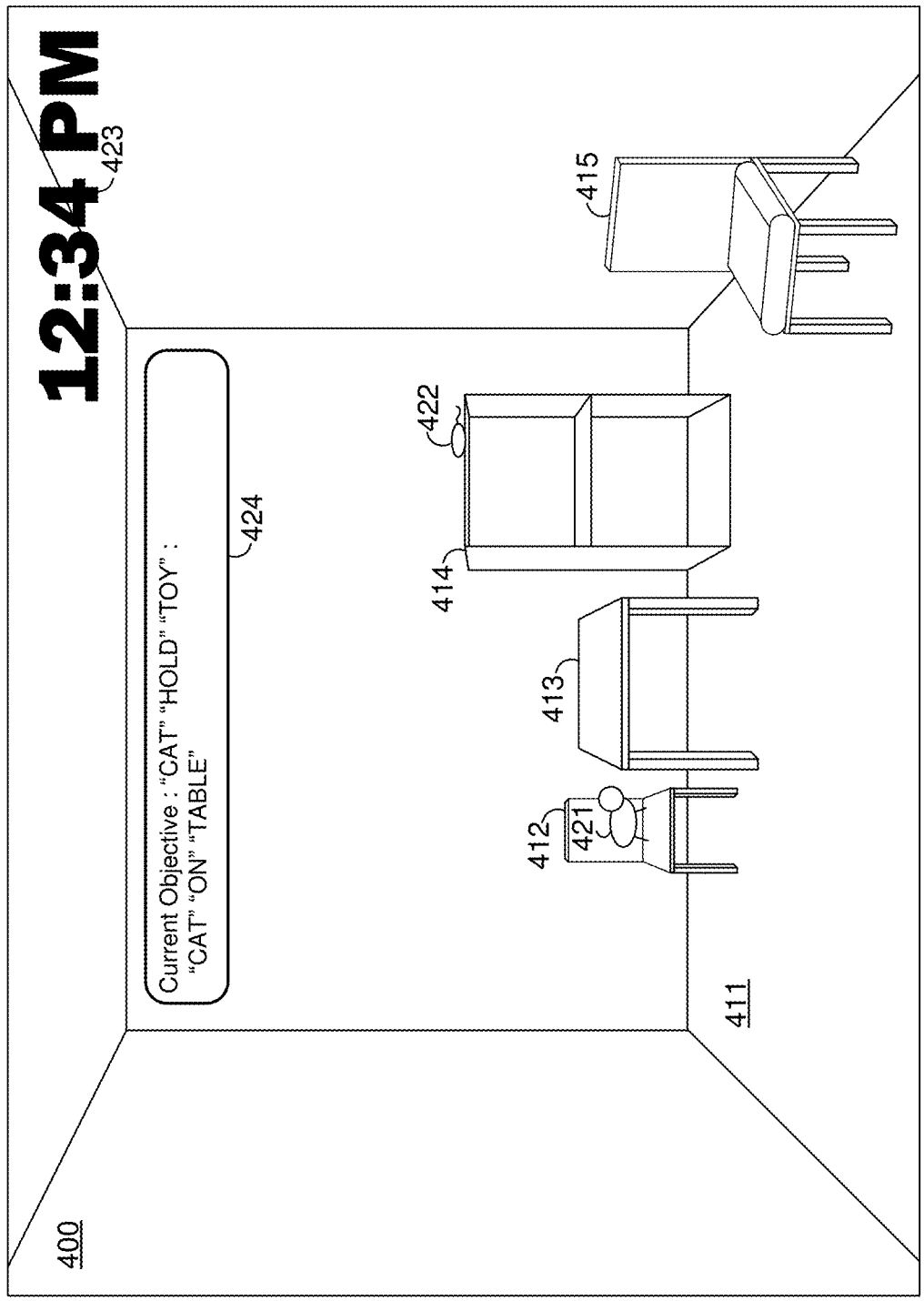
Figure 4S2

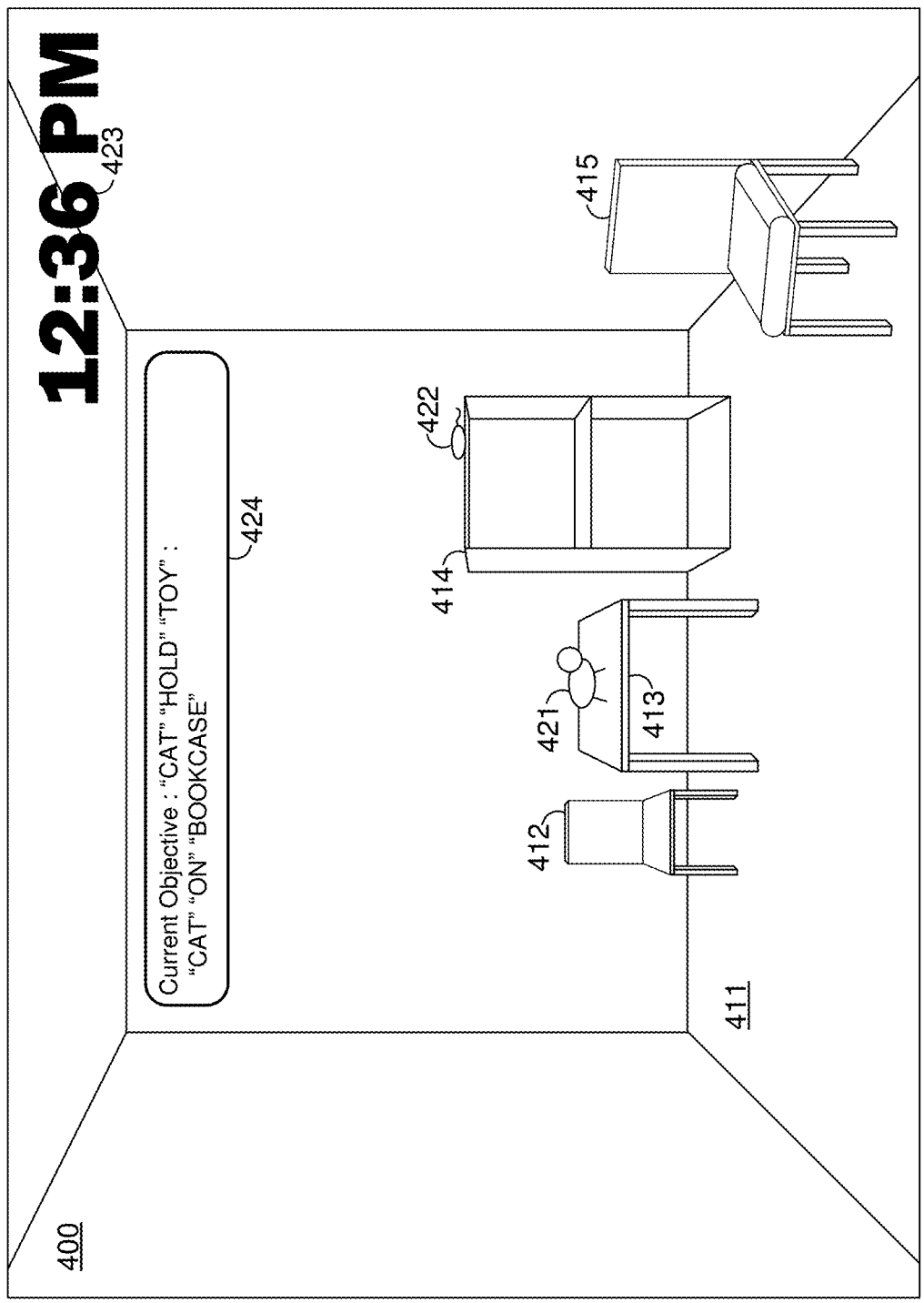
Figure 4S3

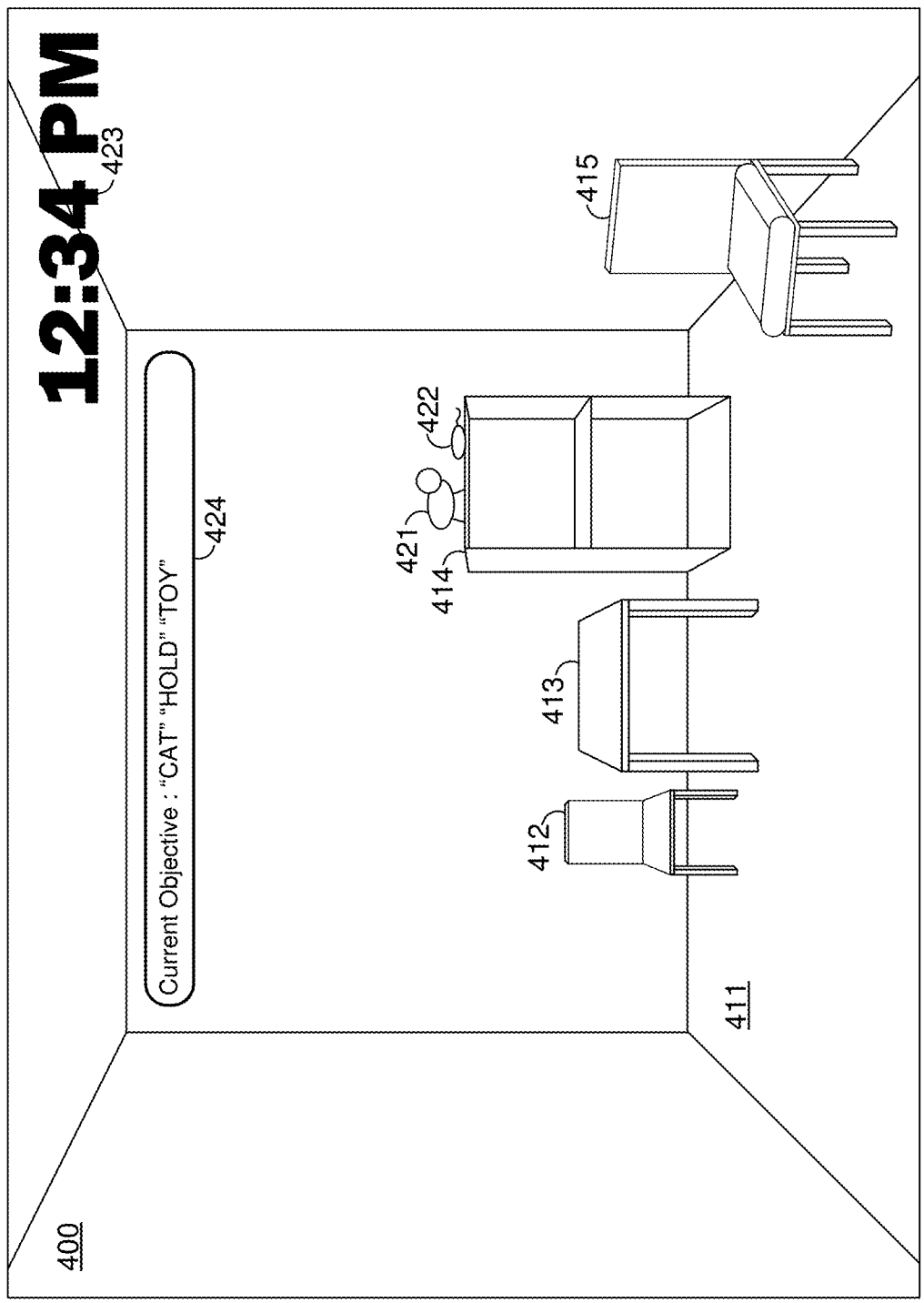
Figure 4S4

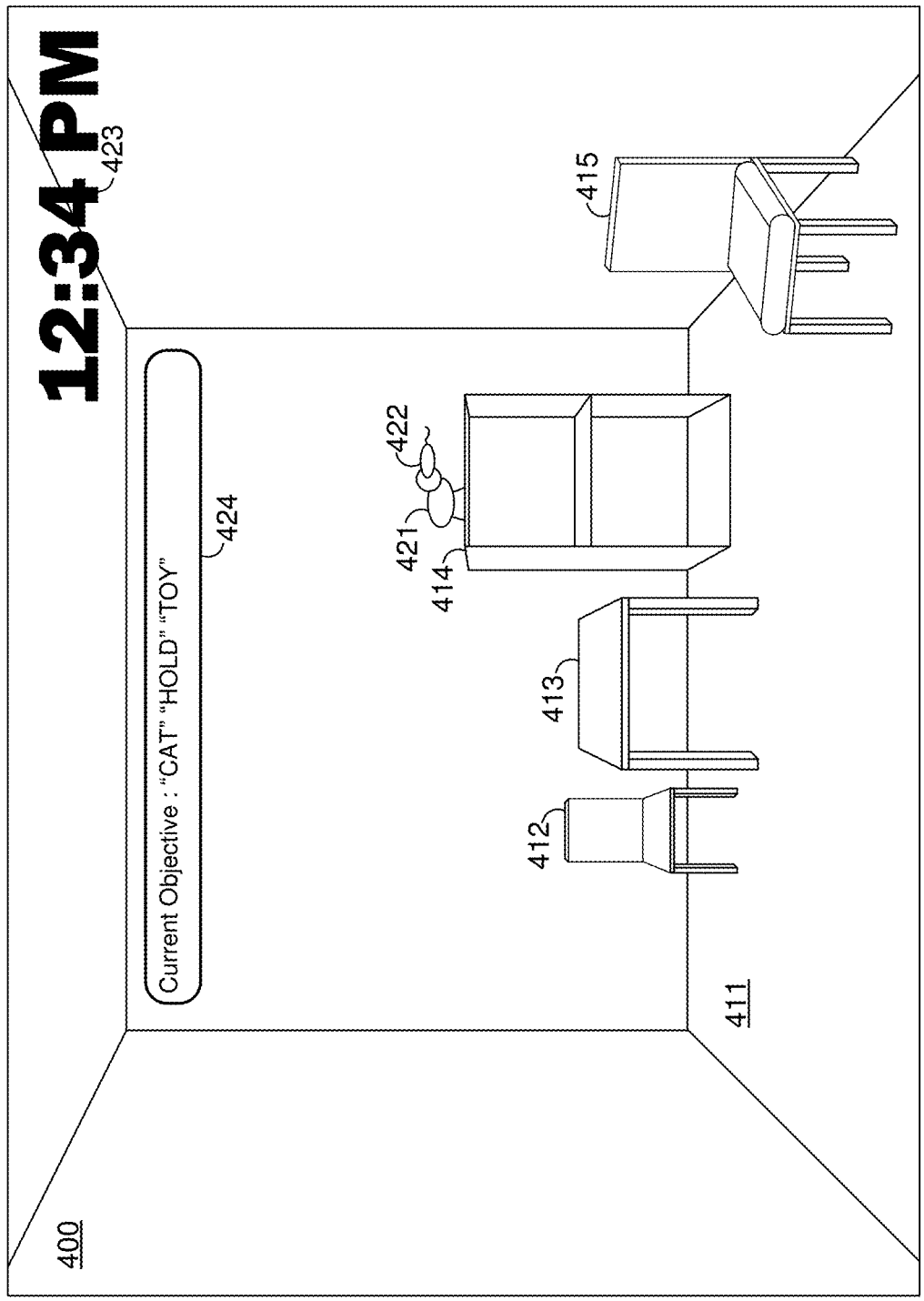
Figure 4S5

700

710 — At a device including a display, one or more processors, and non-transitory memory:

Obtaining a scene graph indicating a plurality of objects and an initial set of spatial relationships between respective pairs of the plurality of objects, wherein the plurality of objects includes an objective-effectuator object

720 — Obtaining a plurality of transition couples, wherein each transition couple indicates a transition from a respective first set of spatial relationships between respective pairs of the plurality of objects to a respective second set of spatial relationships between respective pairs of the plurality of objects

730 — Displaying, on the display, a representation of the objective-effectuator object in association with other objects of the plurality of objects in an environment having the initial set of spatial relationships

740 — Obtaining an objective indicative of a particular spatial relationship between a first object of the plurality of objects and a second object of the plurality of objects

750 — Identifying a set of transition couples of the plurality of transition couples, wherein each spatial relationship of the respective first set of spatial relationships indicated by each transition couple of the set of transition couples is included in the initial set of spatial relationships or the respective second set of spatial relationships indicated by a previous transition couple and wherein the particular spatial relationship is included in the respective second set of spatial relationships of a last transition couple of the set of transition couples

760 — Displaying, on the display, the representation of the objective-effectuator object in association with the other objects of the plurality of objects in the environment having the respective second set of spatial relationships of each transition couple of the set of transition couples

Figure 7

| 001 | "DOG" "ON" "FLOOR" | "DOG" "ON" "FLOOR"<br>"DOG" "NEAR" "SOFA" |
|---|---|---|
| 002 | "DOG" "ON" "FLOOR" | "DOG" "ON" "FLOOR"<br>"DOG" "NEAR" "CRATE" |
| 003 | "DOG" "ON" "FLOOR"<br>"BONE" "ON" FLOOR" | "DOG" "ON" "FLOOR"<br>"BONE" "ON" "FLOOR"<br>"DOG" "NEAR" "BONE" |
| 004 | "DOG" "ON" "FLOOR"<br>"DOG" "NEAR" SOFA" | "DOG" "ON" "SOFA" |
| 005 | "DOG" "ON" "SOFA" | "DOG" "ON" "FLOOR"<br>"DOG" "NEAR" "SOFA" |
| 006 | "DOG" "ON" "SOFA"<br>"BONE" "ON" SOFA" | "DOG" "ON" "SOFA"<br>"BONE" "ON" "SOFA"<br>"DOG" "NEAR" "BONE" |
| 007 | "DOG" "NEAR" "CRATE"<br>"DOOR" "CLOSED" "CRATE" | "DOG" "NEAR" "CRATE"<br>"DOOR" "OPEN" "CRATE" |
| 008 | "DOG" "NEAR" CRATE"<br>"DOOR" "OPEN" "CRATE" | "DOG" "INSIDE" "CRATE"<br>"DOOR" "OPEN" "CRATE" |
| 009 | "DOG" "INSIDE" "CRATE"<br>"BONE" "INSIDE" CRATE" | "DOG" "INSIDE" "CRATE"<br>"BONE" "INSIDE" "CRATE"<br>"DOG" "NEAR" "BONE" |
| 010 | "DOG" "INSIDE" "CRATE"<br>"DOOR" "OPEN" "CRATE" | "DOG" "NEAR" "CRATE"<br>"DOG" "ON" "FLOOR"<br>"DOOR" "OPEN" "CRATE" |
| 011 | "DOG" "NEAR" "BONE" | "DOG" "HOLD" "BONE" |
| 012 | "DOG" "HOLD" "BONE" | "DOG" "NEAR" "BONE" |

Figure 8C

SCENE GRAPH ASSISTED NAVIGATION

CROSS-REFERENCE TO RELATED APPLICATIONS

This application claims priority to U.S. Provisional Patent App. No. 63/215,875, filed on Jun. 28, 2021, which is hereby incorporated by reference in its entirety.

TECHNICAL FIELD

The present disclosure generally relates to systems, methods, and devices for navigating an environment based on a scene graph of the environment.

BACKGROUND

Determining a path from a first location in an environment to a second location in an environment, e.g., pathfinding, can be a computationally intensive process, particularly in a three-dimensional environment.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

FIG. 7 is a flowchart representation of a method of achieving an objective using a scene graph in accordance with some implementations.

FIG. 8C illustrates a plurality of transition couples for the example XR environment of FIG. 8A.

Figure 1:
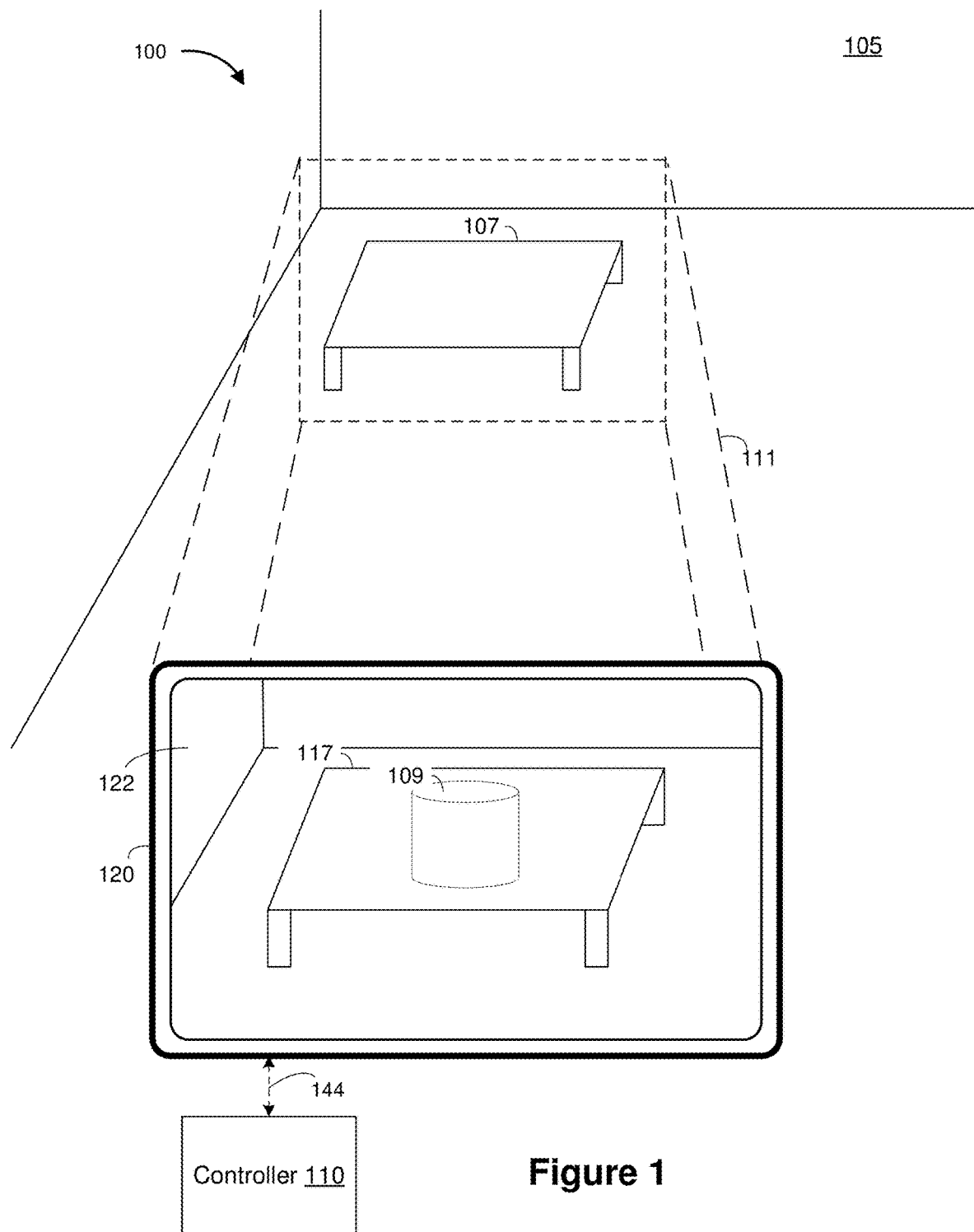
FIG. 1 is a block diagram of an example operating environment in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

SUMMARY

Various implementations disclosed herein include devices, systems, and methods for generation transition couples. In various implementations, the method is performed by a device including a display, a processor, and non-transitory memory. The method includes obtaining a scene graph indicating a plurality of objects and a first set of spatial relationships between respective pairs of the plurality of objects, wherein the plurality of objects includes an objective-effectuator object. The method includes displaying, on the display, a representation of the objective-effectuator object in association with other objects of the plurality of objects in an environment having the first set of spatial relationships. The method includes obtaining an objective indicative of a particular spatial relationship between a first object of the plurality of objects and a second object of the plurality of objects. The method includes generating a transition couple indicative of a transition from the first set of spatial relationships to a second set of spatial relationships between respective pairs of the plurality of objects, wherein the second set of spatial relationships includes the particular spatial relationship. The method includes displaying the representation of the objective-effectuator object in association with the other objects of the plurality of objects in the environment having the second set of spatial relationships.

Various implementations disclosed herein include devices, systems, and methods for achieving an objective using a scene graph. In various implementations, the method is performed by a device including a display, a processor, and non-transitory memory. The method includes obtaining a scene graph indicating a plurality of objects and an initial set of spatial relationships between respective pairs of the plurality of objects, wherein the plurality of objects includes an objective-effectuator object. The method includes obtaining a plurality of transition couples, wherein each transition couple indicates a transition from respective first set of spatial relationships between respective pairs of the plurality of objects to a respective second set of spatial relationships between respective pairs of the plurality of objects. The method includes displaying, on the display, a representation of the objective-effectuator object in association with other objects of the plurality of objects in an environment having the initial set of spatial relationships. The method includes obtaining an objective indicative of a particular spatial relationship between a first object of the plurality of objects and a second object of the plurality of objects. The method includes identifying a set of transition couples of the plurality of transition couples, wherein each spatial relationship of the respective first set of spatial relationships indicated by each transition couple of the set of transition couples is included in the initial set of spatial relationships or the respective second set of spatial relationships indicated by a previous transition couple and wherein the particular spatial relationship is included in the respective second set of spatial relationships of a last transition couple of the set of transition couples. The method includes displaying a representation of the objective-effectuator object in association with other objects of the plurality of objects in the environment having the respective second set of spatial relationships of each transition couple of the set of transition couples.

In accordance with some implementations, a device includes one or more processors, a non-transitory memory, and one or more programs; the one or more programs are stored in the non-transitory memory and configured to be executed by the one or more processors. The one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more processors, a non-transitory memory, and means for performing or causing performance of any of the methods described herein.

DESCRIPTION

A physical environment refers to a physical place that people can sense and/or interact with without aid of electronic devices. The physical environment may include physical features such as a physical surface or a physical object. For example, the physical environment corresponds to a physical park that includes physical trees, physical buildings, and physical people. People can directly sense and/or interact with the physical environment such as through sight, touch, hearing, taste, and smell. In contrast, an extended reality (XR) environment refers to a wholly or partially simulated environment that people sense and/or interact with via an electronic device. For example, the XR environment may include augmented reality (AR) content, mixed reality (MR) content, virtual reality (VR) content, and/or the like. With an XR system, a subset of a person's physical motions, or representations thereof, are tracked, and, in response, one or more characteristics of one or more virtual objects simulated in the XR environment are adjusted in a manner that comports with at least one law of physics. As an example, the XR system may detect movement of the electronic device presenting the XR environment (e.g., a mobile phone, a tablet, a laptop, a head-mounted device, and/or the like) and, in response, adjust graphical content and an acoustic field presented by the electronic device to the person in a manner similar to how such views and sounds would change in a physical environment. In some situations (e.g., for accessibility reasons), the XR system may adjust characteristic(s) of graphical content in the XR environment in response to representations of physical motions (e.g., vocal commands).

There are many different types of electronic systems that enable a person to sense and/or interact with various XR environments. Examples include head-mountable systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head-mountable system may have one or more speaker(s) and an integrated opaque display. Alternatively, a head-mountable system may be configured to accept an external opaque display (e.g., a smartphone). The head-mountable system may incorporate one or more imaging sensors to capture images or video of the physical environment, and/or one or more microphones to capture audio of the physical environment. Rather than an opaque display, a head-mountable system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light sources, or any combination of these technologies. The medium may be an optical waveguide, a hologram medium, an optical combiner, an optical reflector, or any combination thereof. In some implementations, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices, and circuits have not been described in exhaustive detail so as not to obscure more pertinent aspects of the example implementations described herein.

In various implementations, an objective-effectuator object obtains an objective achieved by obtaining a particular spatial relationship in an environment. For example, the objective may be achieved by obtaining a particular location in the environment or moving another object in the environment. Determining intermediate steps to achieve the objective can be a computationally intensive process. For example, finding a path from a first location in the environment to a second location in the environment may be difficult, particularly in a three-dimensional environment. In various implementations, the objective-effectuator object simplifies the process using a scene graph of the environment and a set of transition couples indicating changes to the scene graph the objective-effectuator is capable of making and, in various implementations, is allowed to make.

FIG. 1 is a block diagram of an example operating environment 100 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the operating environment 100 includes a controller 110 and an electronic device 120.

In some implementations, the controller 110 is configured to manage and coordinate an XR experience for the user. In some implementations, the controller 110 includes a suitable combination of software, firmware, and/or hardware. The controller 110 is described in greater detail below with respect to FIG. 2. In some implementations, the controller 110 is a computing device that is local or remote relative to the physical environment 105. For example, the controller 110 is a local server located within the physical environment 105. In another example, the controller 110 is a remote server located outside of the physical environment 105 (e.g., a cloud server, central server, etc.). In some implementations, the controller 110 is communicatively coupled with the electronic device 120 via one or more wired or wireless communication channels 144 (e.g., BLUETOOTH, IEEE 802.11x, IEEE 802.16x, IEEE 802.3x, etc.). In another example, the controller 110 is included within the enclosure of the electronic device 120. In some implementations, the functionalities of the controller 110 are provided by and/or combined with the electronic device 120.

In some implementations, the electronic device 120 is configured to provide the XR experience to the user. In some implementations, the electronic device 120 includes a suitable combination of software, firmware, and/or hardware. According to some implementations, the electronic device 120 presents, via a display 122, XR content to the user while the user is physically present within the physical environment 105 that includes a table 107 within the field-of-view 111 of the electronic device 120. As such, in some implementations, the user holds the electronic device 120 in his/her hand(s). In some implementations, while providing XR content, the electronic device 120 is configured to display an XR object (e.g., an XR cylinder 109) and to enable video pass-through of the physical environment 105 (e.g., including a representation 117 of the table 107) on a display 122. The electronic device 120 is described in greater detail below with respect to FIG. 3.

According to some implementations, the electronic device 120 provides an XR experience to the user while the user is virtually and/or physically present within the physical environment 105.

In some implementations, the user wears the electronic device 120 on his/her head. For example, in some implementations, the electronic device includes a head-mounted system (HMS), head-mounted device (HMD), or head-mounted enclosure (HME). As such, the electronic device 120 includes one or more XR displays provided to display the XR content. For example, in various implementations, the electronic device 120 encloses the field-of-view of the user. In some implementations, the electronic device 120 is a handheld device (such as a smartphone or tablet) configured to present XR content, and rather than wearing the electronic device 120, the user holds the device with a display directed towards the field-of-view of the user and a camera directed towards the physical environment 105. In some implementations, the handheld device can be placed within an enclosure that can be worn on the head of the user. In some implementations, the electronic device 120 is replaced with an XR chamber, enclosure, or room configured to present XR content in which the user does not wear or hold the electronic device 120.

Figure 2:
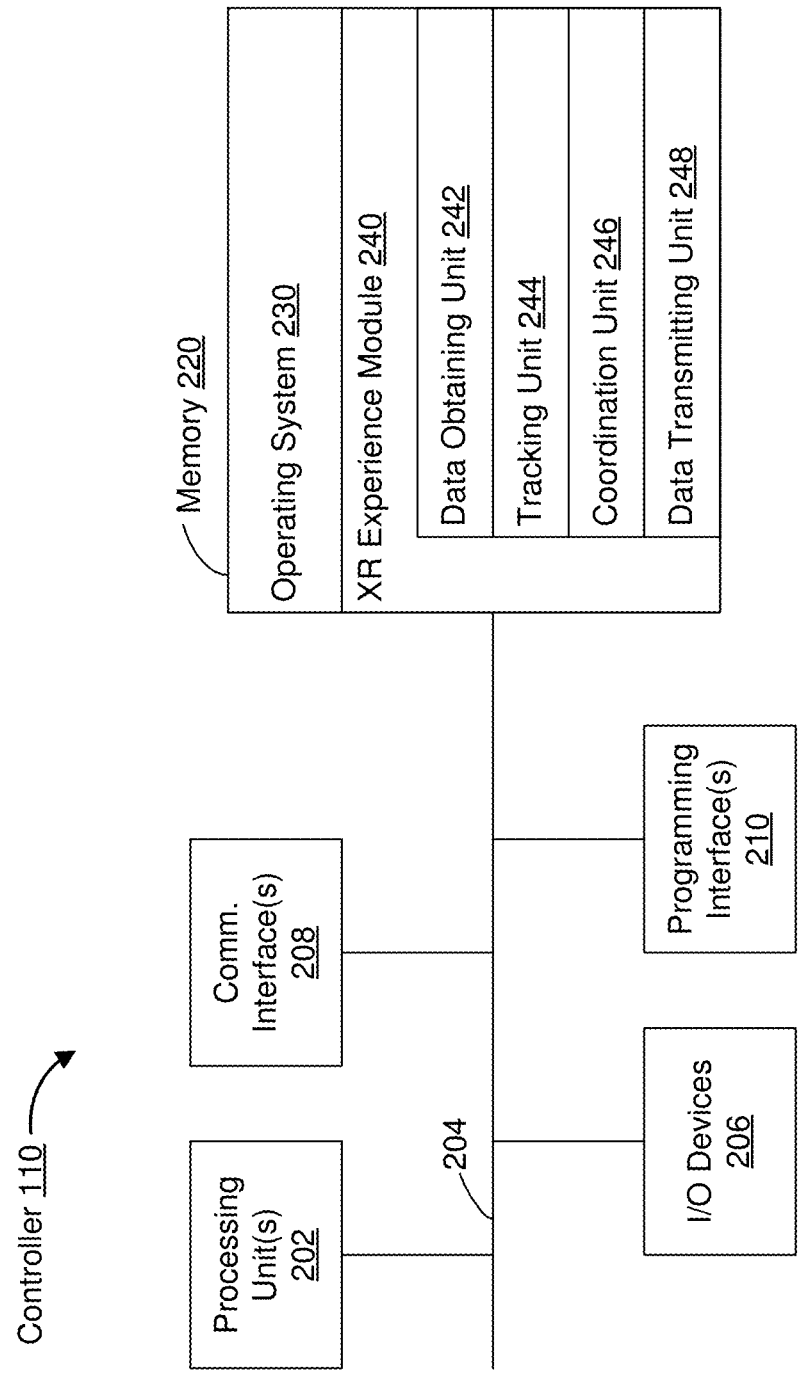
FIG. 2 is a block diagram of an example controller in accordance with some implementations.

FIG. 2 is a block diagram of an example of the controller 110 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the controller 110 includes one or more processing units 202 (e.g., microprocessors, application-specific integrated-circuits (ASICs), field-programmable gate arrays (FPGAs), graphics processing units (GPUs), central processing units (CPUs), processing cores, and/or the like), one or more input/output (I/O) devices 206, one or more communication interfaces 208 (e.g., universal serial bus (USB), FIREWIRE, THUNDERBOLT, IEEE 802.3x, IEEE 802.11x, IEEE 802.16x, global system for mobile communications (GSM), code division multiple access (CDMA), time division multiple access (TDMA), global positioning system (GPS), infrared (IR), BLUETOOTH, ZIGBEE, and/or the like type interface), one or more programming (e.g., I/O) interfaces 210, a memory 220, and one or more communication buses 204 for interconnecting these and various other components.

In some implementations, the one or more communication buses 204 include circuitry that interconnects and controls communications between system components. In some implementations, the one or more I/O devices 206 include at least one of a keyboard, a mouse, a touchpad, a joystick, one or more microphones, one or more speakers, one or more image sensors, one or more displays, and/or the like.

The memory 220 includes high-speed random-access memory, such as dynamic random-access memory (DRAM), static random-access memory (SRAM), double-data-rate random-access memory (DDR RAM), or other random-access solid-state memory devices. In some implementations, the memory 220 includes non-volatile memory, such as one or more magnetic disk storage devices, optical disk storage devices, flash memory devices, or other non-volatile solid-state storage devices. The memory 220 optionally includes one or more storage devices remotely located from the one or more processing units 202. The memory 220 comprises a non-transitory computer readable storage medium. In some implementations, the memory 220 or the non-transitory computer readable storage medium of the memory 220 stores the following programs, modules and data structures, or a subset thereof including an optional operating system 230 and an XR experience module 240.

The operating system 230 includes procedures for handling various basic system services and for performing hardware dependent tasks. In some implementations, the XR experience module 240 is configured to manage and coordinate one or more XR experiences for one or more users (e.g., a single XR experience for one or more users, or multiple XR experiences for respective groups of one or more users). To that end, in various implementations, the XR experience module 240 includes a data obtaining unit 242, a tracking unit 244, a coordination unit 246, and a data transmitting unit 248.

In some implementations, the data obtaining unit 242 is configured to obtain data (e.g., presentation data, interaction data, sensor data, location data, etc.) from at least the electronic device 120 of FIG. 1. To that end, in various implementations, the data obtaining unit 242 includes instructions and/or logic therefor, and heuristics and metadata therefor.

In some implementations, the tracking unit 244 is configured to map the physical environment 105 and to track the position/location of at least the electronic device 120 with respect to the physical environment 105 of FIG. 1. To that end, in various implementations, the tracking unit 244 includes instructions and/or logic therefor, and heuristics and metadata therefor.

In some implementations, the coordination unit 246 is configured to manage and coordinate the XR experience presented to the user by the electronic device 120. To that end, in various implementations, the coordination unit 246 includes instructions and/or logic therefor, and heuristics and metadata therefor.

In some implementations, the data transmitting unit 248 is configured to transmit data (e.g., presentation data, location data, etc.) to at least the electronic device 120. To that end, in various implementations, the data transmitting unit 248 includes instructions and/or logic therefor, and heuristics and metadata therefor.

Although the data obtaining unit 242, the tracking unit 244, the coordination unit 246, and the data transmitting unit 248 are shown as residing on a single device (e.g., the controller 110), it should be understood that in other implementations, any combination of the data obtaining unit 242, the tracking unit 244, the coordination unit 246, and the data transmitting unit 248 may be located in separate computing devices.

Moreover, FIG. 2 is intended more as functional description of the various features that may be present in a particular implementation as opposed to a structural schematic of the implementations described herein. As recognized by those of ordinary skill in the art, items shown separately could be combined and some items could be separated. For example, some functional modules shown separately in FIG.

2 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

Figure 3:
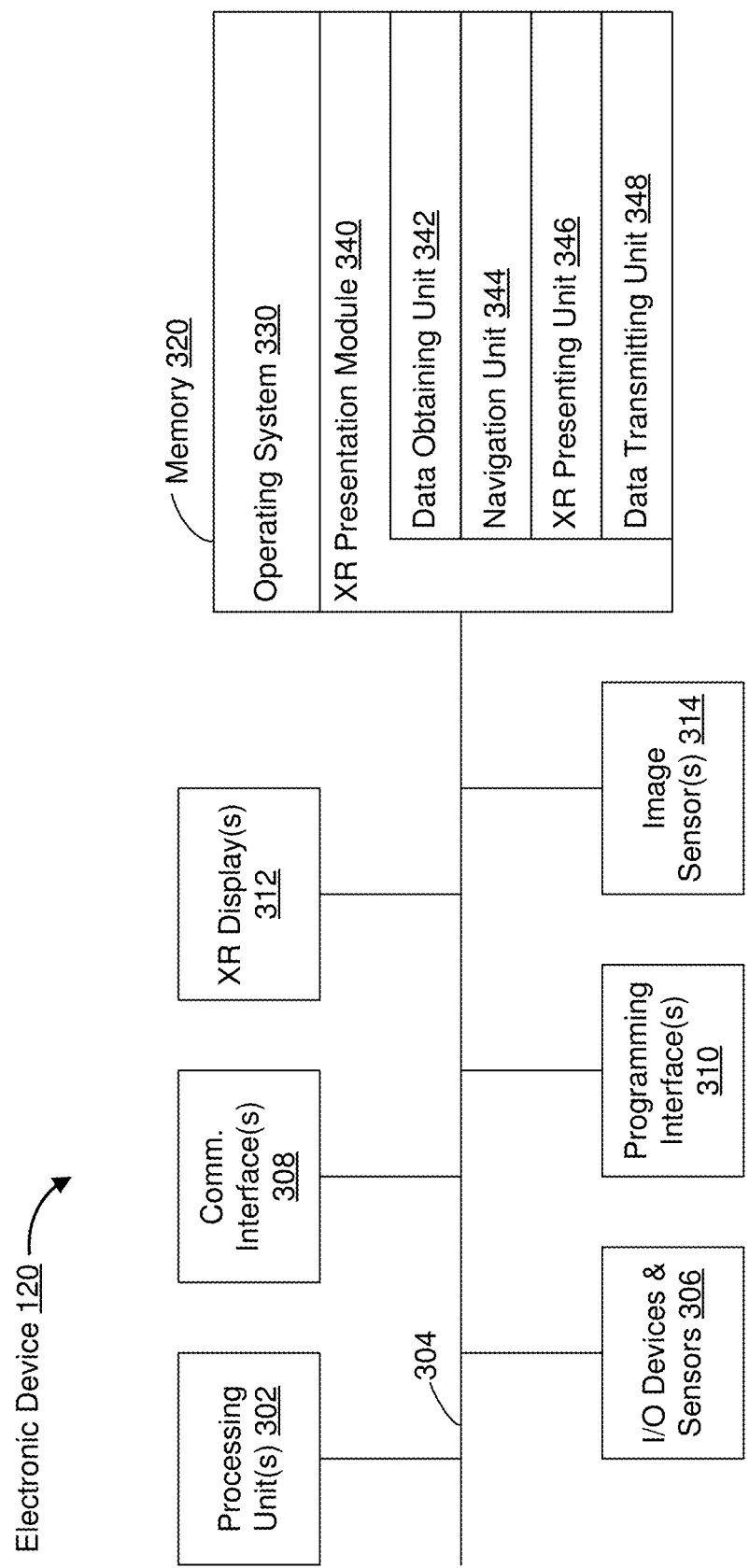
FIG. 3 is a block diagram of an example electronic device in accordance with some implementations.

FIG. 3 is a block diagram of an example of the electronic device 120 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the electronic device 120 includes one or more processing units 302 (e.g., microprocessors, ASICs, FPGAs, GPUs, CPUs, processing cores, and/or the like), one or more input/output (I/O) devices and sensors 306, one or more communication interfaces 308 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, and/or the like type interface), one or more programming (e.g., I/O) interfaces 310, one or more XR displays 312, one or more optional interior- and/or exterior-facing image sensors 314, a memory 320, and one or more communication buses 304 for interconnecting these and various other components.

In some implementations, the one or more communication buses 304 include circuitry that interconnects and controls communications between system components. In some implementations, the one or more I/O devices and sensors 306 include at least one of an inertial measurement unit (IMU), an accelerometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), and/or the like.

In some implementations, the one or more XR displays 312 are configured to provide the XR experience to the user. In some implementations, the one or more XR displays 312 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electro-mechanical system (MEMS), and/or the like display types. In some implementations, the one or more XR displays 312 correspond to diffractive, reflective, polarized, holographic, etc. waveguide displays. For example, the electronic device 120 includes a single XR display. In another example, the electronic device includes an XR display for each eye of the user. In some implementations, the one or more XR displays 312 are capable of presenting MR and VR content.

In some implementations, the one or more image sensors 314 are configured to obtain image data that corresponds to at least a portion of the face of the user that includes the eyes of the user (and may be referred to as an eye-tracking camera). In some implementations, the one or more image sensors 314 are configured to be forward-facing so as to obtain image data that corresponds to the scene as would be viewed by the user if the electronic device 120 was not present (and may be referred to as a scene camera). The one or more optional image sensors 314 can include one or more RGB cameras (e.g., with a complimentary metal-oxide-semiconductor (CMOS) image sensor or a charge-coupled device (CCD) image sensor), one or more infrared (IR) cameras, one or more event-based cameras, and/or the like.

The memory 320 includes high-speed random-access memory, such as DRAM, SRAM, DDR RAM, or other random-access solid-state memory devices. In some implementations, the memory 320 includes non-volatile memory, such as one or more magnetic disk storage devices, optical disk storage devices, flash memory devices, or other non-volatile solid-state storage devices. The memory 320 optionally includes one or more storage devices remotely located from the one or more processing units 302. The memory 320 comprises a non-transitory computer readable storage medium. In some implementations, the memory 320 or the non-transitory computer readable storage medium of the memory 320 stores the following programs, modules and data structures, or a subset thereof including an optional operating system 330 and an XR presentation module 340.

The operating system 330 includes procedures for handling various basic system services and for performing hardware dependent tasks. In some implementations, the XR presentation module 340 is configured to present XR content to the user via the one or more XR displays 312. To that end, in various implementations, the XR presentation module 340 includes a data obtaining unit 342, a navigation unit 344, an XR presenting unit 346, and a data transmitting unit 348.

In some implementations, the data obtaining unit 342 is configured to obtain data (e.g., presentation data, interaction data, sensor data, location data, etc.) from at least the controller 110 of FIG. 1, such as a scene graph. To that end, in various implementations, the data obtaining unit 342 includes instructions and/or logic therefor, and heuristics and metadata therefor.

In some implementations, the navigation unit 344 is configured to determine a path from a first location in an environment to a second location in an environment. To that end, in various implementations, the navigation unit 344 includes instructions and/or logic therefor, and heuristics and metadata therefor.

In some implementations, the XR presenting unit 346 is configured to present XR content via the one or more XR displays 312, such as a virtual object traversing the path. To that end, in various implementations, the XR presenting unit 346 includes instructions and/or logic therefor, and heuristics and metadata therefor.

In some implementations, the data transmitting unit 348 is configured to transmit data (e.g., presentation data, location data, etc.) to at least the controller 110, such as an image of the environment which may be used to generate a scene graph. In some implementations, the data transmitting unit 348 is configured to transmit authentication credentials to the electronic device. To that end, in various implementations, the data transmitting unit 348 includes instructions and/or logic therefor, and heuristics and metadata therefor.

Although the data obtaining unit 342, the navigation unit 344, the XR presenting unit 346, and the data transmitting unit 348 are shown as residing on a single device (e.g., the electronic device 120), it should be understood that in other implementations, any combination of the data obtaining unit 342, the navigation unit 344, the XR presenting unit 346, and the data transmitting unit 348 may be located in separate computing devices.

Moreover, FIG. 3 is intended more as a functional description of the various features that could be present in a particular implementation as opposed to a structural schematic of the implementations described herein. As recognized by those of ordinary skill in the art, items shown separately could be combined and some items could be separated. For example, some functional modules shown separately in FIG. 3 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

Figure 4A:
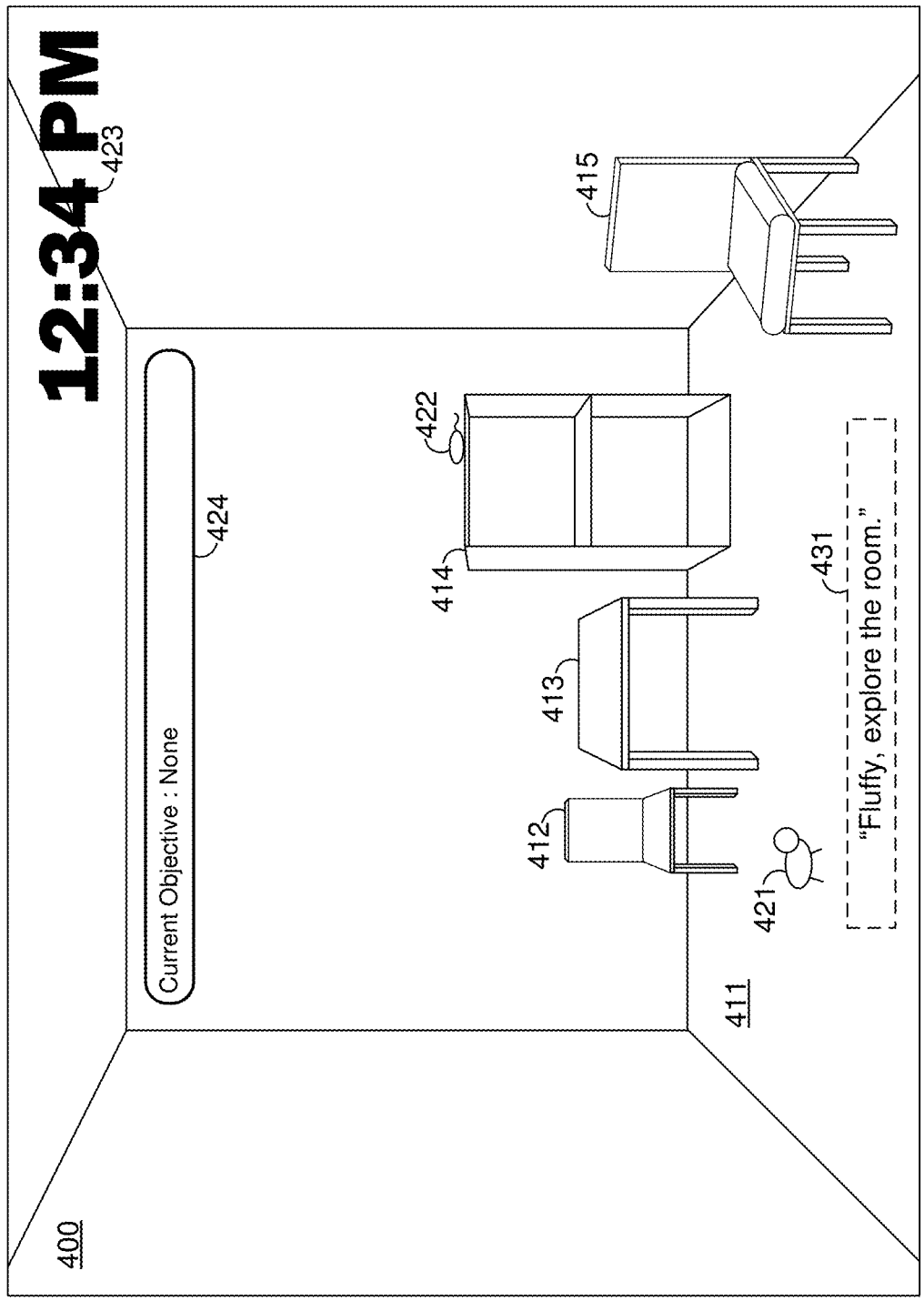
FIGS. 4A-4V illustrate an XR environment during various time periods in accordance with some implementations.
Figure 4B:
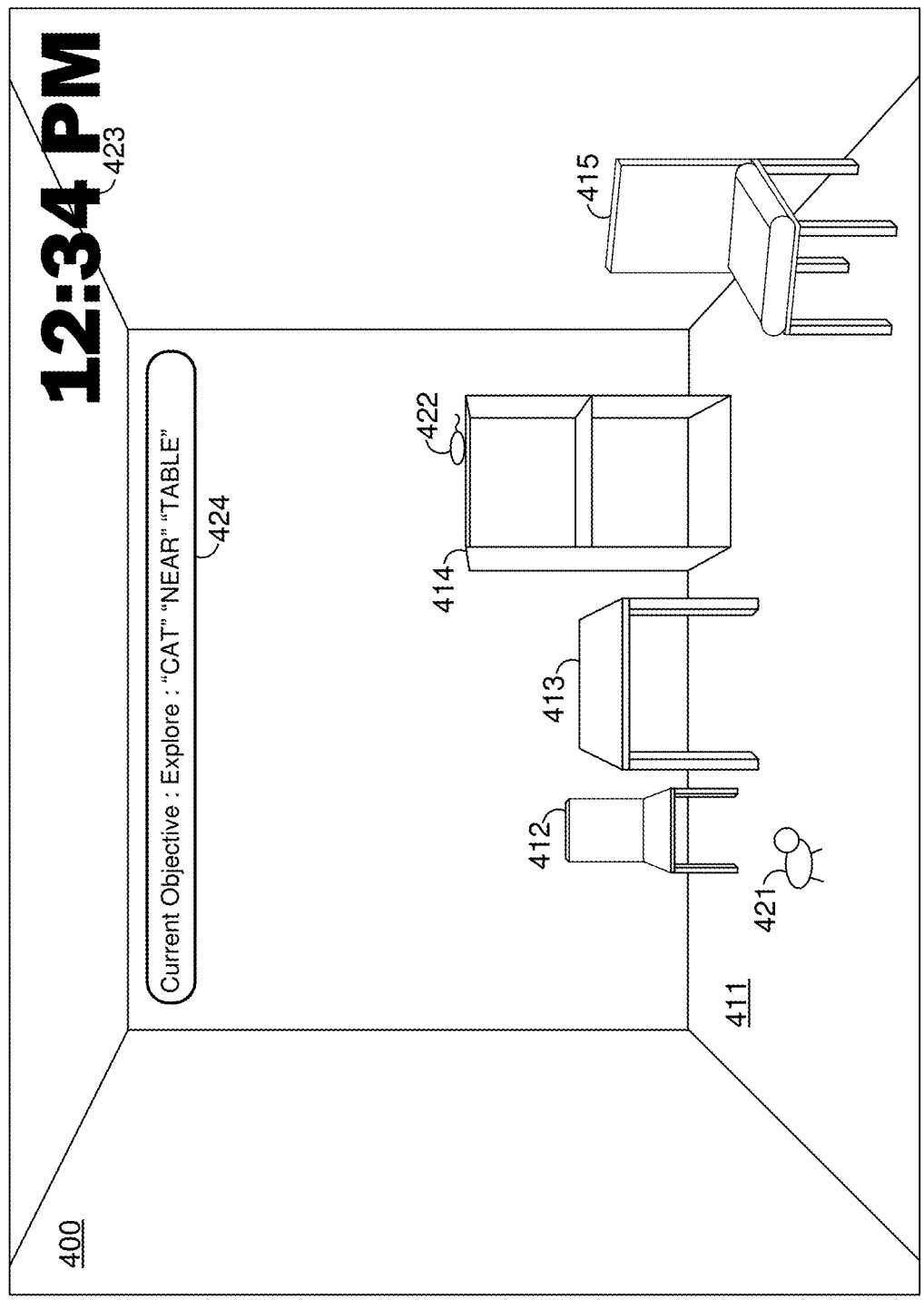
Figure 4C:
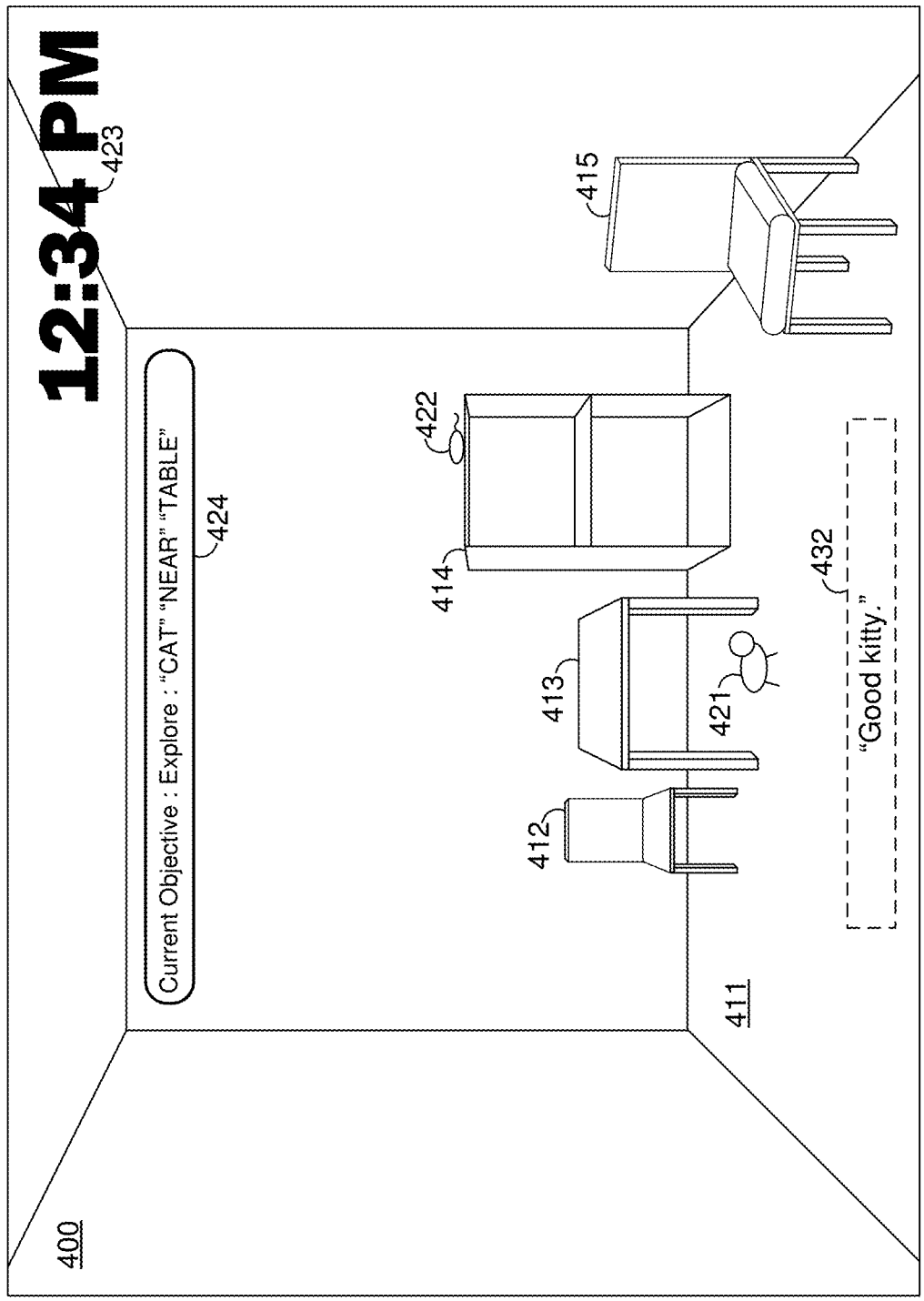
Figure 4D:
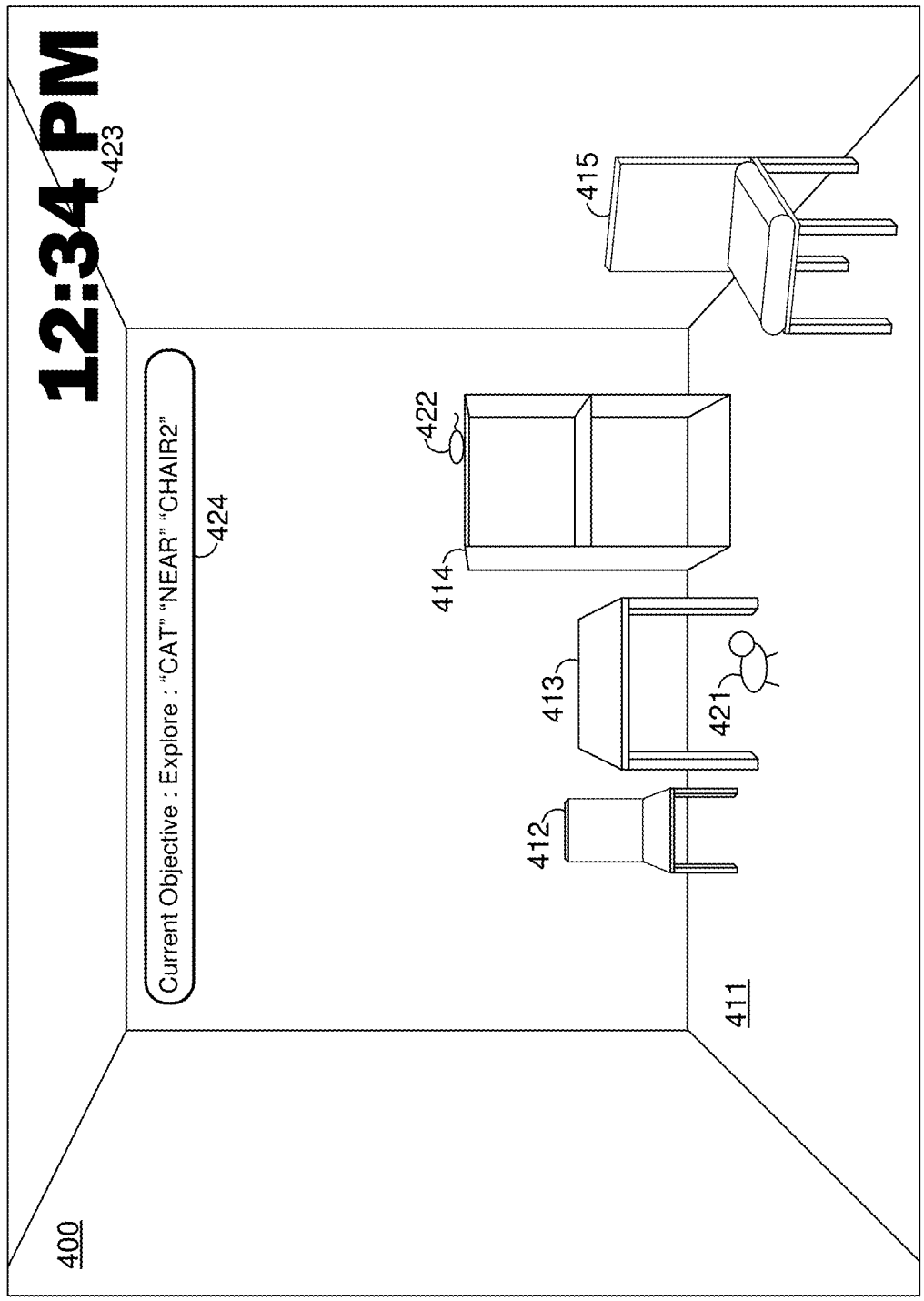
Figure 4E:
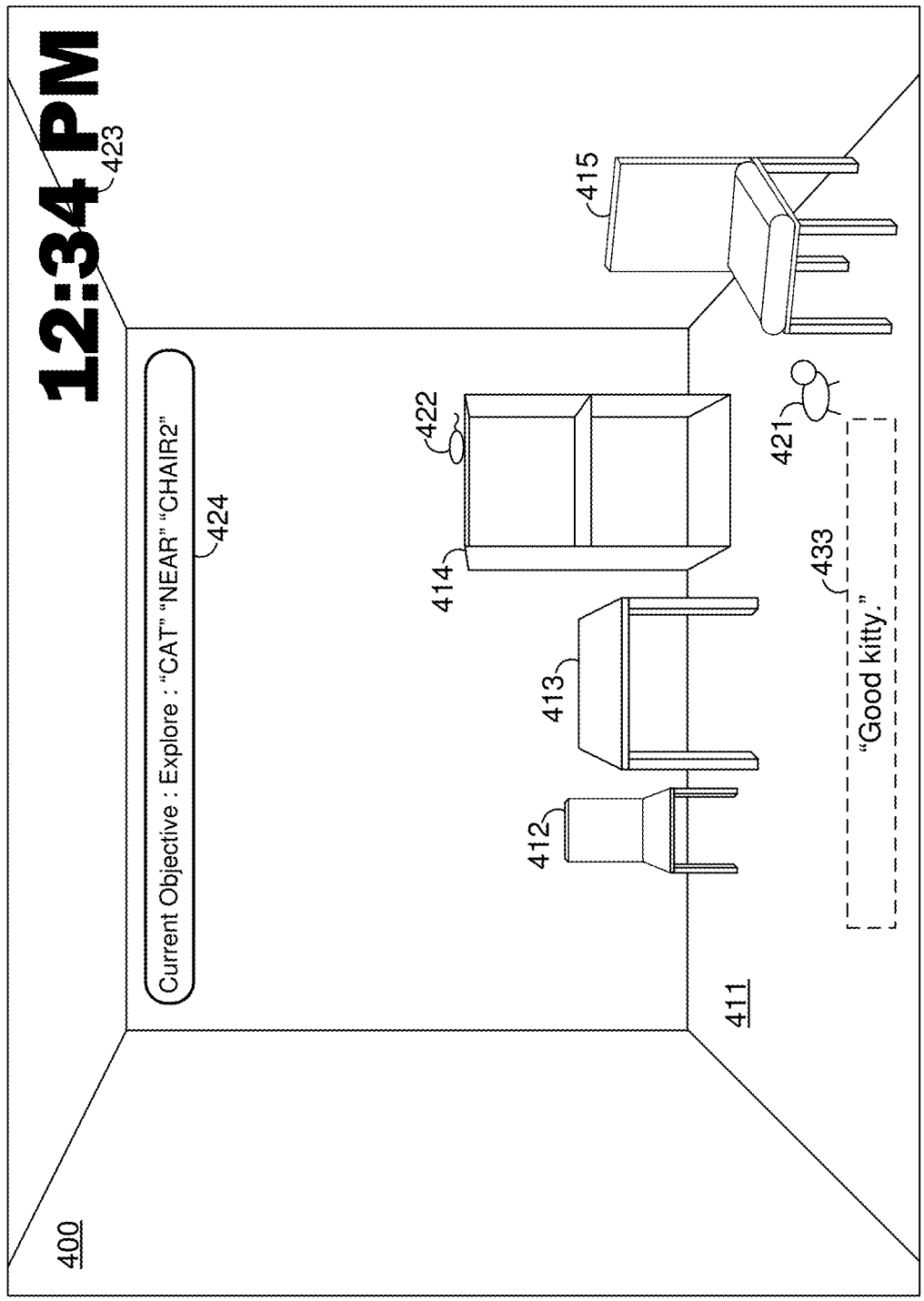
Figure 4F:
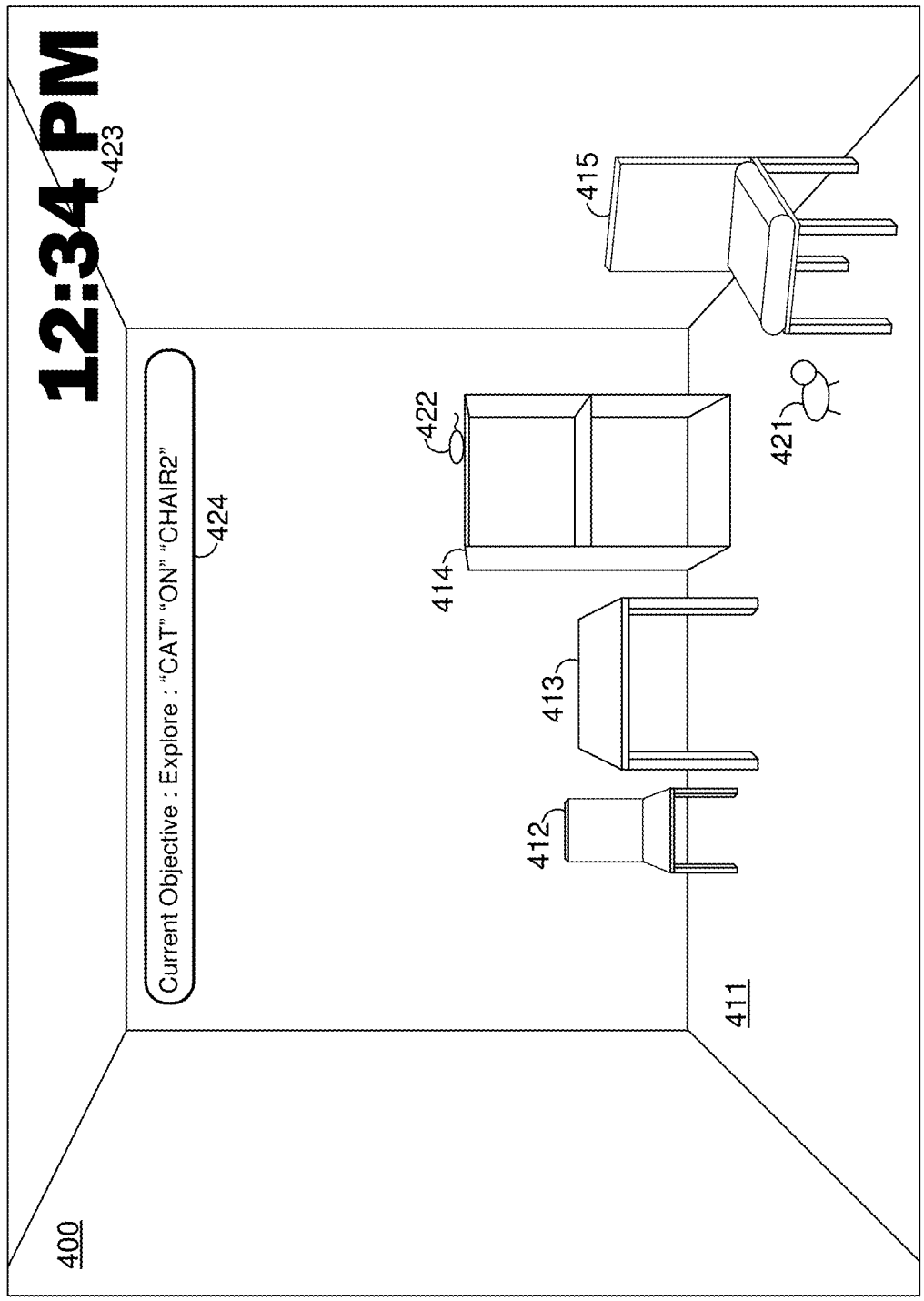
Figure 4G:
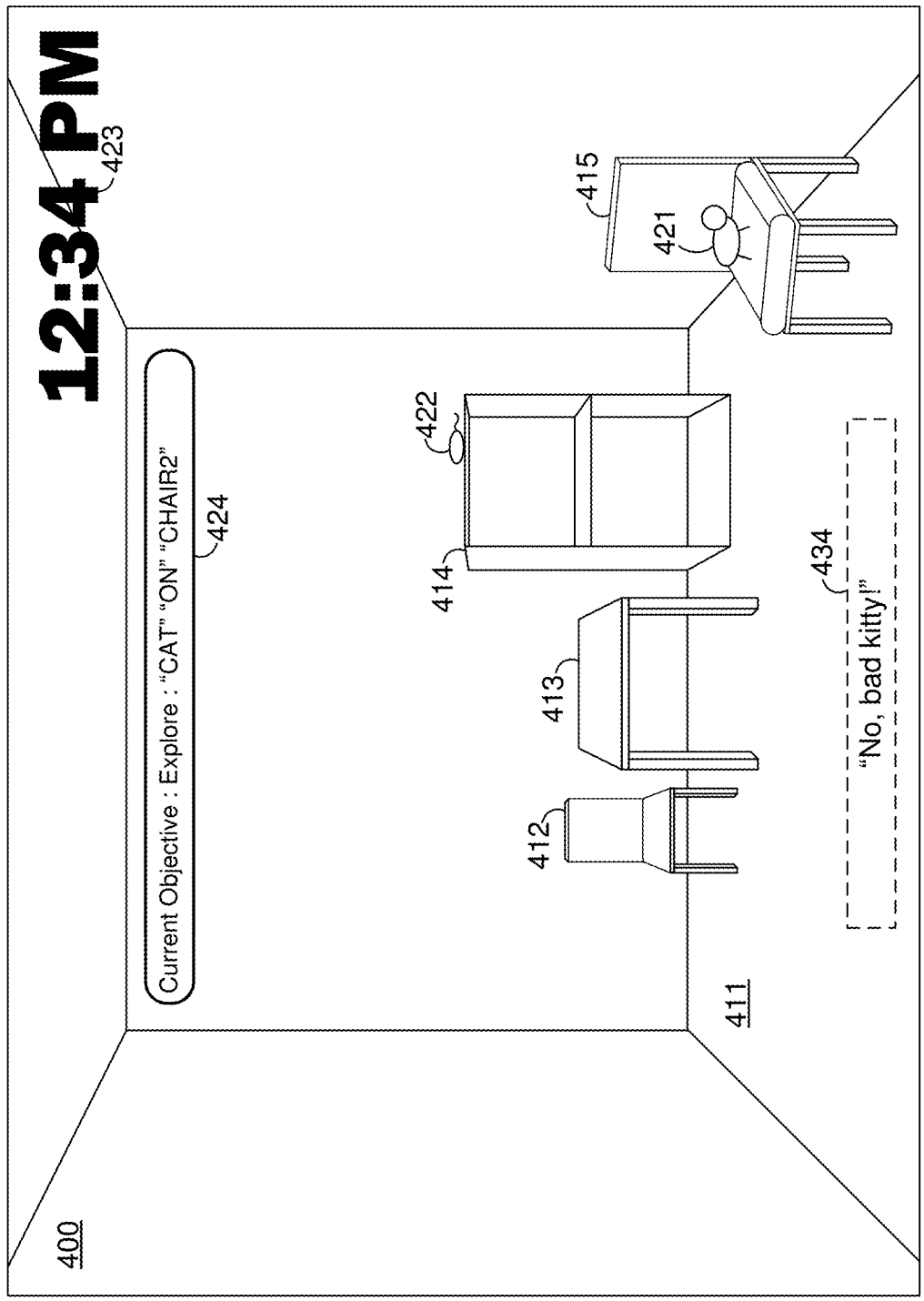
Figure 4H:
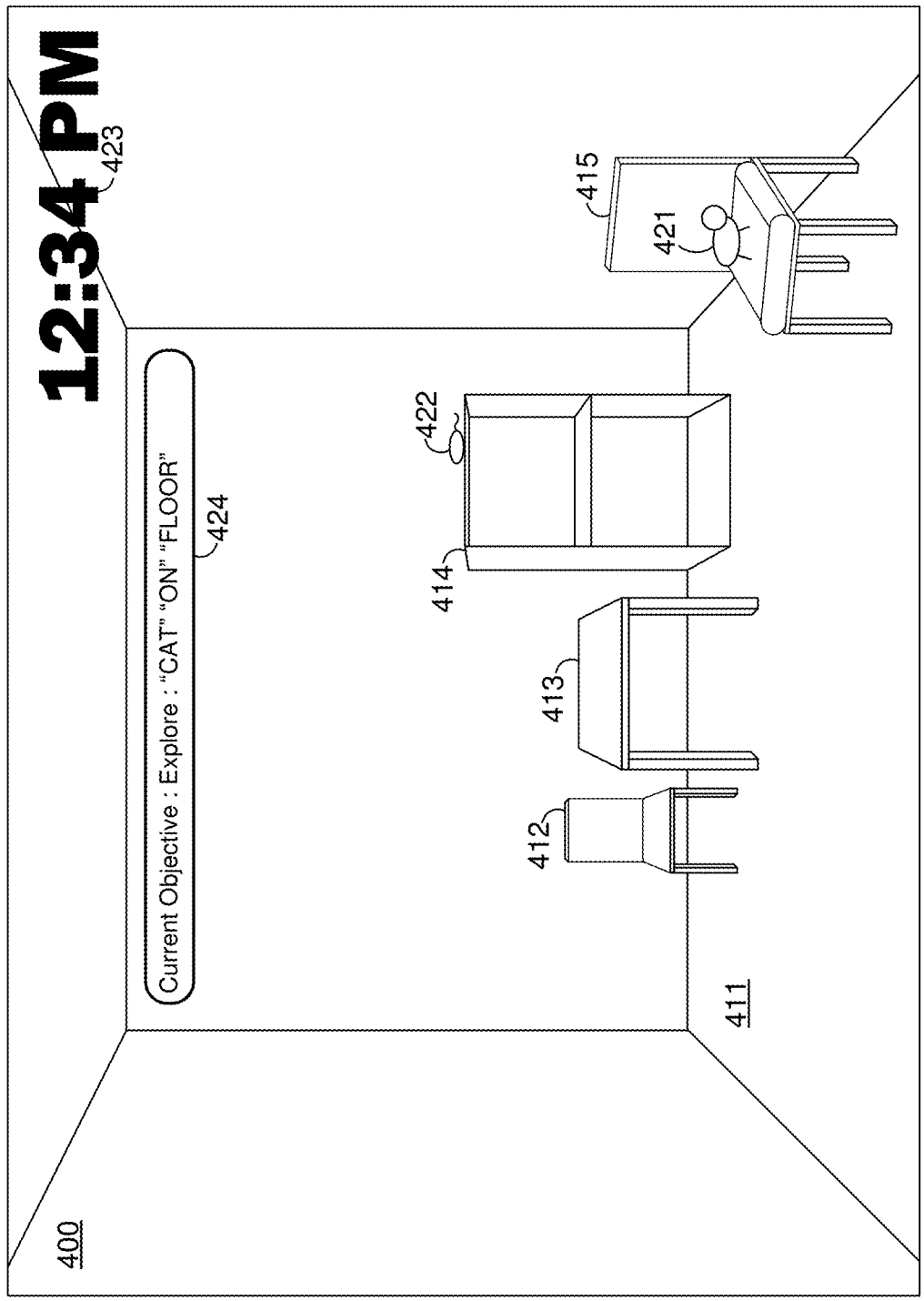
Figure 4I:
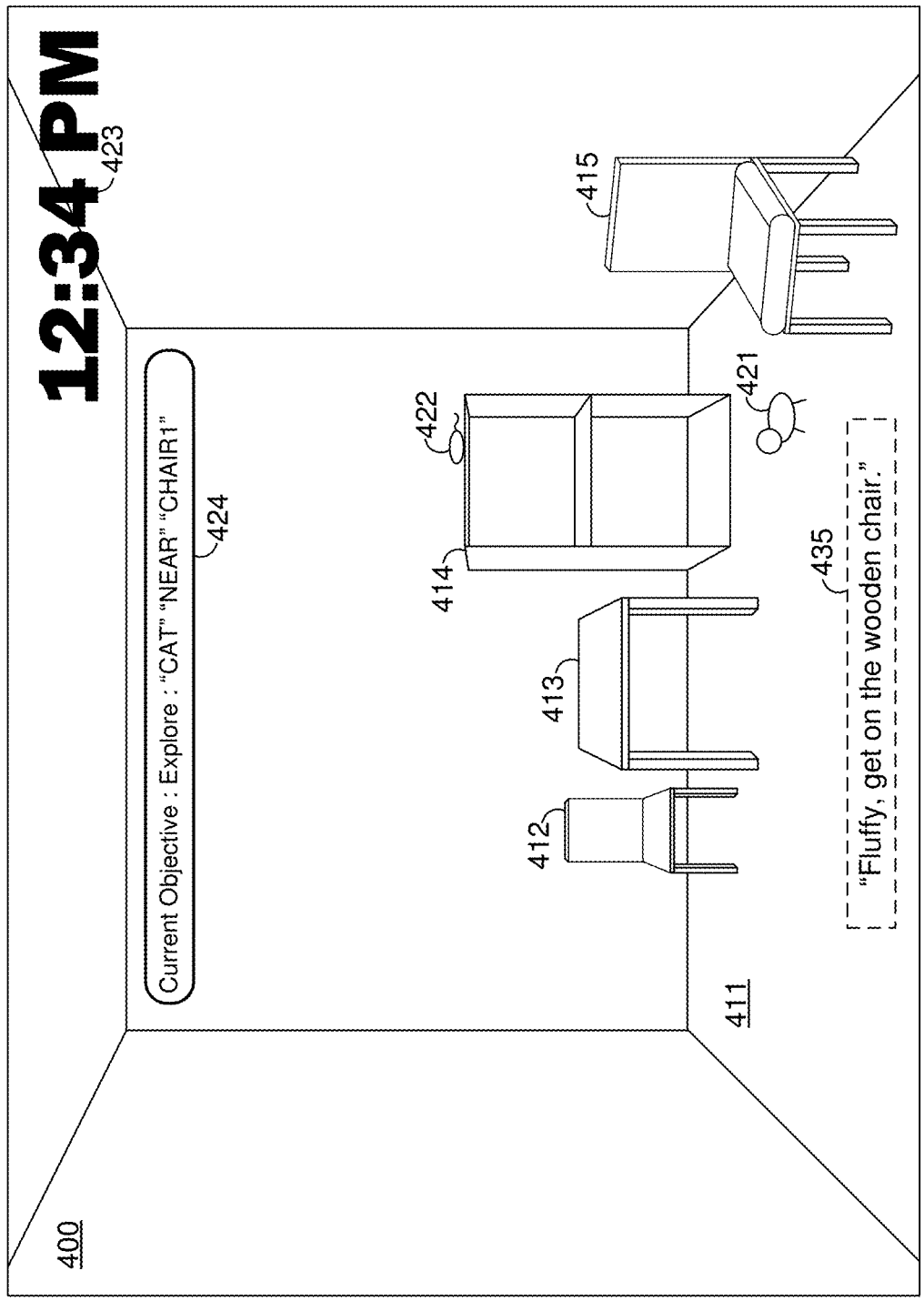
Figure 4J:
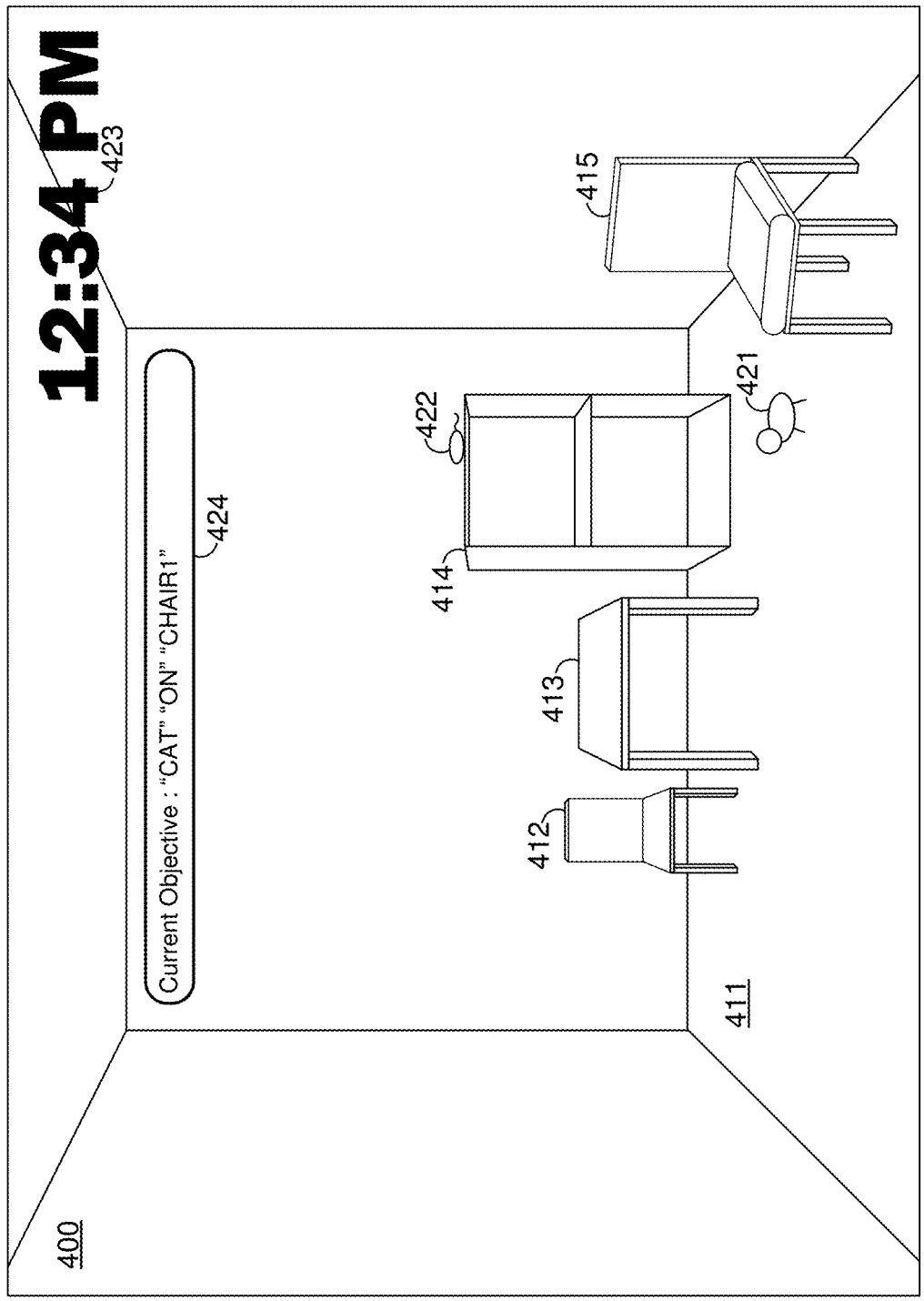
Figure 4K:
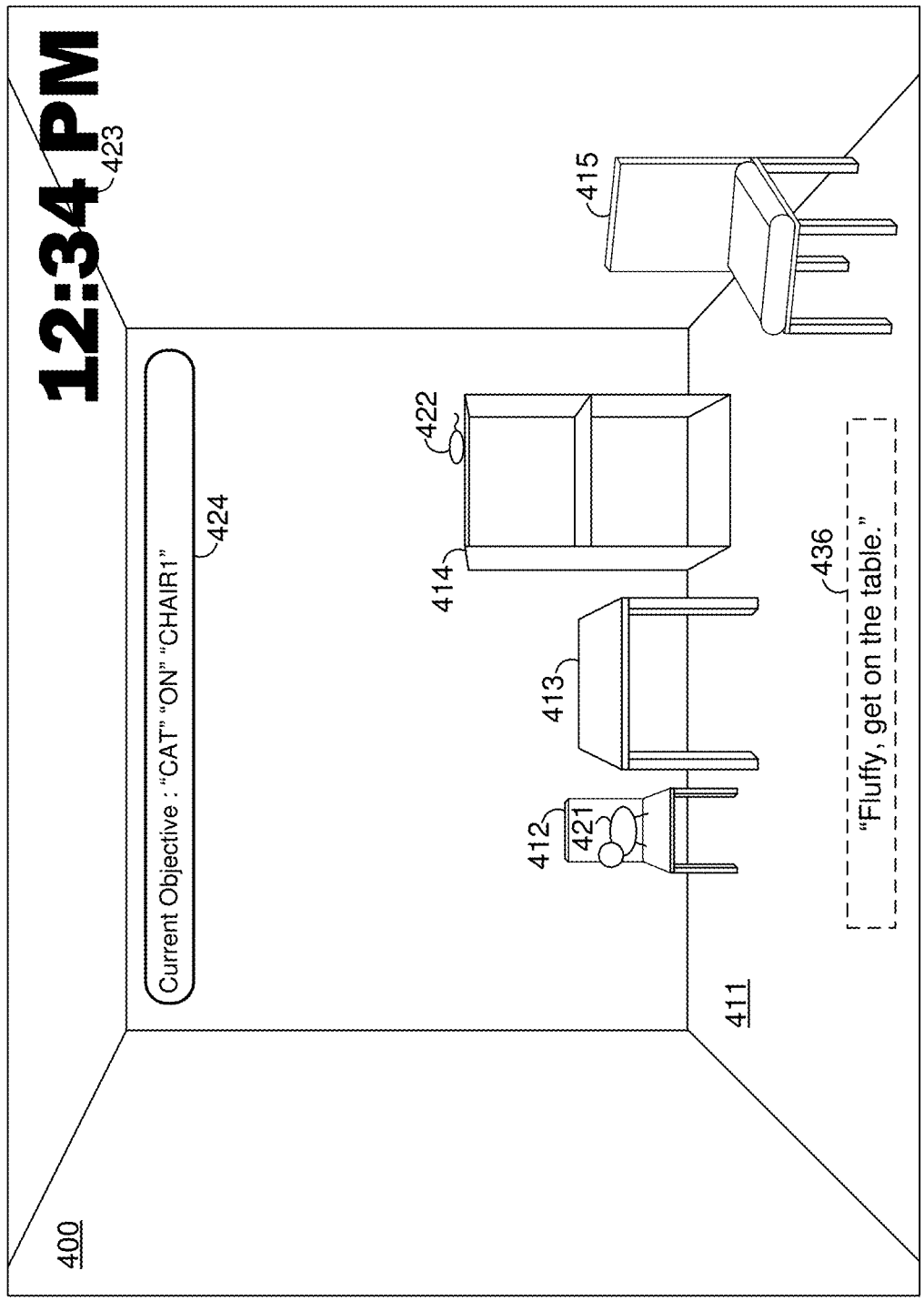
Figure 4L:
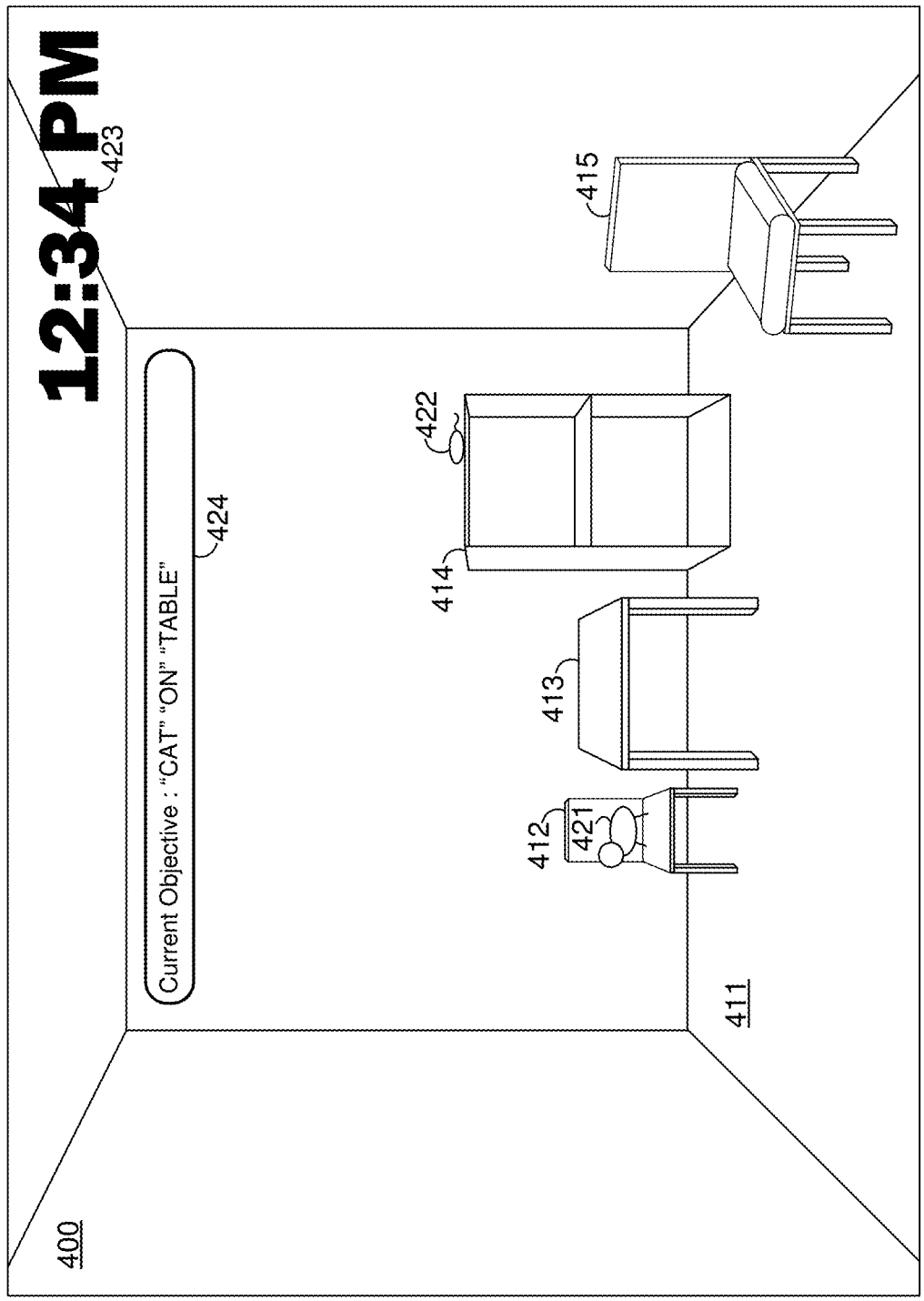
Figure 4M:
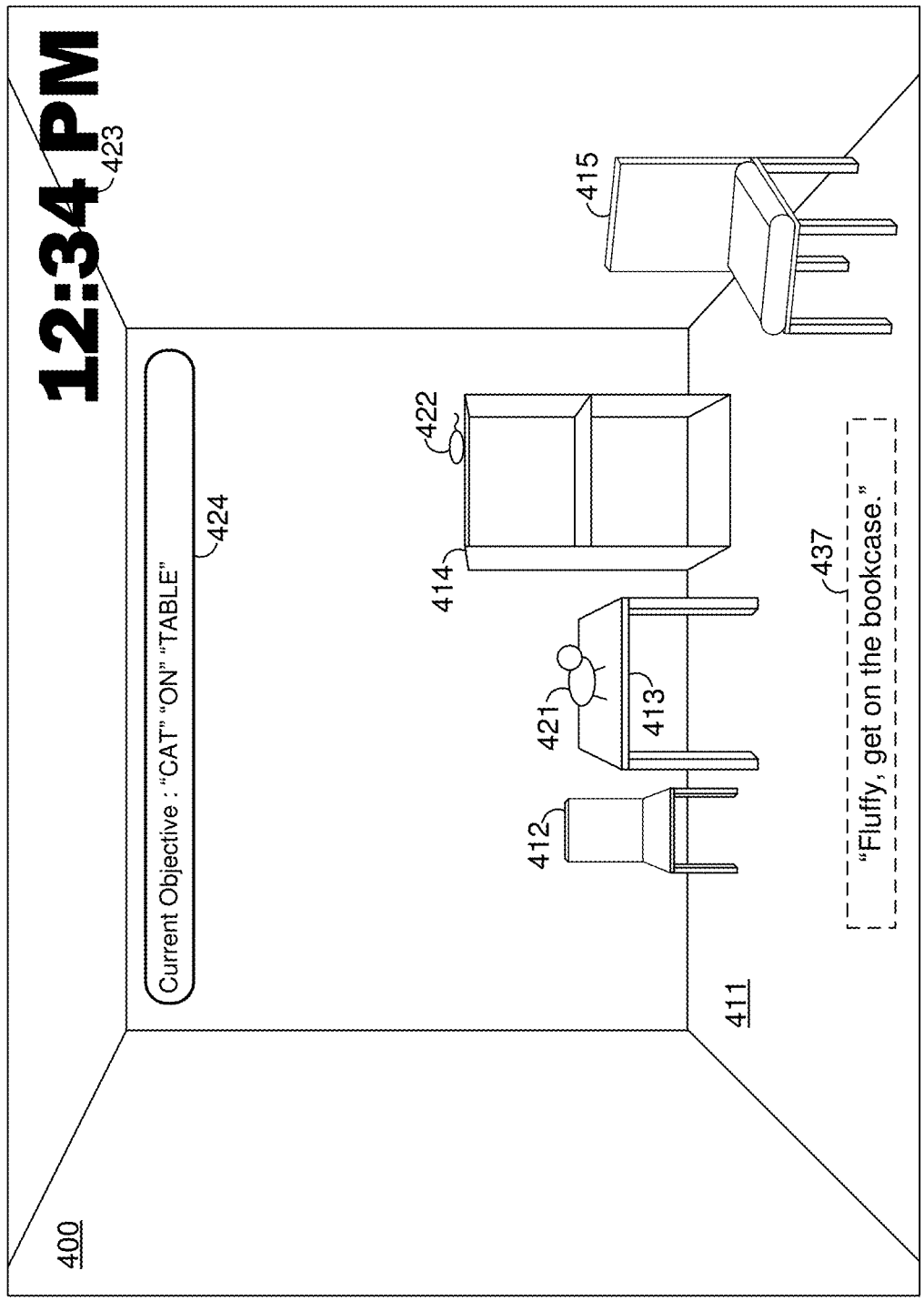
Figure 4N:
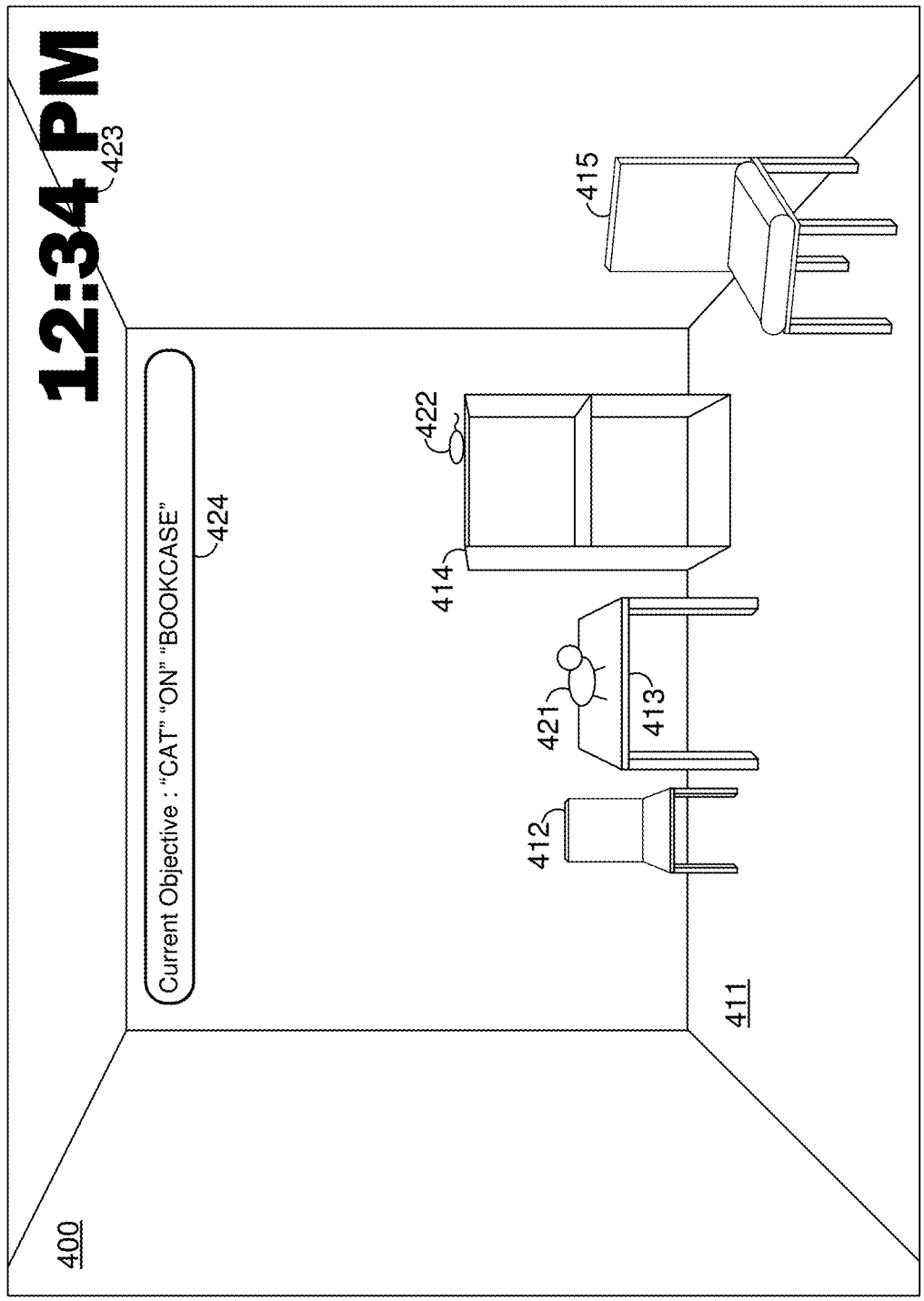
Figure 4O:
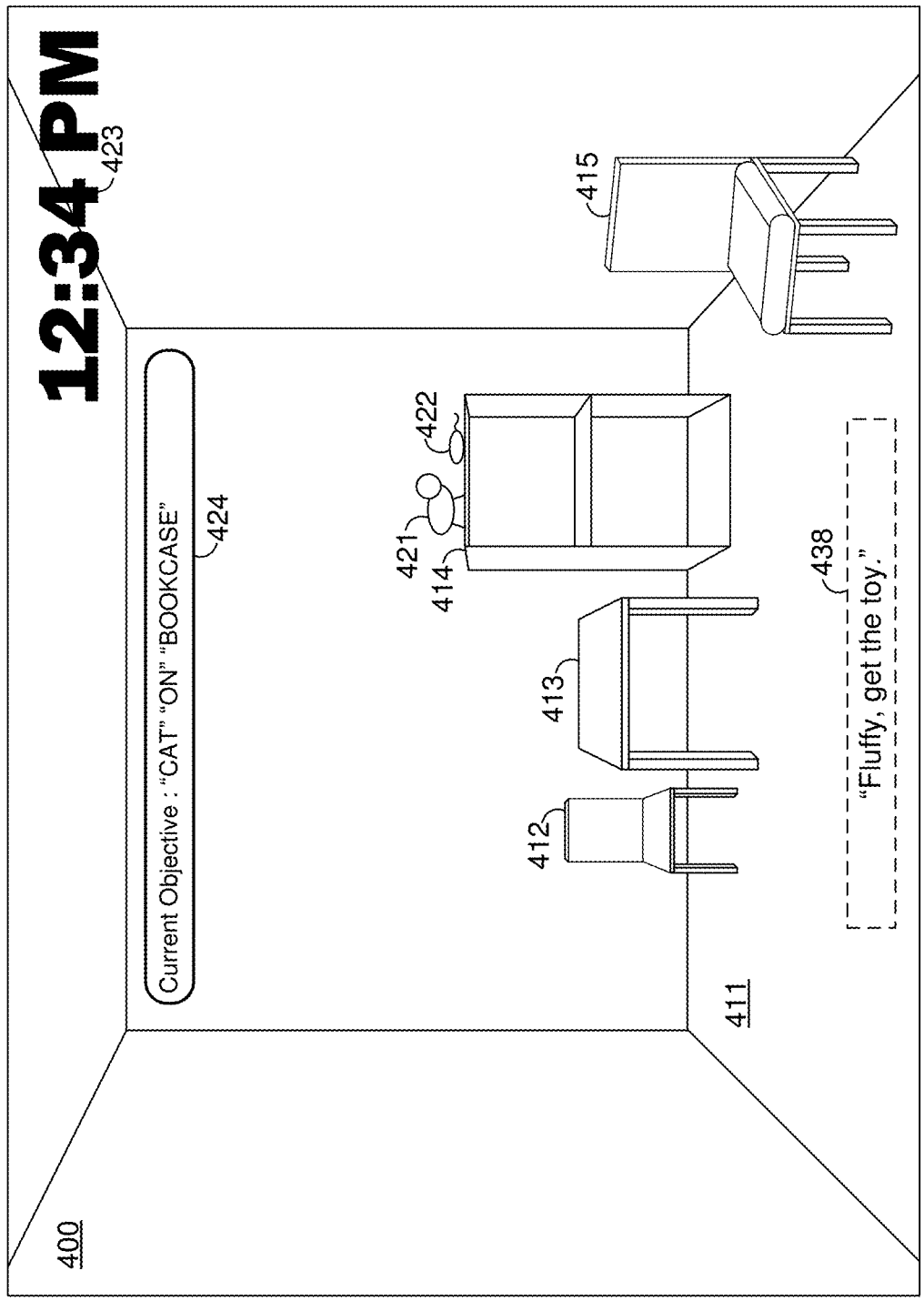
Figure 4P:
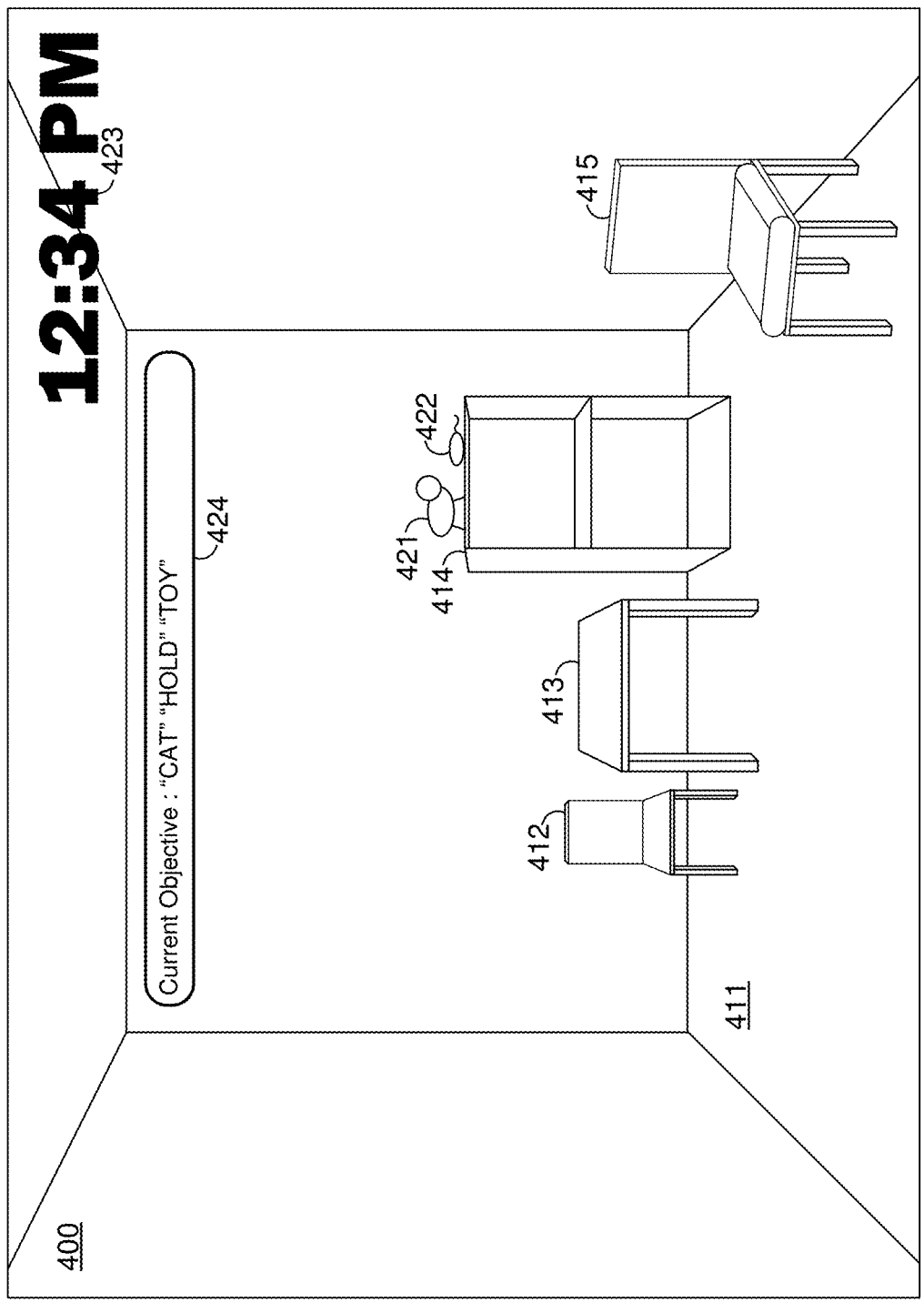
Figure 4Q:
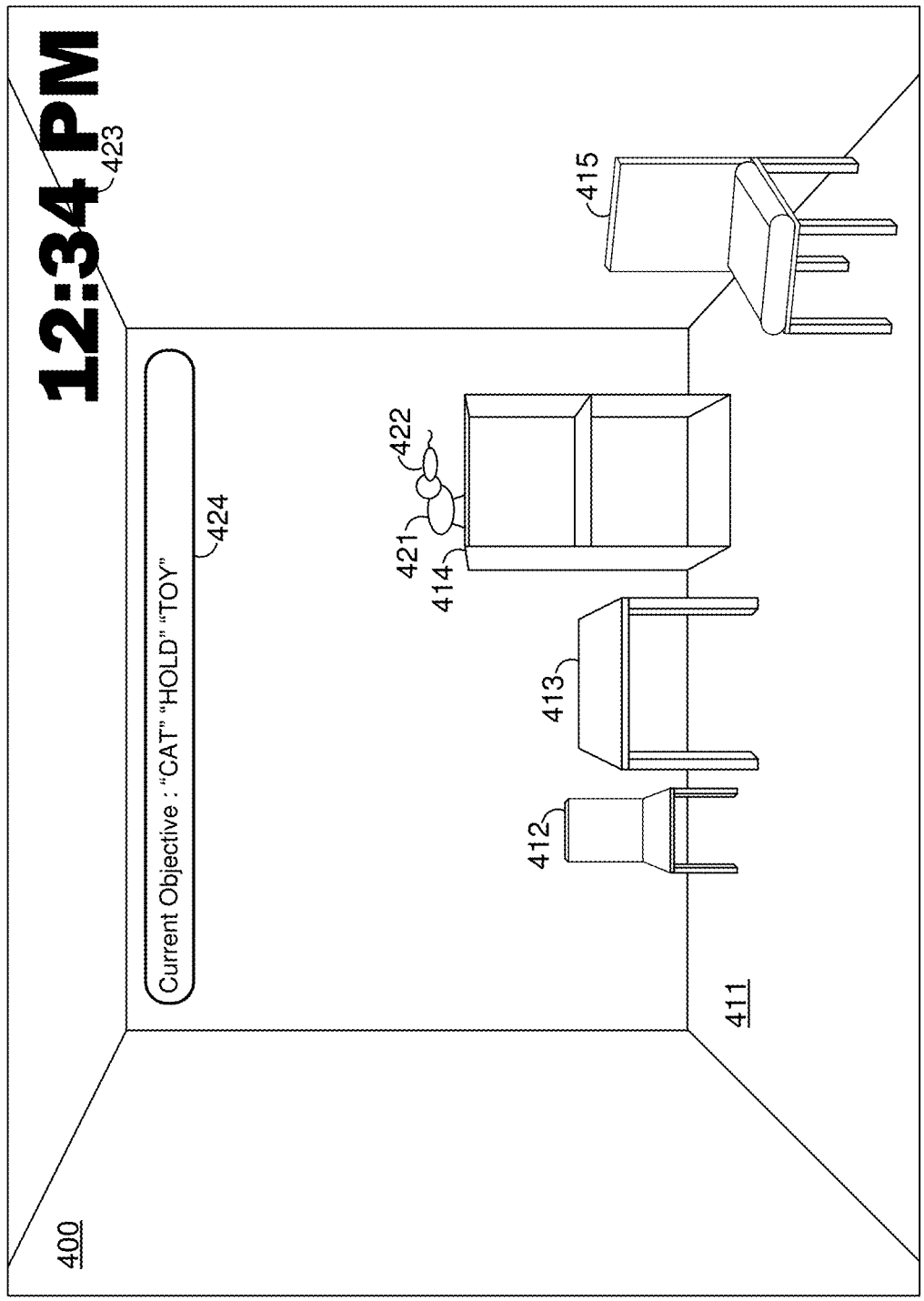
Figure 4R:
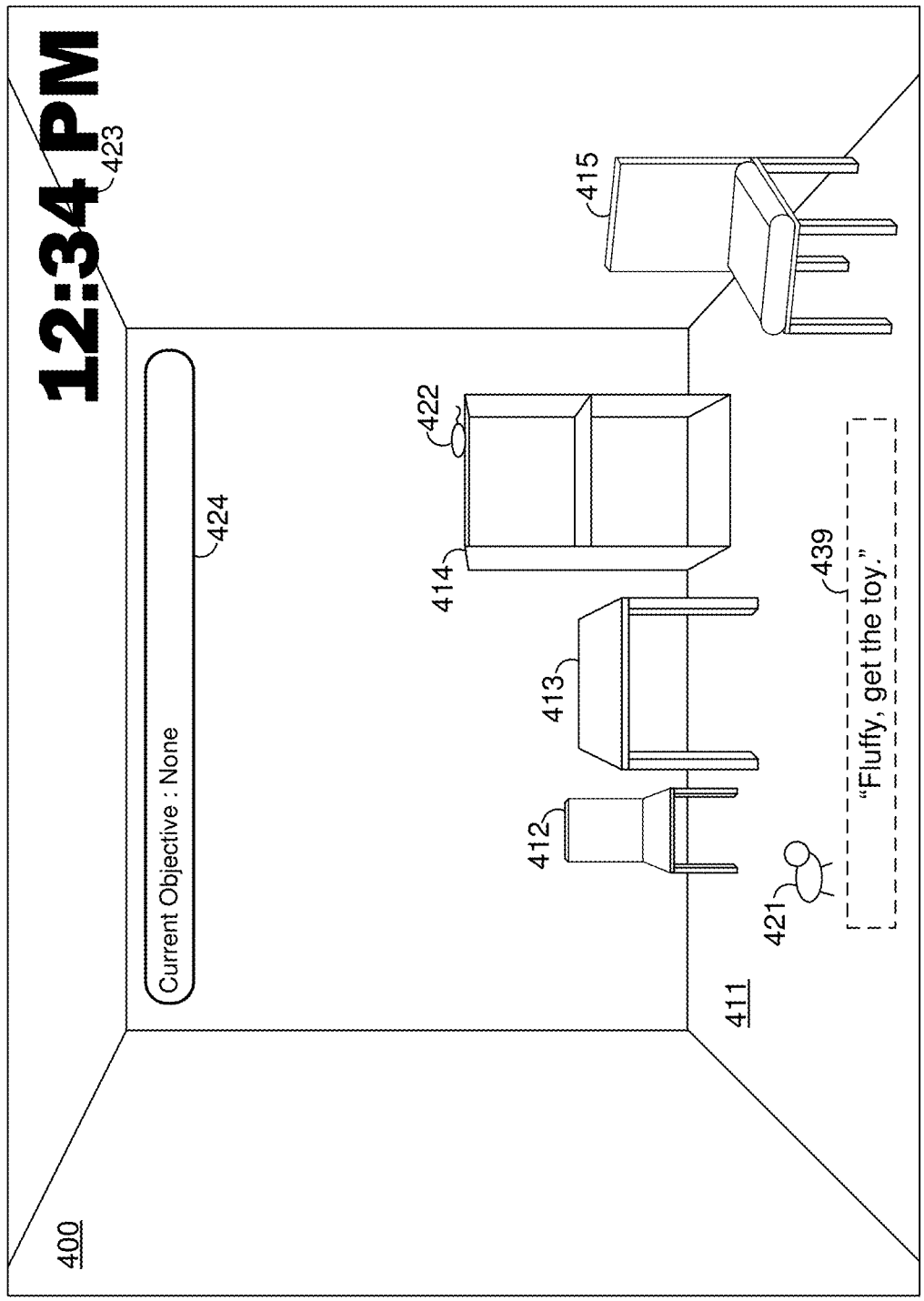
Figure 4T:
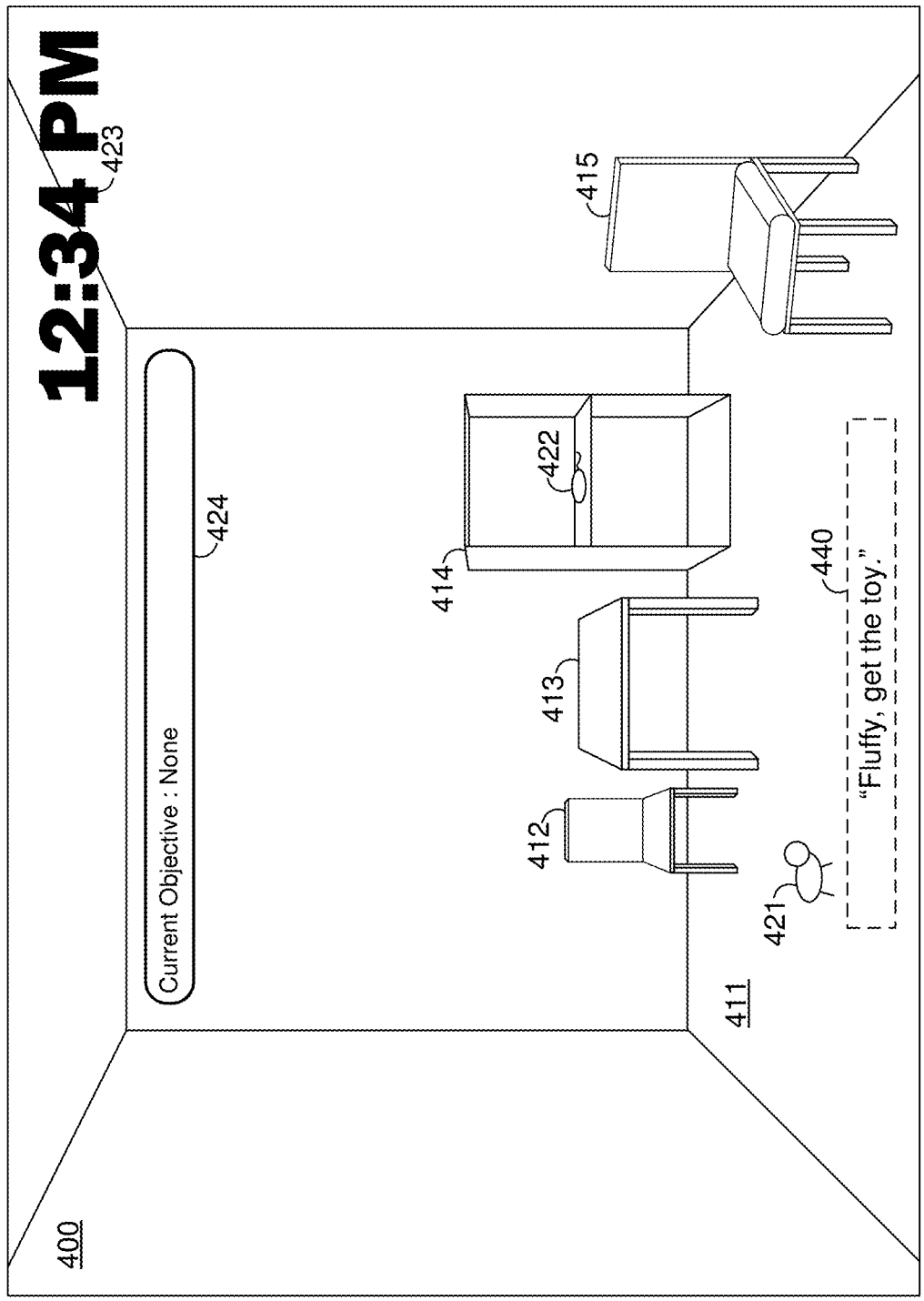
Figure 4U:
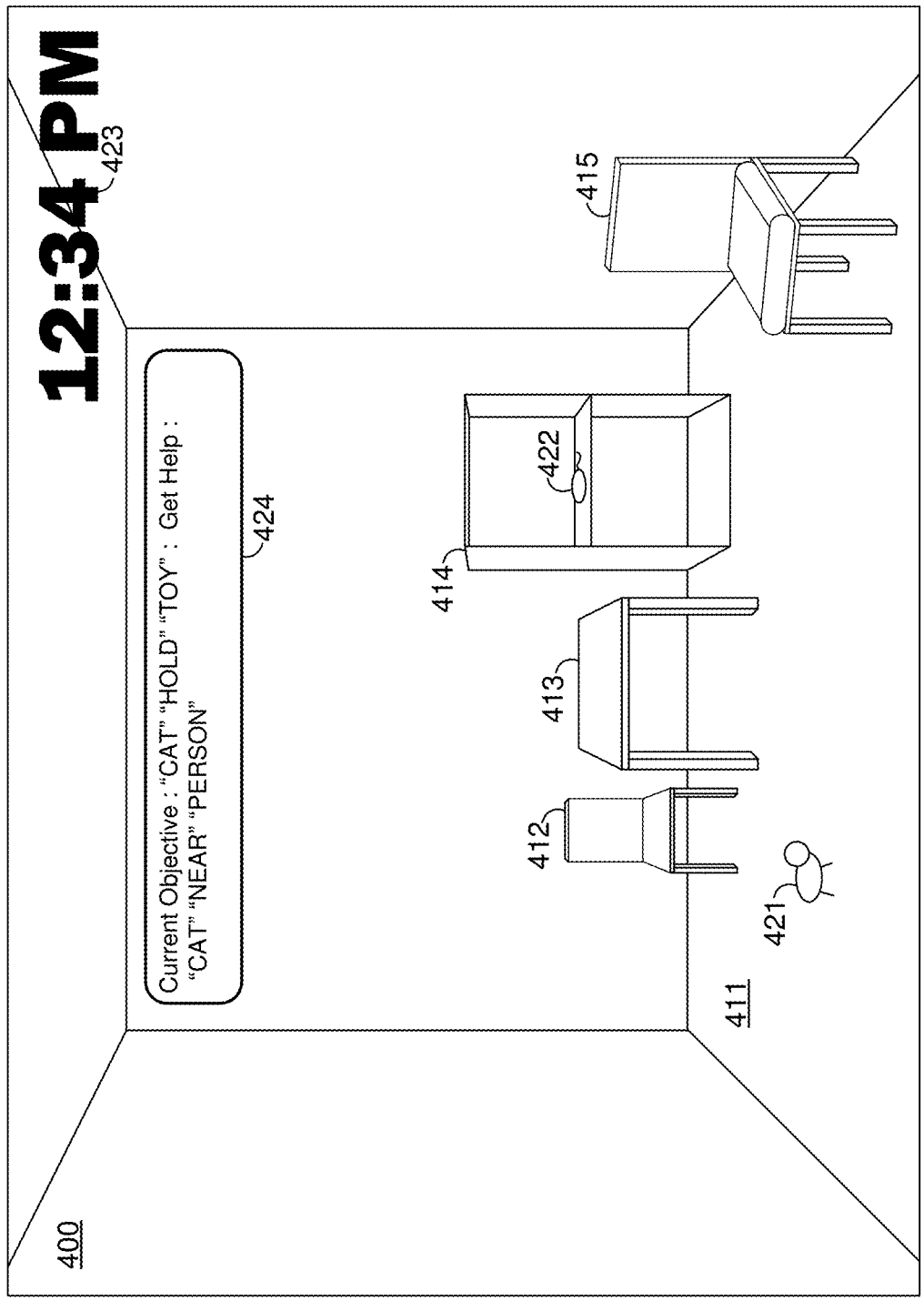
Figure 4V:
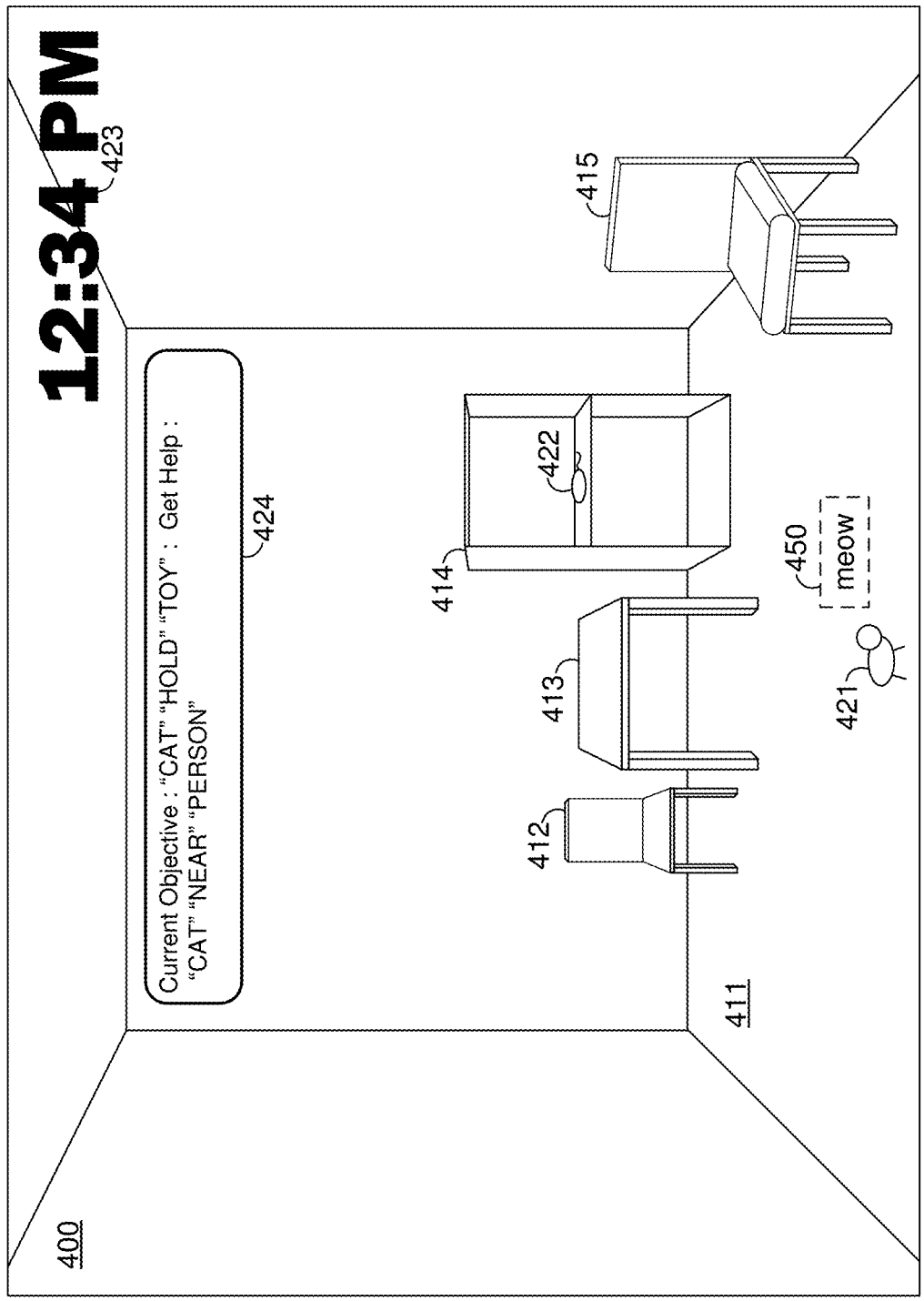

FIGS. 4A-4V illustrate an XR environment 400 displayed, at least in part, by a display of the electronic device. The XR environment 400 is based on a physical environment of a living room in which the electronic device is present. FIGS. 4A-4V illustrate the XR environment 400 during a series of time periods. In various implementations, each time period is an instant, a fraction of a second, a few seconds, a few hours, a few days, or any length of time.

The XR environment 400 includes a plurality of objects, including one or more physical objects (e.g., a floor 411, a wooden chair 412, a table 413, a bookcase 414, and a cushioned chair 415) of the physical environment and one or more virtual objects (e.g., a virtual cat 421, a virtual toy 422, a virtual clock 423, and an objective indicator 424). In various implementations, certain objects (such as the physical objects 411-415, the virtual cat 421, and the virtual toy 422) are displayed at a location in the XR environment 400, e.g., at a location defined by three coordinates in a three-dimensional (3D) XR coordinate system. Accordingly, when the electronic device moves in the XR environment 400 (e.g., changes either position and/or orientation), the objects are moved on the display of the electronic device, but retain their location in the XR environment 400. Such virtual objects that, in response to motion of the electronic device, move on the display, but retain their position in the XR environment are referred to as world-locked objects. In various implementations, certain virtual objects (such as the virtual clock 423 and the objective indicator 424) are displayed at locations on the display such that when the electronic device moves in the XR environment 400, the objects are stationary on the display on the electronic device. Such virtual objects that, in response to motion of the electronic device, retain their location on the display are referred to as head-locked objects or display-locked objects.

FIGS. 4A-4V illustrate an objective indicator 424 that indicates a current objective of the virtual cat 421. Although the objective indicator 424 is illustrated in FIGS. 4A-4V, in various implementations, the objective indicator 424 is not displayed by the electronic device. In various implementations, the objective indicator 424 is displayed by the electronic device when an application is executed in a debugging mode, but is not displayed by the electronic device when the application is not executed in the debugging mode.

FIG. 4A illustrates the XR environment 400 during a first time period. During the first time period, the electronic device displays the virtual cat 421 at a location on the floor 411 near the wooden chair 412 and displays the virtual toy 422 on the bookcase 414. During the first time period, the virtual cat 421 has no objective as indicated by the objective indicator 424.

The electronic device obtains a scene graph of the XR environment during the first time period. The scene graph indicates the objects in the environment and a set of spatial relationships between respective pairs of the objects. The scene graph can be represented, e.g., stored, by the electronic device in a number of ways. In various implementations, the floor 411 is represented by the label "FLOOR", the wooden chair 412 is represented by the label "CHAIR1", the table 413 is represented by the label "TABLE", the bookcase 414 is represented by the label "BOOKCASE", the cushioned chair 415 is represented by the label "CHAIR2", the virtual cat 421 is represented by the label "CAT", and the virtual toy 422 is represented by the label "TOY".

Thus, in various implementations, the scene graph of the XR environment during the first time period is represented by the following:
"FLOOR"
  "UNDER" "CHAIR1"
  "UNDER" "TABLE"
  "UNDER" "BOOKCASE"
  "UNDER" "CHAIR2"
"CHAIR1"
  "ON" "FLOOR"
  "NEAR" "TABLE"
  "NEAR" "CAT"
"TABLE"
  "ON" "FLOOR"
  "NEAR" "CHAIR1"
  "NEAR" "BOOKCASE"
"BOOKCASE"
  "ON" "FLOOR"
  "NEAR" "TABLE"
  "UNDER" "TOY"
"CHAIR2"
  "ON" "FLOOR"
"CAT"
  "ON" "FLOOR"
  "NEAR" "CHAIR1"
"TOY"
  "ON" "BOOKCASE"

Figure 5A:
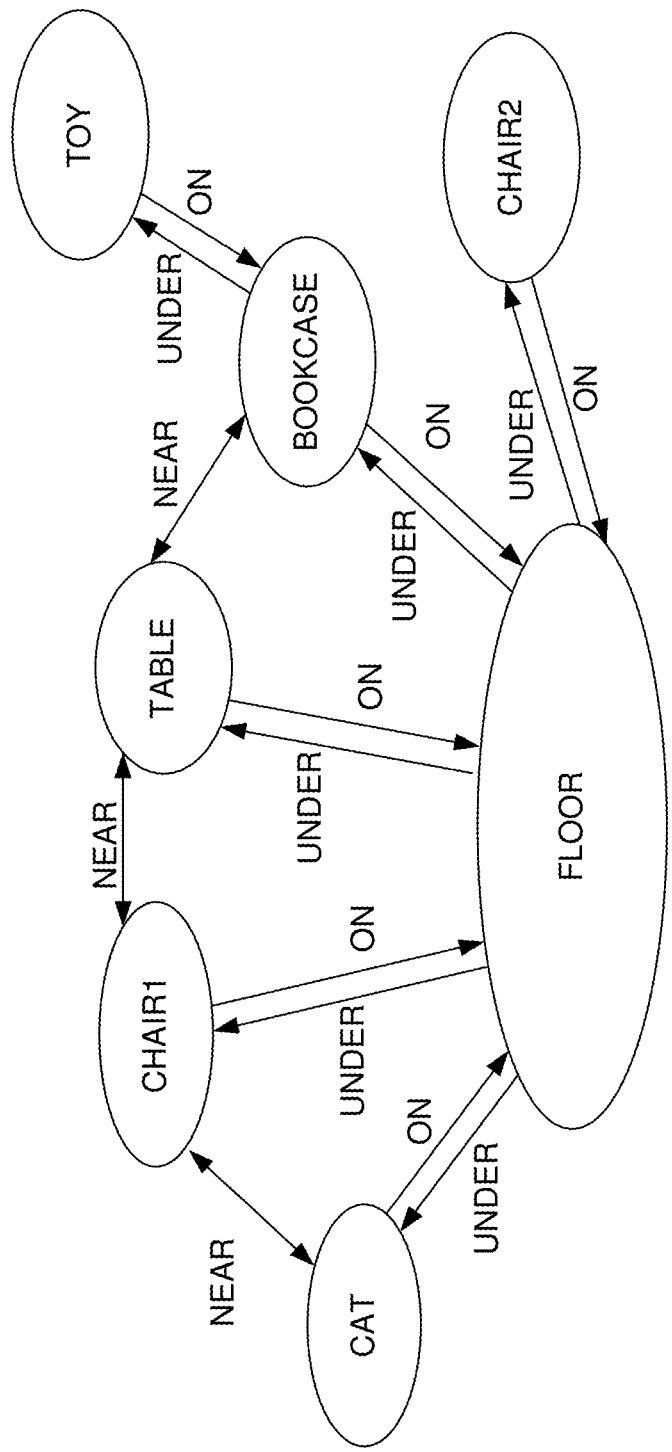
FIGS. 5A-5H illustrates scene graphs of the XR environment of FIGS. 4A-4V during various time periods in accordance with some implementations.

The scene graph of the XR environment during the first period can also be represented graphically as illustrated in FIG. 5A.

During the first time period, the electronic device receives a user input indicative of an objective for the virtual cat 421. In various implementations, the user input includes speech produced by the user. FIG. 4A illustrates a text representation of the speech 431 of the user input received during the first time period. Although the text representation of the speech 431 is shown in FIG. 4A for purposes of illustration, in various implementations, the text representation of the speech 431 is not displayed by the electronic device.

In particular, during the first time period, the electronic device receives a user request indicative of an objective for the virtual cat 421 to explore the XR environment 400.

FIG. 4B illustrates the XR environment 400 during a second time period subsequent to the first time period. During the second time period, in response to the user input indicative of an objective for the virtual cat 421 to explore the XR environment 400, the virtual cat 421 has an objective to explore the XR environment 400, as indicated by the objective indicator 424.

With an objective to explore the XR environment 400, the electronic device generates a plurality of potential sub-objectives corresponding to changes in the scene graph. Although the term "sub-objective" is used herein for objectives to achieve related objectives, it is to be appreciated that a "sub-objective" is an objective. For example, the potential sub-objectives include (1) move near the table 413, changing "CAT" "NEAR" "CHAIR1" to "CAT" "NEAR"

"TABLE", (2) move near the cushioned chair 415, changing "CAT" "NEAR" "CHAIR1" to "CAT" "NEAR" "CHAIR2", and (3) get on the wooden chair 412, changing "CAT" "ON" "FLOOR" to "CAT" "ON" "CHAIR1". In various implementations, each of the plurality of potential sub-objectives corresponds to a sub-objective the virtual cat 421 is capable of achieving. For example, the virtual cat 421 cannot get on the bookcase 414 from the floor 411 because the virtual cat 421 cannot jump that high. In particular, the virtual cat 421 is defined with a number of capabilities (e.g., walk up to a particular speed, run within a particular speed range, jump up to a particular height from a particular distance away, hold objects within a particular size range, etc.) and corresponding animations for demonstrating those capabilities. Accordingly, for example, the plurality of potential sub-objectives does not include (4) get on the bookcase 414, changing "CAT" "ON" "FLOOR" to "CAT" "ON" "BOOKCASE". Further, as another example, the plurality of potential sub-objectives does not include (5) get on the table 413, changing "CAT" "ON" "FLOOR" to "CAT" "ON" "TABLE" because the virtual cat 421 is not near the table 413.

With the objective to explore the XR environment 400, the electronic device selects one of the plurality of potential sub-objectives as a current sub-objective for the virtual cat. For example, the electronic device selects the sub-objective to move near the table 413 and, during the second time period, the virtual cat 421 has the sub-objective to move near the table 413 as indicated by the objective indicator 424.

Figure 5B:
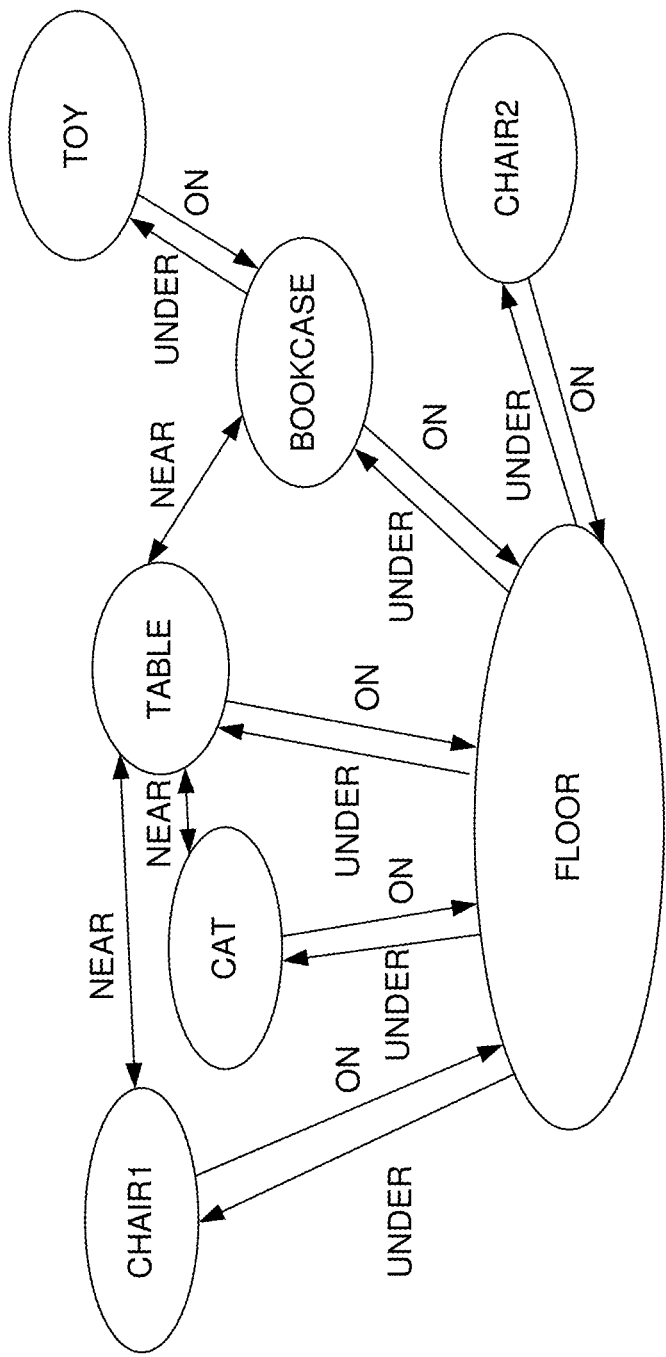

FIG. 4C illustrates the XR environment 400 during a third time period subsequent to the second time period. During the third time period, in accordance with the sub-objective to move near the table 413, the virtual cat 421 has moved away from the wooden chair 412 and is near the table 413. Thus, the scene graph of the XR environment 400 during the third time period differs from the scene graph of the XR environment 400 during the second time period in that the scene graph includes "CAT" "NEAR" "TABLE" rather than "CAT" "NEAR" "CHAIR1". FIG. 5B illustrates a representation of the scene graph of the XR environment 400 during the third time period.

During the third time period, the electronic device receives a user input indicative of a permission for a scene graph transition. In various implementations, the user input includes speech produced by the user. FIG. 4C illustrates a text representation of the speech 432 of the user input received during the third time period. Although the text representation of the speech 432 is shown in FIG. 4C for purposes of illustration, in various implementations, the text representation of the speech 432 is not displayed by the electronic device.

Thus, whereas the virtual cat 421 has the capability to move near the table 413, the user input indicates that the virtual cat 421 has permission to move near the table 413. In response to determining that the virtual cat 421 has the capability and permission to change the scene graph of the XR environment from a first set of spatial relationships to a second set of spatial relationships, the electronic device generates a transition couple indicative of a transition from the first set of spatial relationships to the second set of spatial relationships. For example, in response to determining that the virtual cat 421 has the capability and permission to change the scene graph from indicating a first set of spatial relationships including "CAT" "NEAR" "CHAIR1" and not including "CAT" "NEAR" "TABLE" to indicating a second set of spatial relationships not including "CAT" "NEAR" "CHAIR1" and including "CAT" "NEAR" "TABLE", the electronic device generates a transition couple indicating a transition between the first set of spatial relationships and the second set of spatial relationships. In various implementations, the electronic device determines that the virtual cat 421 has the capability in generating the plurality of sub-objectives and determines that the virtual cat 421 has permission based on the user input.

In various implementations, in response to receiving permission for a change in scene graph, the electronic device generates a plurality of sub-objectives for the virtual cat 421 based on the current scene graph and the capabilities of the virtual cat 421. For example, during the third time period, the plurality of sub-objectives could include a sub-objective to get on the table 413, as the virtual cat 421 is near enough to the table 413 to jump onto the table 413.

FIG. 4D illustrates the XR environment 400 during a fourth time period subsequent to the third time period. In response to receiving permission for the change in scene graph and generating the corresponding transition couple, the electronic device selects a new sub-objective for the virtual cat 421 based on the current objective to explore the XR environment 400. In particular, the electronic device selects a sub-objective to move near the cushioned chair 415, as indicated by the objective indicator 424.

Figure 5C:
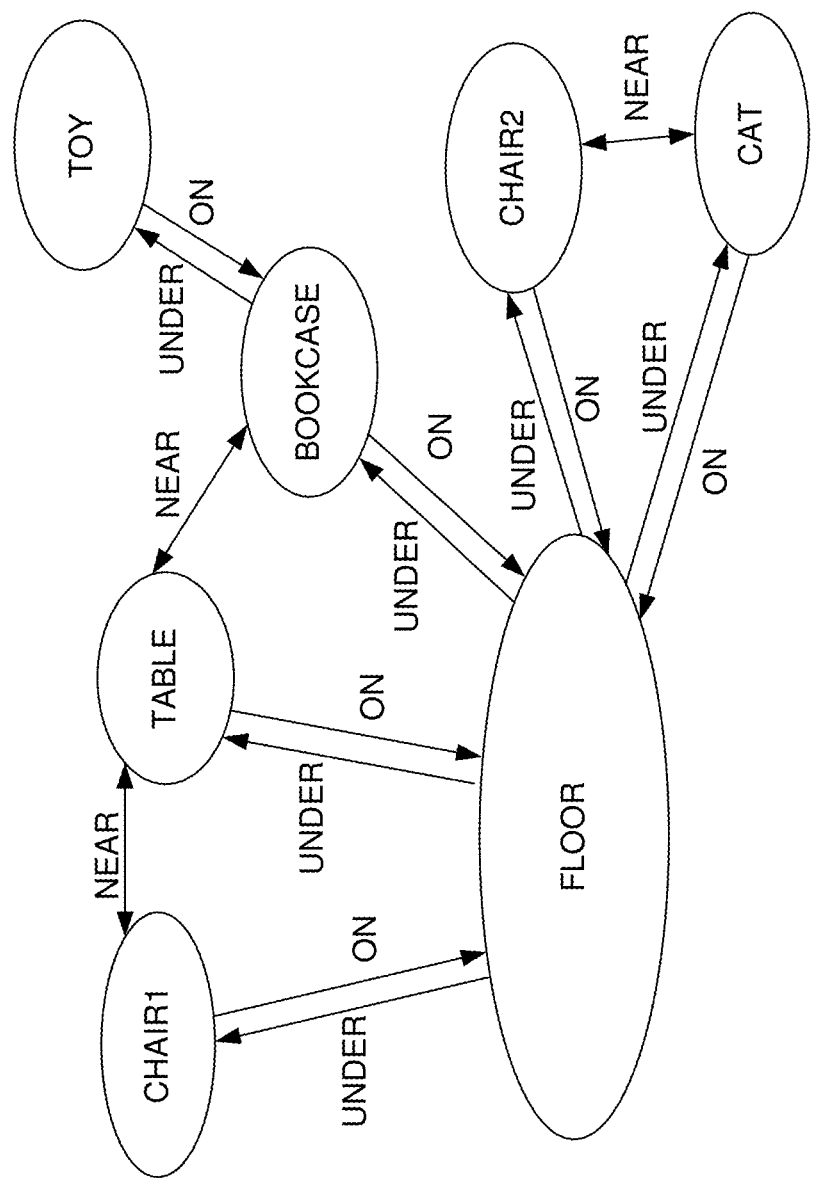

FIG. 4E illustrates the XR environment 400 during a fifth time period subsequent to the fourth time period. During the fifth time period, in accordance with the objective to move near the cushioned chair 415, the virtual cat 421 has moved away from the table 413 and is near the cushioned chair 415. Thus, the scene graph of the XR environment 400 during the fifth time period differs from the scene graph of the XR environment 400 during the fourth time period in that the scene graph includes "CAT" "NEAR" "CHAIR2" rather than "CAT" "NEAR" "TABLE". FIG. 5C illustrates a representation of the scene graph of the XR environment 400 during the fifth time period.

During the fifth time period, the electronic device receives a user input indicative of a permission for a scene graph transition. In various implementations, the user input includes speech produced by the user. FIG. 4E illustrates a text representation of the speech 433 of the user input received during the fifth time period. Although the text representation of the speech 433 is shown in FIG. 4E for purposes of illustration, in various implementations, the text representation of the speech 433 is not displayed by the electronic device.

In response to determining that the virtual cat 421 has the capability and permission to change the scene graph from indicating the set of spatial relationships including "CAT" "NEAR" "TABLE" and not including "CAT" "NEAR" "CHAIR2" to indicating a second set of spatial relationships not including "CAT" "NEAR" "TABLE" and including "CAT" "NEAR" "CHAIR2", the electronic device generates a transition couple indicating a transition between those sets of spatial relationships.

FIG. 4F illustrates the XR environment 400 during a sixth time period subsequent to the fifth time period. In response to receiving permission for the change in scene graph and generating the corresponding transition couple, the electronic device selects a new sub-objective for the virtual cat 421 based on the current objective to explore the XR environment 400. In particular, the electronic device selects a sub-objective to get on the cushioned chair 415, as indicated by the objective indicator 424.

Figure 5D:
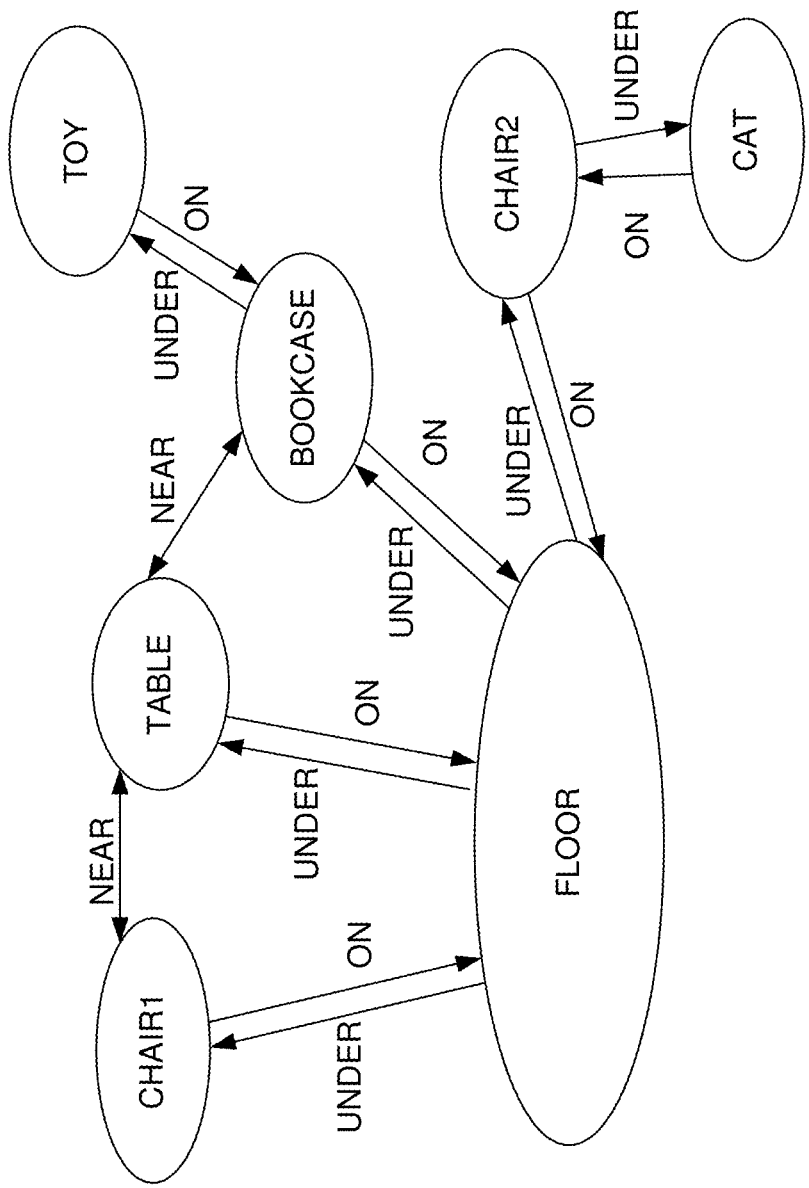

FIG. 4G illustrates the XR environment 400 during a seventh time period subsequent to the sixth time period. During the seventh time period, in accordance with the sub-objective to get on the cushioned chair 415, the virtual cat 421 has jumped onto the cushioned chair 415. Thus, the scene graph of the XR environment 400 during the seventh time period differs from the scene graph of the XR environment 400 during the sixth time period in that the scene graph includes "CAT" "ON" "CHAIR2" rather than "CAT" "NEAR" "CHAIR2" and "CAT" "ON" "FLOOR". FIG. 5D illustrates a representation of the scene graph of the XR environment 400 during the seventh time period.

During the seventh time period, the electronic device receives a user input indicative of a refusal of permission for a scene graph transition. In various implementations, the user input includes speech produced by the user. FIG. 4G illustrates a text representation of the speech 434 of the user input received during the seventh time period. Although the text representation of the speech 434 is shown in FIG. 4G for purposes of illustration, in various implementations, the text representation of the speech 434 is not displayed by the electronic device.

In response to determining that the virtual cat 421 has the capability, but not permission to change the scene graph to indicate a set of spatial relationships including "CAT" "ON" "CHAIR2", the electronic device forgoes generating a transition couple indicating a transition to that set of spatial relationships. Rather, in various implementations, the electronic device stores an indication that "CAT" "ON" "CHAIR2" is an impermissible sub-objective.

FIG. 4H illustrates the XR environment 400 during an eighth time period subsequent to the seventh time period. In response to receiving the refusal for permission for the change in scene graph and forgoing generating the corresponding transition couple, the electronic device selects a new sub-objective for the virtual cat 421 from among sub-objectives not indicated as impermissible based on the current objective to explore the XR environment 400. In particular, the electronic device selects a sub-objective to get off the cushioned chair 415 onto the floor 411, as indicated by the objective indicator 424.

FIG. 4I illustrates the XR environment 400 during a ninth time period subsequent to the eighth time period. In accordance with the sub-objective to get on the floor 411, the virtual cat 421 has jumped off of the cushioned chair 415. Thus, the scene graph of the XR environment 400 during the ninth time period is the same as during the fifth time period as illustrated in FIG. 5C.

In response to achieving the sub-objective to get on the floor 411, the electronic device selects a new sub-objective for the virtual cat 421 based on the current objective to explore the XR environment 400. In particular, the electronic device selects a sub-objective to move near the wooden chair 412, as indicated by the objective indicator 424.

During the ninth time period, the electronic device receives a user input indicative of an objective for the virtual cat 421 to get on the wooden chair 412. In various implementations, the user input includes speech produced by the user. FIG. 4I illustrates a text representation of the speech 435 of the user input received during the ninth time period. Although the text representation of the speech 435 is shown in FIG. 4I for purposes of illustration, in various implementations, the text representation of the speech 435 is not displayed by the electronic device.

FIG. 4J illustrates the XR environment 400 during a tenth time period subsequent to the ninth time period. Based on the user input, during the tenth time period, the objective of the virtual cat has changed from exploring the XR environment 400 to getting on the wooden chair 412, as indicated by the objective indicator 424.

Figure 5E:
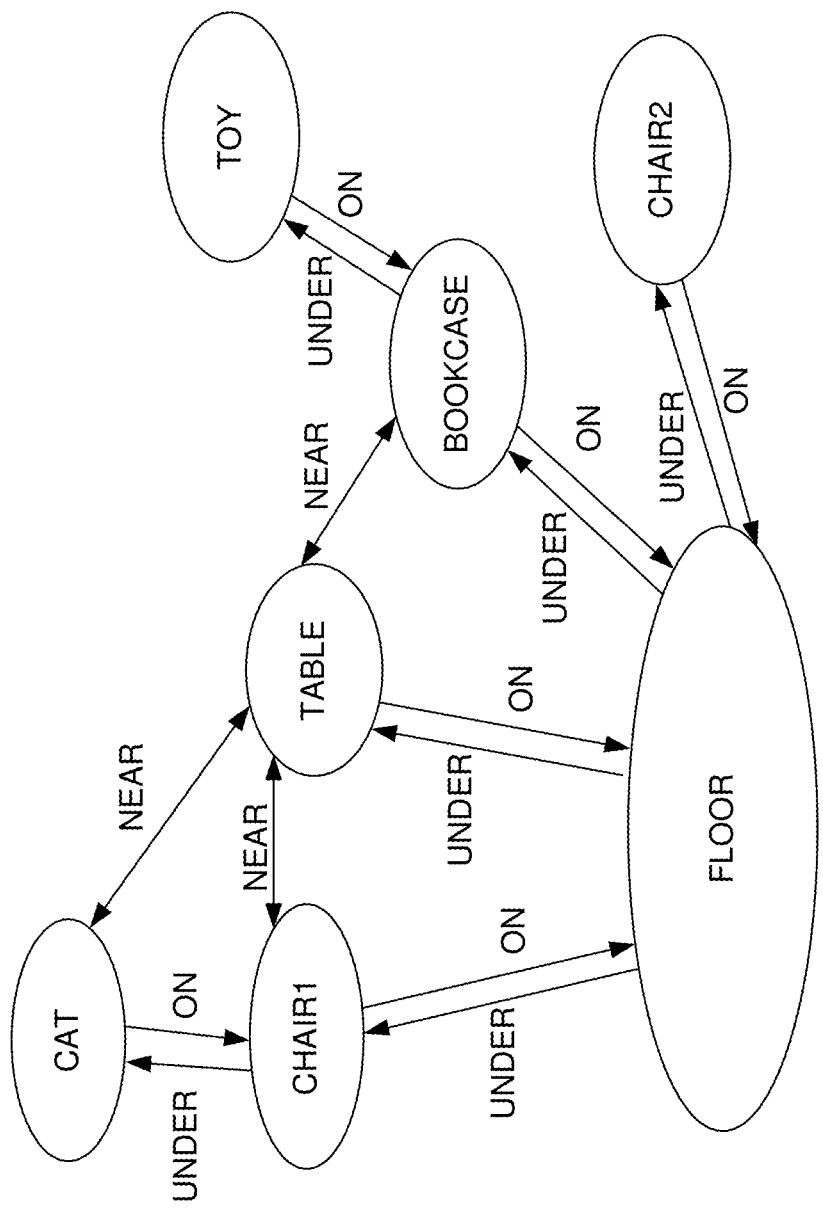

FIG. 4K illustrates the XR environment 400 during an eleventh time period subsequent to the tenth time period. During the eleventh time period, in accordance with the objective to get on the wooden chair 412, the virtual cat has jumped onto the wooden chair 412. Thus, the scene graph of the XR environment 400 during the eleventh time period differs from the scene graph of the XR environment 400 during the tenth time period in that the scene graph includes "CAT" "ON" "CHAIR1" rather than "CAT" "ON" "FLOOR". FIG. 5E illustrates a representation of the scene graph of the XR environment 400 during the eleventh time period.

In response to determining that the virtual cat 421 has the capability and permission to change the scene graph from indicating the set of spatial relationships including "CAT" "ON" "FLOOR" and not including "CAT" "ON" "CHAIR1" to indicating the set of spatial relationships not including "CAT" "ON" "FLOOR" and including "CAT" "ON" "CHAIR1", the electronic device generates a transition couple indicating a transition between those sets of spatial relationships. The electronic device determines that the virtual cat 421 has the capability based on achieving the objective and determines that the virtual cat 421 has permission based on the user input providing the objective. Thus, receiving a user command to achieve an objective implies permission to achieve the objective.

During the eleventh time period, the electronic device receives a user input indicative of an objective for the virtual cat 421 to get on the table 413. In various implementations, the user input includes speech produced by the user. FIG. 4K illustrates a text representation of the speech 436 of the user input received during the eleventh time period. Although the text representation of the speech 436 is shown in FIG. 4K for purposes of illustration, in various implementations, the text representation of the speech 436 is not displayed by the electronic device.

FIG. 4L illustrates the XR environment 400 during a twelfth time period subsequent to the eleventh time period. Based on the user input, during the twelfth time period, the objective of the virtual cat has changed from being on the wooden chair 412 to getting on the table 413, as indicated by the objective indicator 424.

Figure 5F:
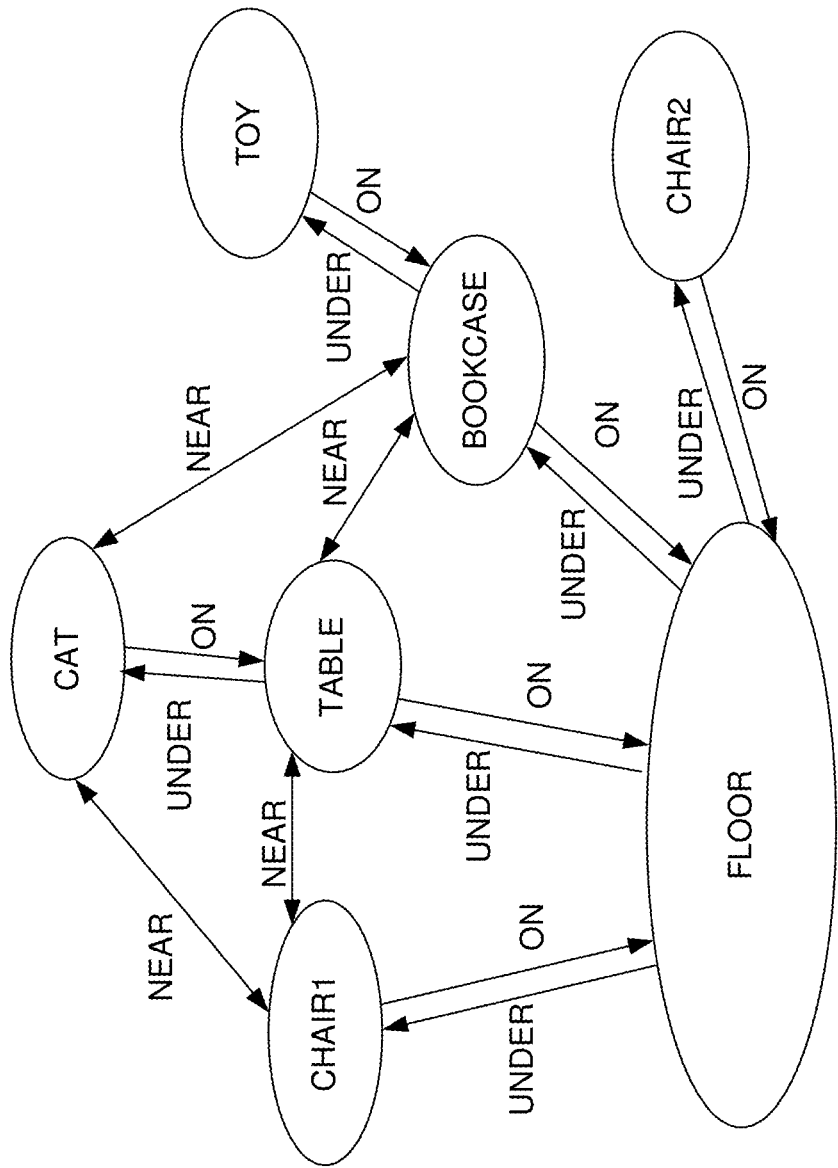

FIG. 4M illustrates the XR environment 400 during a thirteenth time period subsequent to the twelfth time period. During the thirteenth time period, in accordance with the objective to get on the table 413, the virtual cat has jumped onto the table 413. Thus, the scene graph of the XR environment 400 during the thirteenth time period differs from the scene graph of the XR environment 400 during the twelfth time period in that the scene graph includes "CAT" "ON" "TABLE" rather than "CAT" "ON" "CHAIR1". FIG. 5F illustrates a representation of the scene graph of the XR environment 400 during the thirteenth time period.

In response to determining that the virtual cat 421 has the capability and permission to change the scene graph from indicating the set of spatial relationships including "CAT" "ON" "CHAIR1" and not including "CAT" "ON" "TABLE" to indicating the set of spatial relationships not including "CAT" "ON" "CHAIR1" and including "CAT" "ON" "TABLE", the electronic device generates a transition couple indicating a transition between those sets of spatial relationships. The electronic device determines that the virtual cat 421 has the capability based on achieving the objective and determines that the virtual cat 421 has permission based on the user input providing the objective.

During the thirteenth time period, the electronic device receives a user input indicative of an objective for the virtual cat 421 to get on the bookcase 414. In various implementations, the user input includes speech produced by the user. FIG. 4M illustrates a text representation of the speech 437 of the user input received during the thirteenth time period. Although the text representation of the speech 437 is shown in FIG. 4M for purposes of illustration, in various implementations, the text representation of the speech 437 is not displayed by the electronic device.

FIG. 4N illustrates the XR environment 400 during a fourteenth time period subsequent to the thirteenth time period. Based on the user input, during the fourteenth time period, the objective of the virtual cat has changed from being on the table 413 to getting onto the bookcase 414, as indicated by the objective indicator 424.

Figure 5G:
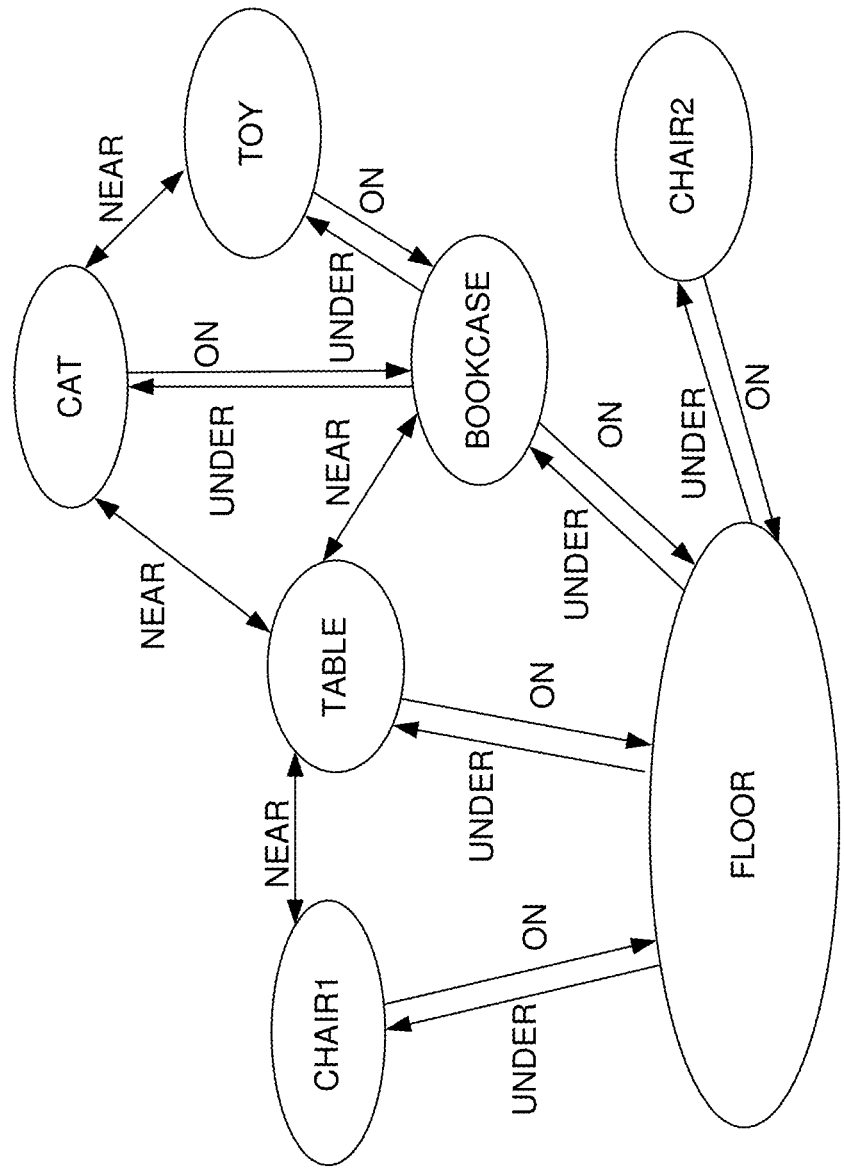

FIG. 4O illustrates the XR environment 400 during a fifteenth time period subsequent to the fourteenth time period. During the fifteenth time period, in accordance with the objective to get on the bookcase 414, the virtual cat 421 has jumped onto the bookcase 414. Thus, the scene graph of the XR environment 400 during the fifteenth time period differs from the scene graph of the XR environment 400 during the fourteenth time period in that the scene graph includes "CAT" "ON" "BOOKCASE" rather than "CAT" "ON" "TABLE". FIG. 5G illustrates a representation of the scene graph of the XR environment 400 during the fifteenth time period.

In response to determining that the virtual cat 421 has the capability and permission to change the scene graph from indicating the set of spatial relationships including "CAT" "ON" "TABLE" and not including "CAT" "ON" "BOOK-CASE" to indicating the set of spatial relationships not including "CAT" "ON" "TABLE" and including "CAT" "ON" "BOOKCASE", the electronic device generates a transition couple indicating a transition between those sets of spatial relationships. The electronic device determines that the virtual cat 421 has the capability based on achieving the objective and determines that the virtual cat 421 has permission based on the user input providing the objective.

During the fifteenth time period, the electronic device receives a user input indicative of an objective for the virtual cat 421 to hold the virtual toy 422. In various implementations, the user input includes speech produced by the user. FIG. 4O illustrates a text representation of the speech 438 of the user input received during the fifteenth time period. Although the text representation of the speech 438 is shown in FIG. 4O for purposes of illustration, in various implementations, the text representation of the speech 438 is not displayed by the electronic device.

FIG. 4P illustrates the XR environment 400 during a sixteenth time period subsequent to the fifteenth time period. Based on the user input, during the sixteenth time period, the objective of the virtual cat 421 has changed from being on the bookcase 414 to holding the virtual toy 422, as indicated by the objective indicator 424.

Figure 5H:
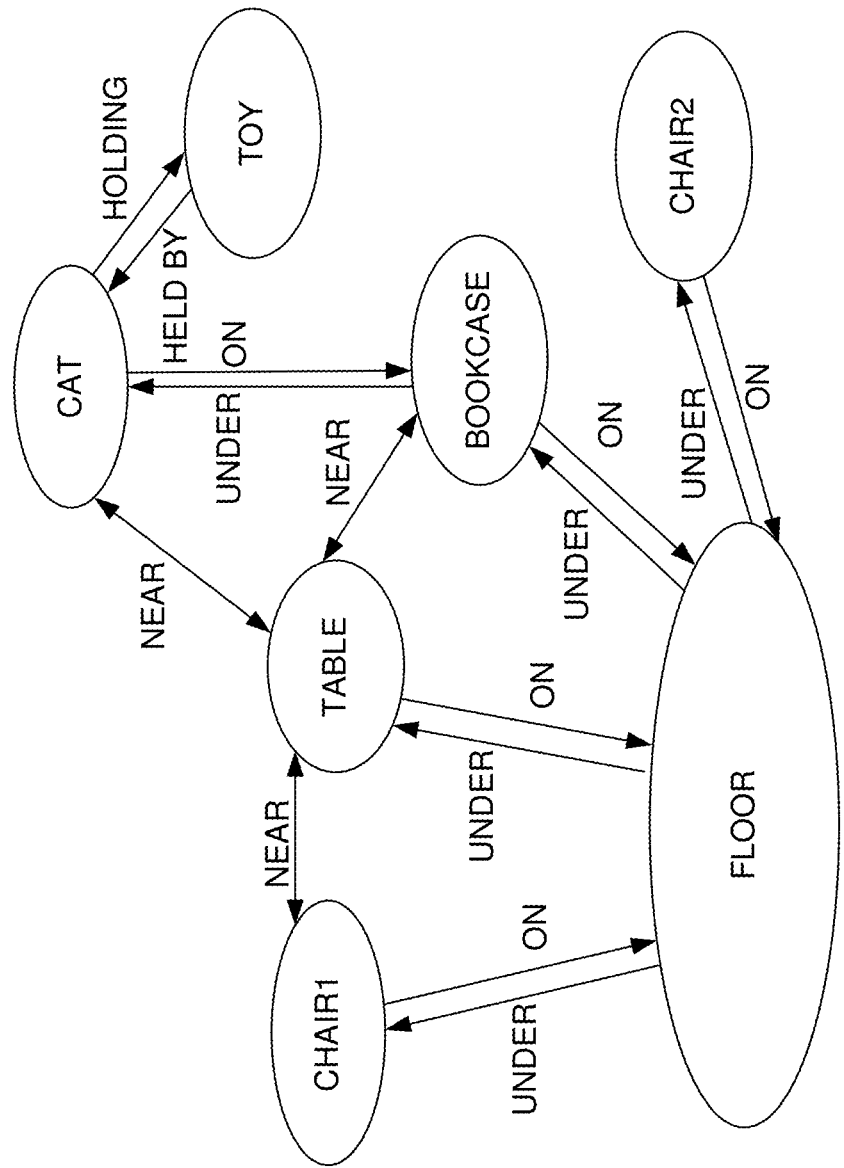

FIG. 4Q illustrates the XR environment 400 during a seventeenth time period subsequent to the sixteenth time period. During the seventeenth time period, in accordance with the objective to hold the virtual toy 422, the virtual cat 421 has obtained and is holding the virtual toy 422. Thus, the scene graph of the XR environment 400 during the seventeenth time period differs from the scene graph of the XR environment 400 during the sixteenth time period in that the scene graph includes "CAT" "HOLDING" "TOY" rather than "CAT" "NEAR" "TOY". FIG. 5H illustrates a representation of the scene graph of the XR environment 400 during the seventeenth time period.

In response to determining that the virtual cat 421 has the capability and permission to change the scene graph from indicating the set of spatial relationships including "CAT" "NEAR" "TOY" and not including "CAT" "HOLDING" "TOY" to indicating the set of spatial relationships not including "CAT" "NEAR" "TOY" and including "CAT" "HOLDING" "TOY", the electronic device generates a transition couple indicating a transition between those sets of spatial relationships. The electronic device determines that the virtual cat 421 has the capability based on achieving the objective and determines that the virtual cat 421 has permission based on the user input providing the objective.

FIG. 4R illustrates the XR environment 400 during an eighteenth time period subsequent to the seventeenth time period. Between the eighteenth time period and the seventeenth time period, the virtual cat 421 has moved to the floor 411 near the wooden chair 412 and has exhausted all objectives, as indicated by the objective indicator 424.

During the eighteenth time period, the electronic device receives a user input indicative of an objective for the virtual cat 421 to hold the virtual toy 422. In various implementations, the user input includes speech produced by the user. FIG. 4R illustrates a text representation of the speech 439 of the user input received during the fifteenth time period. Although the text representation of the speech 439 is shown in FIG. 4R for purposes of illustration, in various implementations, the text representation of the speech 439 is not displayed by the electronic device.

FIGS. 4S1-4S5 illustrates the XR environment 400 during a nineteenth time period subsequent to the eighteenth time period. During the nineteenth time period, based on the user input, the virtual cat 421 has an objective to hold the virtual toy 422. However, because the virtual cat 421 is not initially near the virtual toy 422, the electronic device generates intermediate sub-objectives to be achieved in order to achieve the objective to hold the virtual toy 421. In particular, the intermediate sub-objectives correspond to changes in the scene graph based on the transition couples generated in the earlier time periods.

To achieve the objective to hold to the virtual toy 422, the virtual cat 421 must be near the virtual toy 422. In various implementations, the electronic device performs a pathfinding algorithm with respect to three-dimensional coordinates in the XR environment to determine a path from the current location of the virtual cat 421 to a location near the virtual toy 422. However, in a significant savings of computational resources, in various implementations, the electronic device performs a pathfinding algorithm with respect to the generated transition couples. Thus, the electronic device determines a path from a current set of spatial relationships to a final set of spatial relationships including a spatial relationship including the virtual cat 421 holding the virtual toy 422, wherein each step along the path corresponds to a generated transition couple.

For example, the electronic device identifies a first transition couple including a first set of spatial relationships including "CAT" "ON" "FLOOR" and "CAT" "NEAR" "CHAIR1" to a second set of spatial relationships including "CAT" "ON" "CHAIR1", e.g., as may be generated during the eleventh time period illustrated in FIG. 4K. Further, the electronic device identifies a second transition couple including a first set of spatial relationships including "CAT" "ON" "CHAIR1" to a second set of spatial relationships including "CAT" "ON" "TABLE", e.g., as may be generated during the thirteenth time period illustrated in FIG. 4M.

Further, the electronic device identifies a third transition couple including a first set of spatial relationships including "CAT" "ON" "TABLE" to a second set of spatial relationships including "CAT" "ON" "BOOKCASE" and "CAT" "NEAR" "TOY", e.g., as may have been generated during the fifteenth time period illustrated in FIG. 4O. Finally, the electronic device identifies a fourth transition couple including a first set of spatial relationships including "CAT" "ON" "BOOKCASE" and "CAT" "NEAR" "TOY" to a second set of spatial relationships including "CAT" "HOLDING" "TOY", e.g., as may have been generated during the seventeenth time period illustrated in FIG. 4Q.

FIG. 4S1 illustrates the XR environment 400 during a first portion of the nineteenth time period. During the first portion, the virtual cat 421 is on the floor 411, near the wooden chair 412, and has a sub-objective to get on the wooden chair 412. FIG. 4S2 illustrates the XR environment 400 during a second portion of the nineteenth time period. During the second portion, the virtual cat 421 is on the wooden chair 412 and has a sub-objective to get on the table 413. FIG. 4S3 illustrates the XR environment 400 during a third portion of the nineteenth time period. During the third portion, the virtual cat 421 is on the table 413 and has a sub-objective to get on the bookcase 414. FIG. 4S4 illustrates the XR environment 400 during a fourth portion of the nineteenth time period. During the fourth portion, the virtual cat 421 is on the bookcase 414 and has no sub-objective. FIG. 4S5 illustrates the XR environment 400 during a fifth portion of the nineteenth time period. During the fifth portion, the virtual cat 421 is on the bookcase 414 and is holding the virtual toy 422.

FIG. 4T illustrates the XR environment 400 during a twentieth time period subsequent to the nineteenth time period. Between the nineteenth time period and the twentieth time period, the virtual cat 421 has moved to the floor 411 near the wooden chair 412 and has exhausted all objectives, as indicated by the objective indicator 424. Further, between the nineteenth time period and the twentieth time period, the virtual toy 422 has moved from on top of the bookcase 414 to a shelf of the bookcase 414.

During the twentieth time period, the electronic device receives a user input indicative of an objective for the virtual cat 421 to hold the virtual toy 422. In various implementations, the user input includes speech produced by the user. FIG. 4T illustrates a text representation of the speech 440 of the user input received during the twentieth time period. Although the text representation of the speech 440 is shown in FIG. 4T for purposes of illustration, in various implementations, the text representation of the speech 440 is not displayed by the electronic device.

FIG. 4U illustrates the XR environment 400 during a twenty-first time period subsequent to the twentieth time period. Because there is no path through the transition couples to move the virtual cat 421 to the shelf of the bookcase and, therefore, near the virtual toy 422, the electronic device generates a sub-objective to get assistance from a user and a further sub-objective to move the virtual cat 421 near the user, as illustrated by the objective-indicator 424.

FIG. 4V illustrates the XR environment 400 during a twenty-second time period subsequent to the twenty-first time period. In accordance with the sub-objective to move near the user, the virtual cat 421 has moved toward the user. Further, the electronic device generates a sound, e.g., a meowing sound as illustrated by the sound representation 450 in FIG. 4V, to alert the user that assistance is needed to achieve the objective. In various implementations, the user can move the virtual toy 422 to a location accessible by the virtual cat 421. In various implementations, the user can provide sub-objectives to generate new transition couples until a path through the transition couples can be generated to reach the virtual toy 422.

Figure 6:
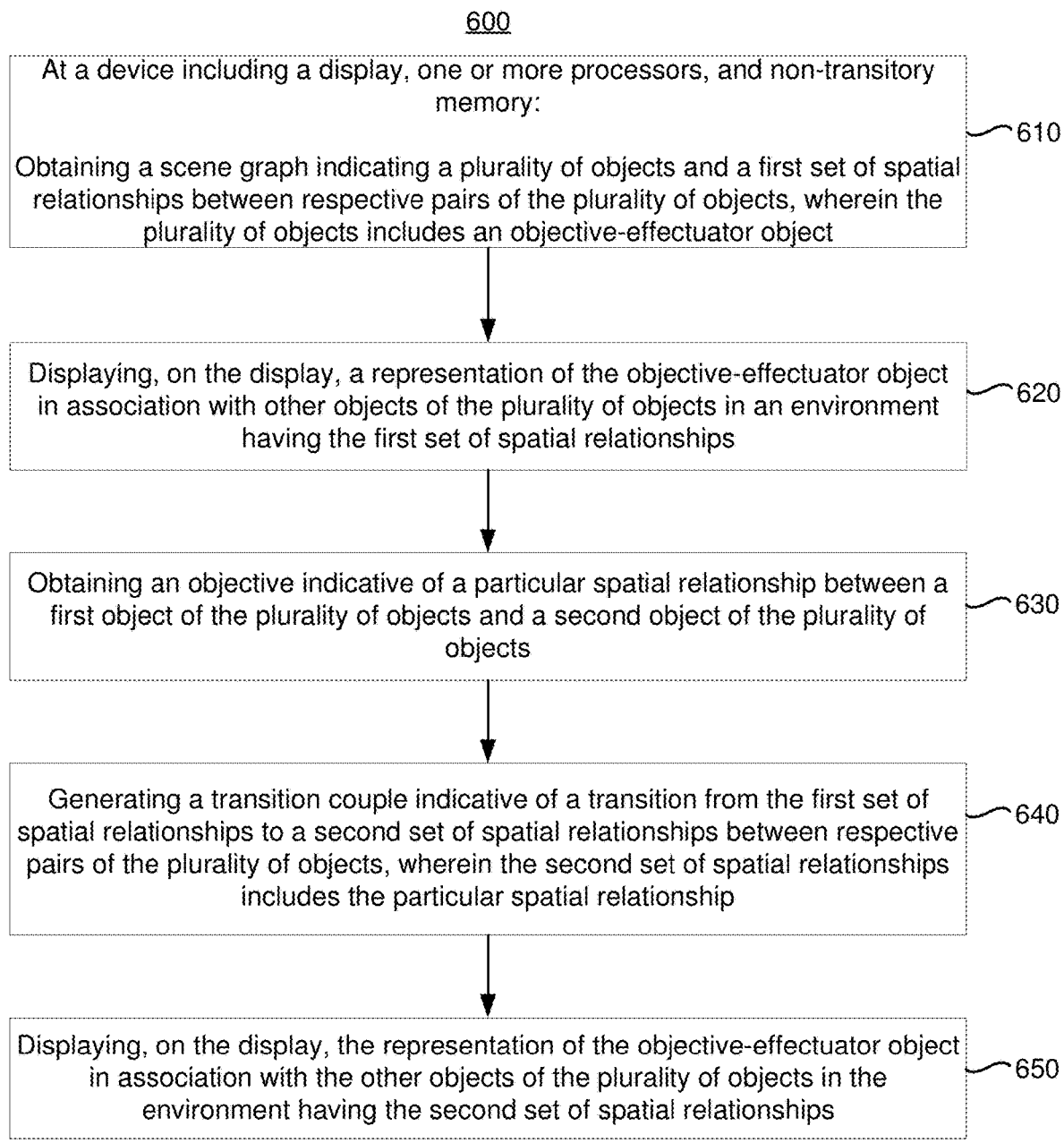
FIG. 6 is a flowchart representation of a method of generating transition couples in accordance with some implementations.

FIG. 6 is a flowchart representation of a method 600 of generating transition couples in accordance with some implementations. In various implementations, the method 600 is performed by a device including a display, one or more processors, and non-transitory memory (e.g., the electronic device 120 of FIG. 3). In some implementations, the method 600 is performed by processing logic, including hardware, firmware, software, or a combination thereof. In some implementations, the method 600 is performed by a processor executing instructions (e.g., code) stored in a non-transitory computer-readable medium (e.g., a memory).

The method 600 begins, in block 610, with the device obtaining a scene graph indicating a plurality of objects in an environment and a first set of spatial relationships between respective pairs of the plurality of objects, wherein the plurality of objects includes an objective-effectuator object.

In various implementations, the environment is an extended reality (XR) environment and includes one or more physical objects and one or more virtual objects, such as an objective-effectuator object. For example, in FIGS. 4A-4V, the XR environment includes one or more physical objects, such as the wooden chair 412 and the table 413, and one or more virtual objects, such as the virtual cat 421 and the virtual toy 422. Thus, in various implementations, the plurality of objects includes at least one physical object. In various implementations, the environment is a virtual reality (VR) environment and includes only virtual objects. In various implementations, the environment is a volumetric, or three-dimensional, environment and various objects are located at locations defined by three-dimensional coordinates.

In various implementations, obtaining the scene graph includes generating the scene graph based on an image of a physical environment upon which an XR environment is based. In various implementations, obtaining the scene graph includes generating the scene graph based on an image representation of an XR environment. For example, in various implementations, an image representation of an XR environment is fed into a neural network that generates a scene graph of the XR environment.

As noted above, the scene graph indicates a first set of spatial relationships between respective pairs of the plurality of objects. In various implementations, the scene graph indicates additional spatial relationships between respective pairs of the plurality of objects. For example, in FIG. 4L, the XR environment has the scene graph illustrated in FIG. 5E which indicates a first set of spatial relationships including "CAT" "ON" "CHAIR1" and "CAT" "NEAR" "TABLE", but also indicates other spatial relationships such as "BOOKCASE" "ON" "FLOOR".

In various implementations, a device directs a representation of an objective-effectuator object to perform one or more actions in order to effectuate (e.g., advance, satisfy, complete and/or achieve) one or more objectives (e.g., results and/or goals). In some implementations, the objective-effectuator object is associated with a particular objective, and the representation of the objective-effectuator object performs actions that improve the likelihood of effectuating that particular objective.

In some implementations, a representation of the objective-effectuator object performs a sequence of actions. In some implementations, a device determines (e.g., generates and/or synthesizes) the actions for the objective-effectuator object. In some implementations, the actions generated for the objective-effectuator object are within a degree of similarity to actions that a corresponding entity (e.g., a character, an equipment and/or a thing) performs as described in fictional material or as exists in a physical environment. For example, in some implementations, a representation of an objective-effectuator object that corresponds to a fictional action figure performs the action of flying in an environment because the corresponding fictional action figure flies as described in the fictional material. Similarly, in some implementations, a representation of an objective-effectuator object that corresponds to a physical drone performs the action of hovering in an environment because the corresponding physical drone hovers in a physical environment. In some implementations, the device obtains the actions for the objective-effectuator object. For example, in some implementations, the device receives the actions for the objective-effectuator object from a separate device (e.g., a remote server) that determines the actions.

The method 600 continues, in block 620, with the device displaying, on the display, a representation of the objective-effectuator object in association with other objects of the plurality of objects in the environment having the first set of spatial relationships.

In various implementations, the display is an opaque display and the representation of the objective-effectuator object is displayed in association with other objects of the plurality of objects in the environment as a composite image of the representation of the objective-effectuator object and an image of the environment. Thus, in various implementations, displaying the representation of the objective-effectuator object includes displaying, based on an image of the environment, an image representation of the environment including the objective-effectuator object. In various implementations, the display is a transparent display and the representation of the objective-effectuator object is displayed in association with a physical environment as a projection over a view of the physical environment.

For example, in FIG. 4L, the scene graph includes the spatial relationship "CAT" "ON" "CHAIR1" and the electronic device displays a representation of the virtual cat 421 in association with the physical environment having the spatial relationship of being on the wooden chair 412.

The method 600 continues, in block 630, with the device obtaining an objective indicative of a particular spatial relationship between a first object of the plurality of objects and a second object of the plurality of objects. For example, in FIG. 4L, the device has obtained the objective of moving the virtual cat 421 on to the table 413 in response to the user input previously received (and illustrated by the text representation of the speech 436 in FIG. 4K). Thus, in various implementations, the first object is the objective-effectuator object. In various implementations, the first object is not the objective-effectuator object. For example, with reference to FIGS. 4A-4V, the objective may be to move the virtual toy 422 to the floor 411, e.g., represented by "TOY" "ON" "FLOOR". To achieve that objective, in various implementations, the virtual cat 421 moves from the floor 411, to the wooden chair 412, to the table 413, to the bookcase 414, holds the virtual toy 422, jumps down to the floor 411, and drops, e.g., ceases holding, the virtual toy 422.

In various implementations, obtaining the objective includes receiving a user input indicative of the particular spatial relationship. For example, in various implementations, the user input includes speech produced by the user. As another example, with reference to FIGS. 4A-4V, the user indicates a spatial relationship of "CAT" "ON" "OBJECT" by pointing a laser pointer at a location on top of the object represented by the label "OBJECT". As another example, with reference to FIGS. 4A-4V, the user indicates a spatial relationship of "CAT" "ON" "OBJECT" by performing a hand gesture lifting the virtual cat 421 and placing the virtual cat 421 on top of the object represented by the label "OBJECT". As another example, with reference to FIGS. 4A-4V, the user indicates a spatial relationship of "CAT" "NEAR" "ME" by calling the virtual cat 421.

In various implementations, obtaining the objective includes selecting a particular objective from a plurality of potential objectives. In various implementations, the potential objectives are objectives the objective-effectuator object has the capability to perform. For example, in FIG. 4B, the device selects an objective of moving the virtual cat 421 near the table 413 (e.g., "CAT" "NEAR" "TABLE") from a plurality of potential objectives including that objective and moving the virtual cat 421 near the bookcase 414 (e.g., "CAT" "NEAR" "BOOKCASE"), moving the virtual cat 421 near the cushioned chair 415 (e.g., "CAT" "NEAR" "CHAIR2"), and moving the virtual cat 421 on top of the wooden chair 412 (e.g., "CAT" "ON" "CHAIR1"). In various implementations, the particular objective is selected randomly from the plurality of potential objectives.

The method 600 continues, in block 640, with the device generating a transition couple indicative of a transition from the first set of spatial relationships to a second set of spatial relationships between respective pairs of the plurality of objects, wherein the second set of spatial relationships includes the particular spatial relationship. For example, in FIG. 4M, in response to receiving the user input indicating the particular spatial relationship of "CAT" "ON" "TABLE" and achieving that objective with the virtual cat 421 on the wooden chair 412, the electronic device generates a transition couple indicating the first set of spatial relationships including "CAT" "ON" "CHAIR1" to a second set of spatial relationships replacing that with "CAT" "ON" "TABLE". For example, the transition couple can be stored as a data object with a transition couple identifier, the first set of spatial relationships, and the second set of spatial relationships. As another example, the transition couple can be stored as a data object with a transition couple identifier, the first set of spatial relationships, and a difference between the first set of spatial relationships and the second set of spatial relationships (e.g., data indicating removal of "CAT" "ON" "CHAIR1" and addition of "CAT" "ON" "TABLE").

Thus, in various implementations, the transition couple indicates a first set of spatial relationships which, when present, allow the device to transition to the second set of spatial relationships. For example, when the virtual cat 421 is on the wooden chair 412, the virtual cat 421 is associated with an animation displaying the virtual cat 421 moving from on top of the wooden chair 412 to on top of the table 413. In various implementations, the transition couple further includes such animation or data linking to such animation.

In various implementations, generating the transition couple is performed in response to certifying the transition. In various implementations, certifying the transition includes determining a capability of the transition. In various implementations, in response to obtaining an objective indicative of a particular spatial relationship that does not have the capability of being performed, the transition couple is not generated. In various implementations, an objective-effectuator object is defined with a number of capabilities and corresponding animations for demonstrating those capabilities. For example, a virtual cat may be defined with a number of capabilities including walking up to a particular speed, running within a particular speed range, jumping up to a particular height from a particular distance away, and holding virtual objects within a particular size range. As another example, a virtual fly may be defined with a number of capabilities including flying in any direction for a particular amount of time and walking along particular surfaces, including walls. As another example, a virtual fish may be defined with a number of capabilities including swimming at up to a particular speed within water and jumping out of one body of water into another less than a particular distance away.

For example, with respect to FIGS. 4A-4V, in response to a user input while the virtual cat 421 is on the floor 411 to move to the top of the bookcase 414, a transition couple indicating a transition from "CAT" "ON" "FLOOR" to "CAT" "ON" "BOOKSHELF" is not generated, as the virtual cat 421 lacks the capability to make that transition, e.g., it cannot jump that high. As another example, in response to a user input while the virtual cat 421 is near the wooden chair 412 to hold the wooden chair 412 does not generate a transition couple because the virtual cat 421 cannot hold the wooden chair 412, e.g., because it is too big or because it is a physical object.

Thus, in various implementations, determining the capability of the transition is based on capabilities of the objective-effectuator object. Further, in various implementations, determining the capability of the transition is based on an animation associated with the objective-effectuator object, e.g., an animation associated with respective capability. In various implementations, the animation or data linking to the animation is included in or stored in association with the transition couple.

In various implementations, certifying the transition includes obtaining permission for the transition. For example, in FIG. 4E, in response to moving the virtual cat 421 from a location near the table 413 to a location near the cushioned chair 415, the device receives user input indicative of permission for the transition and, in response, generates a transition couple indicating a first set of spatial relationships including "CAT" "NEAR" "TABLE" to a second set of spatial relationships including "CAT" "NEAR" "CHAIR2". In response, in FIG. 4G, in response to moving the virtual cat 421 from a location near the cushioned chair 415 to a location on the cushioned chair 415, the device receives user input indicative of a refusal for permission for the transition and, in response, forgoes generation of a transition couple indicating a first set of spatial relationships including "CAT" "NEAR" "CHAIR2" to a second set of spatial relationships including "CAT" "ON" "CHAIR2". Thus, in various implementations, obtaining permission for the transition includes receiving a user input indicating permission for the transition. In various implementations, the user input indicating permission for the transition is the same as a user input indicative of the particular spatial relationship. For example, in FIG. 4L, in response to moving the virtual cat 421 from a location on top of the wooden chair 412 to a location on top of the table 413, the device generates a transition couple based on receiving permission by way of the user input previously received (and illustrated by the text representation of the speech 436 in FIG. 4K). In various implementations, the device obtains permission for the transition if a refusal of permission for the transition is not received within a threshold amount of time. For example, in FIG. 4C, if the user did not provide the user input indicative of permission for the transition of moving the virtual cat to a location near the table 413 (illustrated by the text representation of the speech 432 in FIG. 4C) and did not provide a user input indicative of a refusal for permission for the transition, the device would obtain permission for the transition.

In various implementations, the device does not perform further transitions until permission or refusal for permission is obtained. For example, in FIG. 4D, the device obtains the objective to move the virtual cat 421 to a location near the cushioned chair 415. In various implementations, this objective is not obtained until the previous transition (moving the virtual cat 421 to the location near the table 413 as illustrated in FIG. 4C) has permission granted (either explicitly or implicitly after a threshold amount of time) or refused.

The method 600 continues, in block 650, with the device displaying, on the display, a representation of the objective-effectuator object in association with other objects of the plurality of objects in the environment having the second set of spatial relationships.

For example, in FIG. 4M, the scene graph includes the spatial relationship "CAT" "ON" "TABLE" and the electronic device displays a representation of the virtual cat 421 in association with the physical environment having the spatial relationship of being on the table 413.

FIG. 7 is a flowchart representation of a method 700 of achieving an objective using a scene graph in accordance with some implementations. In various implementations, the method 700 is performed by a device including a display, one or more processors, and non-transitory memory (e.g., the electronic device 120 of FIG. 3). In some implementations, the method 700 is performed by processing logic, including hardware, firmware, software, or a combination thereof. In some implementations, the method 700 is performed by a processor executing instructions (e.g., code) stored in a non-transitory computer-readable medium (e.g., a memory).

The method 700 begins, in block 710, with the device obtaining a scene graph indicating a plurality of objects in an environment and an initial set of spatial relationships between respective pairs of the plurality of objects, wherein the plurality of objects includes an objective-effectuator object.

In various implementations, the environment is an extended reality (XR) environment and includes one or more physical objects and one or more virtual objects, such as an objective-effectuator object. For example, in FIGS. 4A-4V, the XR environment includes one or more physical objects, such as the wooden chair 412 and the table 413, and one or more virtual objects, such as the virtual cat 421 and the virtual toy 422. Thus, in various implementations, the plurality of objects includes at least one physical object. In various implementations, the environment is a virtual reality (VR) environment and includes only virtual objects. In various implementations, the environment is a volumetric, or three-dimensional, environment and various objects are located at locations defined by three-dimensional coordinates.

In various implementations, obtaining the scene graph includes generating the scene graph based on an image of a physical environment upon which an XR environment is based. In various implementations, obtaining the scene graph includes generating the scene graph based on an image representation of an XR environment. For example, in various implementations, an image representation of an XR environment is fed into a neural network that generates a scene graph of the XR environment.

As noted above, the scene graph indicates an initial set of spatial relationships between respective pairs of the plurality of objects. In various implementations, the scene graph indicates additional spatial relationships between respective pairs of the plurality of objects. For example, in FIG. 4L, the XR environment has the scene graph illustrated in FIG. 5E which indicates an initial set of spatial relationships including "CAT" "ON" "CHAIR1" and "CAT" "NEAR" "TABLE", but also indicates other spatial relationships such as "BOOKCASE" "ON" "FLOOR".

In various implementations, a device directs a representation of an objective-effectuator object to perform one or more actions in order to effectuate (e.g., advance, satisfy, complete and/or achieve) one or more objectives (e.g., results and/or goals). In some implementations, the objective-effectuator object is associated with a particular objective, and the representation of the objective-effectuator object performs actions that improve the likelihood of effectuating that particular objective.

In some implementations, a representation of the objective-effectuator object performs a sequence of actions. In some implementations, a device determines (e.g., generates and/or synthesizes) the actions for the objective-effectuator object. In some implementations, the actions generated for the objective-effectuator object are within a degree of similarity to actions that a corresponding entity (e.g., a character, an equipment and/or a thing) performs as described in fictional material or as exists in a physical environment. For example, in some implementations, a representation of an objective-effectuator object that corresponds to a fictional action figure performs the action of flying in an environment because the corresponding fictional action figure flies as described in the fictional material. Similarly, in some implementations, a representation of an objective-effectuator object that corresponds to a physical drone performs the action of hovering in an environment because the corresponding physical drone hovers in a physical environment. In some implementations, the device obtains the actions for the objective-effectuator object. For example, in some implementations, the device receives the actions for the objective-effectuator object from a separate device (e.g., a remote server) that determines the actions.

The method 700 continues, in block 720, with the device obtaining a plurality of transition couples, wherein each transition couple indicates a transition from a respective first set of spatial relationships between respective pairs of the plurality of objects to a respective second set of spatial relationships between respective pairs of the plurality of objects.

For example, each transition couple can be stored as a data object with a transition couple identifier, the respective first set of spatial relationships, and the respective second set of spatial relationships. As another example, each transition couple can be stored as a data object with a transition couple identifier, the respective first set of spatial relationships, and a difference between the respective first set of spatial relationships and the respective second set of spatial relationships.

Thus, in various implementations, each transition couple indicates a respective first set of spatial relationships which, when present, allow the device to transition to the respective second set of spatial relationships. In various implementations, the transition couple further includes an animation or data linking to an animation to demonstrate the transition.

In various implementations, one or more transition couples of the plurality of transition couples are generated according to the method 600 described above with respect to FIG. 6. Thus, in various implementations, each of the plurality of transition couples are certified. In various implementations, each of the plurality of transition couples is certified based on a capability of the transition. In various implementations, each of the plurality of transition couples is certified based on a permission for the transition.

The method 700 continues, in block 730, with the device displaying, on the display, a representation of the objective-effectuator object in association with other objects of the plurality of objects in the environment having the initial set of spatial relationships.

In various implementations, the display is an opaque display and the representation of the objective-effectuator object is displayed in association with other objects of the plurality of objects in the environment as a composite image of the representation of the objective-effectuator object and an image of the environment. Thus, in various implementations, displaying the representation of the objective-effectuator object includes displaying, based on an image of the environment, an image representation of the environment including the objective-effectuator object. In various implementations, the display is a transparent display and the representation of the objective-effectuator object is displayed in association with a physical environment as a projection over a view of the physical environment.

For example, in FIG. 4L, the scene graph includes the spatial relationship "CAT" "ON" "CHAIR1" and the electronic device displays a representation of the virtual cat 421 in association with the physical environment having the spatial relationship of being on the wooden chair 412.

The method 700 continues, in block 740, with the device obtaining an objective indicative of a particular spatial relationship between a first object of the plurality of objects and a second object of the plurality of objects. For example, in FIG. 4S1, the device has obtained the objective of having the virtual cat 421 hold the virtual toy 422 in response to the user input previously received (and illustrated by the text representation of the speech 439 in FIG. 4R). Thus, in various implementations, the first object is the objective-effectuator object. In various implementations, the first object is not the objective-effectuator object. For example, with reference to FIGS. 4A-4V, the objective may be to move the virtual toy 422 to the floor 411, e.g., represented by "TOY" "ON" "FLOOR". To achieve that objective, in various implementations, the virtual cat 421 moves from the floor 411, to the wooden chair 412, to the table 413, to the bookcase 414, holds the virtual toy 422, jumps down to the floor 411 while holding the virtual toy 422, and drops, e.g., ceases holding, the virtual toy 422.

In various implementations, obtaining the objective includes receiving a user input indicative of the particular spatial relationship. For example, in various implementations, the user input includes speech produced by the user. As another example, with reference to FIGS. 4A-4V, the user indicates a spatial relationship of "CAT" "ON" "OBJECT" by pointing a laser pointer at a location on top of the object represented by the label "OBJECT". As another example, with reference to FIGS. 4A-4V, the user indicates a spatial relationship of "CAT" "ON" "OBJECT" by performing a hand gesture lifting the virtual cat 421 and placing the virtual cat 421 on top of the object represented by the label "OBJECT". As another example, with reference to FIGS. 4A-4V, the user indicates a spatial relationship of "CAT" "NEAR" "ME" by calling the virtual cat 421.

The method 700 continues, in block 750, with the device identifying a set of transition couples of the plurality of transition couples, wherein each spatial relationship of the respective first set of spatial relationships indicated by each transition couple of the set of transition couples is included in the initial set of spatial relationships or the respective second set of spatial relationships indicated by a previous transition couple and wherein the particular spatial relationship is included in the respective second set of spatial relationships of a last transition couple of the set of transition couples.

In various implementations, the set of transition couples includes one transition couple of the plurality of transition couples. In various implementations, the set of transition couples includes a plurality of transition couples of the plurality of transition couples. In various implementations, the set of transition couples includes a subset of the plurality of transition couples. In various implementations, the set of transition couples includes all of the plurality of transition couples.

In various implementations, the set of transition couples includes an ordered series of transition couples. In various implementations, the set of transition couples includes a strictly ordered series in which each transition couple of the series of transition couples is either before or after each other transition couple of the series of transition couples. For example, a strictly ordered series can include: firstly, A; then, B; then, C; and, lastly, D. In various implementations, the set of transition couples includes a loosely ordered series in which only some transition couples of the series of transition couples are before or after other transition couples of the series of transition couples. For example, a loosely ordered series can include: firstly, A; then B, C, and D, in any order; and, lastly, E. As another example, a loosely ordered series can include: A; then B; then C; D, at any time; and, lastly, E.

For example, in FIG. 4S1, the device has obtained the objective of having the virtual cat 421 hold the virtual toy 422. The initial set of spatial relationships includes "CAT" "ON" "FLOOR" and "CAT" "NEAR" "CHAIR". From a plurality of obtained transition couples, the device identifies a first transition couple indicating a respective first set of spatial relationships including "CAT" "ON" "FLOOR" and "CAT" "NEAR" "CHAIR" (which are both included in the initial set of spatial relationship) and a respective second set of spatial relationships including "CAT" "ON" "CHAIR" and "CAT" "NEAR" "TABLE". From the plurality of obtained transition couples, the device identifies a second transition couple indicating a respective first set of spatial relationships including "CAT" "ON" "CHAIR" and "CAT" "NEAR" "TABLE" (which are both included in the respective first set of spatial relationships of a previous transition couple, e.g., the first transition couple) and a respective second set of spatial relationships including "CAT" "ON" "TABLE" and "CAT" "NEAR" "BOOKCASE". From the plurality of obtained transition couples, the device identifies a third transition couple indicating a respective first set of spatial relationships including "CAT" "ON" "TABLE" and "CAT" "NEAR" "BOOKCASE" (which are both included in the respective first set of spatial relationships of a previous transition couple, e.g., the second transition couple) and a respective second set of spatial relationships including "CAT" "ON" "BOOKCASE" and "CAT" "NEAR" "TOY". From the plurality of obtained transition couples, the device identifies a fourth transition couple indicating a respective first set of spatial relationships including "CAT" "NEAR" "TOY" (which is included in the respective first set of spatial relationships of a previous transition couple, e.g., the third transition couple) and a respective second set of spatial relationships including "CAT" "HOLDING" "TOY", which is the particular spatial relationship indicated by the objective.

Figure 8A:
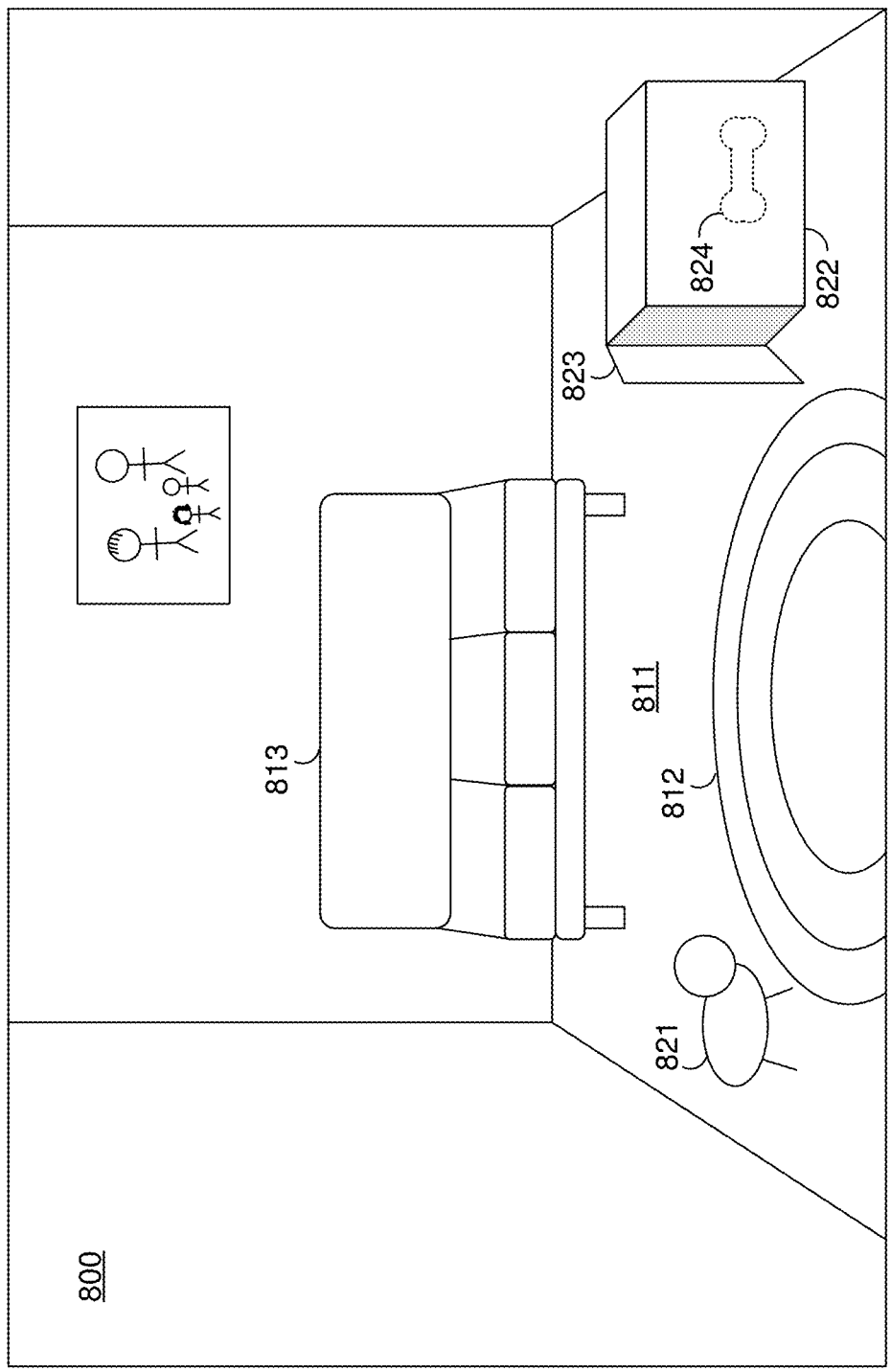
FIG. 8A illustrates an example XR environment.
Figure 8B:
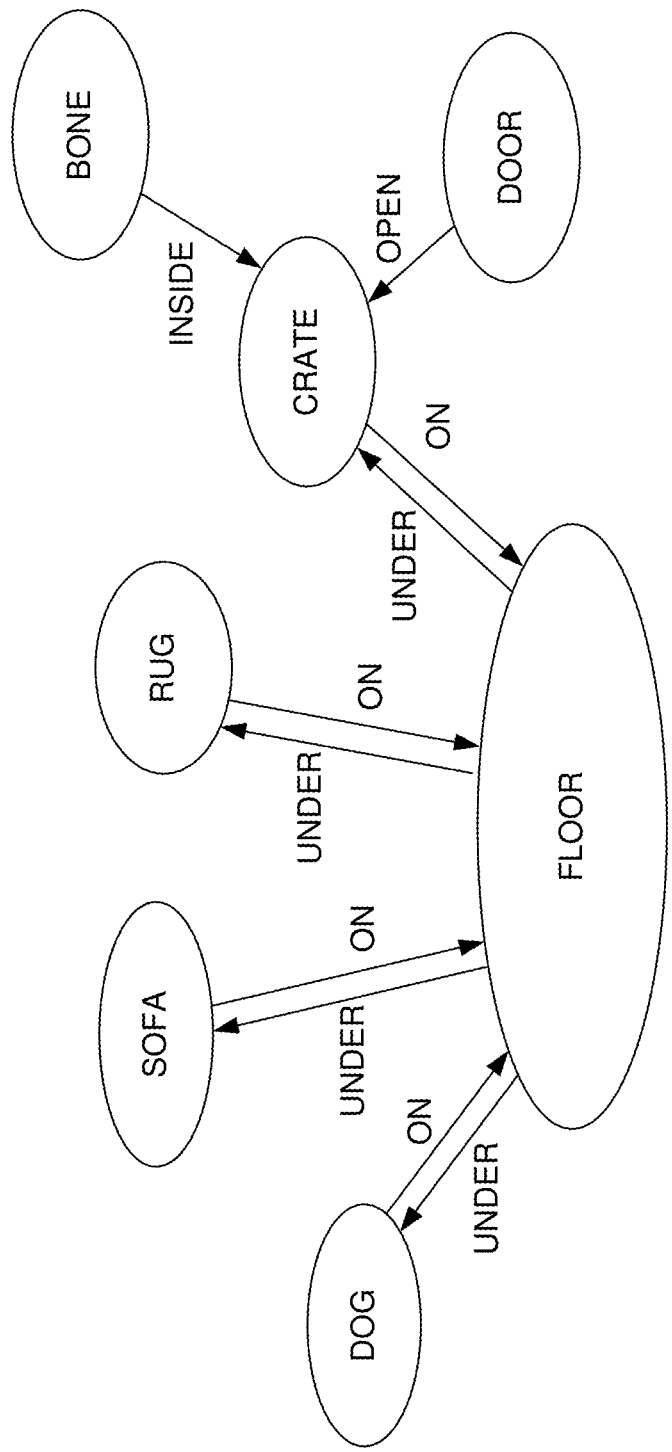
FIG. 8B illustrates a scene graph of the example XR environment of FIG. 8A.

Another example for identifying the set of transition couples is described below with respect to FIGS. 8A-8C. FIG. 8A illustrates an XR environment 800 displayed, at least in part, by a display of an electronic device. The XR environment 800 is based on a physical environment of a family room in which the electronic device is present. The XR environment 800 includes a plurality of objects, including one or more physical objects (e.g., a floor 811 with a label of "FLOOR", a rug 812 with a label of "RUG", and a sofa 813 with a label of "SOFA") of the physical environment and one or more virtual objects (e.g., a virtual dog 821, a virtual crate 822, a virtual door 823, and a virtual bone 824 within the virtual crate 822). FIG. 8B illustrates a scene graph of the XR environment 800. FIG. 8C illustrates a table representing a plurality of transition couples for the XR environment. The first column of the table includes a transition couple identifier, the second column of the table includes the respective first set of spatial relationships, and the third column of the table includes the respective second set of spatial relationships.

Thus, the transition couple with the identifier 001 indicates that when the virtual dog 821 is on the floor 811, it can move near the sofa 813 and remain on the floor 811. The transition couple with the identifier 002 indicates that when the virtual dog 421 is on the floor 811, it can move near the virtual crate 822 and remain on the floor 811. The transition couple with the identifier 003 indicates that when the virtual dog 821 is on the floor 811 and the virtual bone 824 is on the floor 811, the virtual dog 821 can move near the virtual bone 824 while both the virtual dog 821 and the virtual bone 824 remain on the floor 811.

The transition couple with the identifier 004 indicates that when the virtual dog 821 is on the floor 811 near the sofa 813, the virtual dog 821 can jump onto the sofa 813. The transition couple with the identifier 005 indicates that when the virtual dog 821 is on the sofa 813 the virtual dog can jump off the sofa 813 and be on the floor 811 near the sofa 813. The transition couple with the identifier 006 indicates that when the virtual dog 821 and the virtual bone 824 are both on the sofa 813, the virtual dog 821 can move near the virtual bone 824 while both the virtual dog 821 and the virtual bone 824 remain on the sofa 813.

The transition couple with the identifier 007 indicates that when the virtual dog 821 is near the virtual crate 822 and the virtual door 823 is closed, the virtual dog 821 can open the virtual door 823 and remain near the virtual crate 822. The transition couple with the identifier 008 indicates that when the virtual dog 821 is near the virtual crate 822 and the virtual door 823 is open, the virtual dog 821 can move inside the virtual crate 822 while the virtual door 823 remains open. The transition couple with the identifier 009 indicates that when the virtual dog 821 and the virtual bone 824 are both inside the virtual crate 822, the virtual dog 821 can move near the virtual bone 824 while both the virtual dog 821 and the virtual bone 824 remain inside the virtual crate 822. The transition couple with the identifier 010 indicates that when the virtual dog 821 is inside the virtual crate 822 and the virtual door 823 is open, the virtual dog 821 can exit the virtual crate 822 to be on the floor 811 near the virtual crate 822 while the virtual door 823 remains open.

The transition couple with the identifier 011 indicates what when the virtual dog 821 is near the virtual bone 824, the virtual dog 821 can pick up and hold the virtual bone 824. The transition couple with the identifier 012 indicates that when the virtual dog 821 is holding the virtual bone 824, the virtual dog 821 can drop the virtual bone 824 such that the virtual bone 824 is near the virtual dog 821.

The device obtains an objective of having the virtual dog 821 hold the virtual bone 824 on the sofa 813. Thus, the particular spatial relationship includes "DOG" "HOLD" "BONE" and "DOG" "ON" "SOFA".

As shown in FIG. 8B, the initial set of spatial relationships includes "DOG" "ON" "FLOOR", "DOOR" "OPEN" "CRATE", and "BONE" "INSIDE" "CRATE". From the plurality of transition couples in FIG. 8C, the device identifies the transition couple with the identifier 002 as a first transition couple. Thus, the scene graph transitions from including "DOG" "ON" "FLOOR" (from the initial set of spatial relationships) to including "DOG" "ON" "FLOOR" and "DOG" "NEAR" "CRATE". The device identifies the transition couple with the identifier 008 as a second transition couple. Thus, the scene graph transitions from including "DOG" "NEAR" "CRATE" (from the first transition couple) and "DOOR" "OPEN" "CRATE" (from the initial set of spatial relationships) to including "DOG" "INSIDE" "CRATE" and "DOOR" "OPEN" "CRATE". The device identifies the transition couple with the identifier 009 as a third transition couple. Thus, the scene graph transitions from including "DOG" "INSIDE" "CRATE" (from the second transition couple) and "BONE" "INSIDE" "CRATE" (from the initial set of spatial relationships) to also include "DOG" "NEAR" "BONE". The device identifies the transition couple with the identifier 011 as a fourth transition couple. Thus, the scene graph transition from including "DOG" "NEAR" "BONE" (from the third transition couple) to "DOG" "HOLD" "BONE". The device identifies the transition couple with the identifier 010 as a fifth transition couple. Thus, the scene graph transitions from including "DOG" "INSIDE" "CRATE" (from the second transition couple) and "DOOR" "OPEN" "CRATE" (from the initial set of spatial relationships) to including "DOG" "NEAR" "CRATE", "DOG" "ON" "FLOOR", and "DOOR" "OPEN" "CRATE". The device identifies the transition couple with the identifier 001 as a sixth transition couple. Thus, the scene graph transitions from including "DOG" "ON" "FLOOR" (from the fifth transition couple) to also including "DOG" "NEAR" "SOFA". The device identifies the transition couple with the identifier 004 as the last transition couple. Thus, the scene graph transitions from including "DOG" "ON" "FLOOR" and "DOG" "NEAR" "SOFA" (both from the sixth transition couple) to including "DOG" "ON" "SOFA". Thus, the final scene graph includes the particular spatial relationship of "DOG" "HOLD" "BONE" (from the fourth transition couple) and "DOG" "ON" "SOFA" (from the last transition couple).

As described above, for each transition couple in the set of transition couples, the current scene graph, as modified by previous transition couples in the set of transition couples, includes the spatial relationships of the respective first set of spatial relationships.

The method 700 continues, in block 760, with the device displaying, on the display, the representation of the objective-effectuator object in association with the other objects of the plurality of objects in the environment having the respective second set of spatial relationships of each transition couple of the set of transition couples. In various implementations, for each transition couple of the set of transition couples, the device displays the representation of the objective-effectuator object in association with the other objects of the plurality of objects in the environment having the respective second set of spatial relationships.

For example, in FIGS. 4S1-4S5, the device displays the virtual cat 421 in various spatial relationships based on the current scene graph as modified by transition couples in a set of transition couples.

As another example, with respect to FIGS. 8A-8C, the device displays the virtual dog 821 move near the virtual crate 822 in response to identifying the first transition couple, move inside the virtual crate 822 in response to identifying the second transition couple, move near the virtual bone 824 in response to identifying the third transition couple, pick up the virtual bone 824 in response to identifying the fourth transition couple, and, while holding the virtual bone 824, move outside the crate 822 in response to identifying the fifth transition couple, move near the sofa 813 in response to identifying the sixth transition couple, and jump on the sofa 813 in response to identifying the last transition couple.

In various implementations, the method 700 further includes storing data identifying the set of transition couples in association with the initial set of spatial relationships and the particular spatial relationship. Accordingly, in order to achieve an objective of the particular spatial relationship from the initial set of spatial relationships, the device need not re-identify the set of transition couples.

In various implementations, the method 700 further includes failing to identify a set of transition couples of a first portion of the plurality of transition couples, wherein each spatial relationship of the respective first set of spatial relationships indicated by each transition couple of the set of transition couples is included in the initial set of spatial relationships or the respective second set of spatial relationships indicated by a previous transition couple and wherein the particular spatial relationship is included in the respective second set of spatial relationships of a last transition couple of the set of transition couples. For example, in FIG. 4U, the electronic device does not have enough transition couples to achieve the objective of "CAT" "HOLD" "TOY".

The method 700 further includes in response to failing to identify a set of transition couples of the first portion of the plurality of transition couples, obtaining a second portion of the plurality of transition couples. In various implementations, obtaining the second portion of the plurality of transition couples includes displaying, on the display, an indication of failing to identify a set of transition couples of the first portion of the plurality of transition couples and receiving user input indicative of a transition couple of the second portion of the plurality of transition couples. For example, in FIG. 4V, the electronic device displays the virtual cat 421 near the user asking for help. In response, in various implementations, the user instructs the virtual cat 421 to move near the bookcase 414 and jump on the shelf, creating a new transition couple indicating a respective first set of spatial relationships of "CAT" "NEAR" "BOOKCASE" and a respective second set of spatial relationships of "CAT" "ON" "SHELF".

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, without changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method performed at a device that includes a display, one or more processors, and non-transitory memory, the method comprising:
    obtaining a scene graph as a data structure representing a plurality of objects and an initial set of spatial relationships between respective pairs of the plurality of objects, wherein the plurality of objects includes an objective-effectuator object;
    obtaining from the scene graph a plurality of transition couples, wherein each transition couple indicates a transition from respective first set of spatial relationships in the scene graph between respective pairs of the plurality of objects to a respective second set of spatial relationships in the scene graph between respective pairs of the plurality of objects;
    displaying, on the display, a representation of the objective-effectuator object in association with other objects of the plurality of objects in an environment having the initial set of spatial relationships in the scene graph;
    obtaining an objective indicative of a particular spatial relationship in the scene graph between a first object of the plurality of objects and a second object of the plurality of objects;
    identifying a set of transition couples of the plurality of transition couples in the scene graph, wherein each spatial relationship of the respective first set of spatial relationships indicated by each transition couple of the set of transition couples in the scene graph is included in the initial set of spatial relationships or the respective second set of spatial relationships indicated by a previous transition couple in the scene graph and wherein the particular spatial relationship in the scene graph is included in the respective second set of spatial relationships of a last transition couple of the set of transition couples in the scene graph;
    displaying a representation of the objective-effectuator object in association with other objects of the plurality of objects in the environment having the respective second set of spatial relationships of each transition couple of the set of transition couples in the scene graph;
    failing to identify a set of transition couples of a first portion of the plurality of transition couples in the scene graph, wherein each spatial relationship of the respective first set of spatial relationships indicated by each transition couple of the set of transition couples in the scene graph is included in the initial set of spatial relationships or the respective second set of spatial relationships indicated by a previous transition couple in the scene graph and wherein the particular spatial relationship in the scene graph is included in the respective second set of spatial relationships of a last transition couple of the set of transition couples in the scene graph; and
    in response to failing to identify the set of transition couples of the first portion of the plurality of transition couples in the scene graph, obtaining a second portion of the plurality of transition couples in the scene graph.

2. The method of claim 1, wherein the plurality of objects includes at least one physical object.

3. The method of claim 1, wherein the first object of the plurality of objects is the objective-effectuator object.

4. The method of claim 1, further comprising storing data identifying the set of transition couples in association with the initial set of spatial relationships and the particular spatial relationship.

5. The method of claim 1, wherein each of the plurality of transition couples is certified.

6. The method of claim 5, wherein each of the plurality of transition couples is certified based on a capability of the transition.

7. The method of claim 5, wherein each of the plurality of transition couples is certified based on a permission for the transition.

8. The method of claim 1, wherein obtaining the second portion of the plurality of transition couples includes:
    displaying, on the display, an indication of failing to identify a set of transition couples of the first portion of the plurality of transition couples; and
    receiving user input indicative of a transition couple of the second portion of the plurality of transition couples.

9. A device comprising:
    a display;
    a non-transitory memory; and
    one or more processors to:
        obtain a scene graph as a data structure representing a plurality of objects and an initial set of spatial relationships between respective pairs of the plurality of objects, wherein the plurality of objects includes an objective-effectuator object;

obtain from the scene graph a plurality of transition couples, wherein each transition couple indicates a transition from respective first set of spatial relationships in the scene graph between respective pairs of the plurality of objects to a respective second set of spatial relationships in the scene graph between respective pairs of the plurality of objects;

display, on the display, a representation of the objective-effectuator object in association with other objects of the plurality of objects in an environment having the initial set of spatial relationships in the scene graph;

obtain an objective indicative of a particular spatial relationship in the scene graph between a first object of the plurality of objects and a second object of the plurality of objects;

identify a set of transition couples of the plurality of transition couples in the scene graph, wherein each spatial relationship of the respective first set of spatial relationships indicated by each transition couple of the set of transition couples in the scene graph is included in the initial set of spatial relationships or the respective second set of spatial relationships indicated by a previous transition couple in the scene graph and wherein the particular spatial relationship in the scene graph is included in the respective second set of spatial relationships of a last transition couple of the set of transition couples in the scene graph;

display a representation of the objective-effectuator object in association with other objects of the plurality of objects in the environment having the respective second set of spatial relationships of each transition couple of the set of transition couples in the scene graph;

fail to identify a set of transition couples of a first portion of the plurality of transition couples in the scene graph, wherein each spatial relationship of the respective first set of spatial relationships indicated by each transition couple of the set of transition couples in the scene graph is included in the initial set of spatial relationships or the respective second set of spatial relationships indicated by a previous transition couple in the scene graph and wherein the particular spatial relationship in the scene graph is included in the respective second set of spatial relationships of a last transition couple of the set of transition couples in the scene graph; and in response to failing to identify the set of transition couples of the first portion of the plurality of transition couples in the scene graph, obtain a second portion of the plurality of transition couples in the scene graph.

10. The device of claim 9, wherein the plurality of objects includes at least one physical object.

11. The device of claim 9, wherein the first object of the plurality of objects is the objective-effectuator object.

12. The device of claim 9, wherein the one or more processors are further to store data identifying the set of transition couples in association with the initial set of spatial relationships and the particular spatial relationship.

13. The device of claim 9, wherein each of the plurality of transition couples is certified.

14. The device of claim 13, wherein each of the plurality of transition couples is certified based on a capability of the transition.

15. The device of claim 13, wherein each of the plurality of transition couples is certified based on a permission for the transition.

16. The device of claim 9, wherein the one or more processors are to obtain the second portion of the plurality of transition couples by:
displaying, on the display, an indication of failing to identify a set of transition couples of the first portion of the plurality of transition couples; and
receiving user input indicative of a transition couple of the second portion of the plurality of transition couples.

17. A non-transitory memory storing one or more programs, which, when executed by one or more processors of a device including a display, cause the device to:

obtain a scene graph as a data structure representing a plurality of objects and an initial set of spatial relationships between respective pairs of the plurality of objects, wherein the plurality of objects includes an objective-effectuator object;

obtain from the scene graph a plurality of transition couples, wherein each transition couple indicates a transition from respective first set of spatial relationships in the scene graph between respective pairs of the plurality of objects to a respective second set of spatial relationships in the scene graph between respective pairs of the plurality of objects;

display, on the display, a representation of the objective-effectuator object in association with other objects of the plurality of objects in an environment having the initial set of spatial relationships in the scene graph;

obtain an objective indicative of a particular spatial relationship in the scene graph between a first object of the plurality of objects and a second object of the plurality of objects;

identify a set of transition couples of the plurality of transition couples in the scene graph, wherein each spatial relationship of the respective first set of spatial relationships indicated by each transition couple of the set of transition couples in the scene graph is included in the initial set of spatial relationships or the respective second set of spatial relationships indicated by a previous transition couple in the scene graph and wherein the particular spatial relationship in the scene graph is included in the respective second set of spatial relationships of a last transition couple of the set of transition couples in the scene graph;

display a representation of the objective-effectuator object in association with other objects of the plurality of objects in the environment having the respective second set of spatial relationships of each transition couple of the set of transition couples in the scene graph;

fail to identify a set of transition couples of a first portion of the plurality of transition couples in the scene graph, wherein each spatial relationship of the respective first set of spatial relationships indicated by each transition couple of the set of transition couples in the scene graph is included in the initial set of spatial relationships or the respective second set of spatial relationships indicated by a previous transition couple in the scene graph and wherein the particular spatial relationship in the scene graph is included in the respective second set of spatial relationships of a last transition couple of the set of transition couples in the scene graph; and in response to failing to identify the set of transition couples of the first portion of the plurality of transition couples in the scene graph, obtain a second portion of the plurality of transition couples in the scene graph.

18. The non-transitory computer-readable medium of claim 17, wherein the device is further to store data identifying the set of transition couples in association with the initial set of spatial relationships and the particular spatial relationship.

* * * * *